(12) United States Patent
Ishida et al.

(10) Patent No.: US 11,392,407 B2
(45) Date of Patent: Jul. 19, 2022

(54) SEMICONDUCTOR DEVICE

(71) Applicant: Renesas Electronics Corporation, Tokyo (JP)

(72) Inventors: Kazuya Ishida, Tokyo (JP); Hiroyuki Kondo, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 282 days.

(21) Appl. No.: 15/900,613

(22) Filed: Feb. 20, 2018

(65) Prior Publication Data

US 2018/0293095 A1 Oct. 11, 2018

(30) Foreign Application Priority Data

Apr. 7, 2017 (JP) .............................. JP2017-076831

(51) Int. Cl.
*G06F 9/48* (2006.01)
*G06F 13/24* (2006.01)

(52) U.S. Cl.
CPC ............ *G06F 9/4818* (2013.01); *G06F 13/24* (2013.01)

(58) Field of Classification Search
CPC ............................... G06F 9/4818; G06F 13/24
See application file for complete search history.

(56) References Cited

U.S. PATENT DOCUMENTS

| | | | |
|---|---|---|---|
| 9,753,779 B2 | 9/2017 | Maruyama | |
| 2004/0019815 A1* | 1/2004 | Vyssotski | G06F 1/3296 713/322 |
| 2008/0016383 A1* | 1/2008 | Watanabe | G06F 1/3203 713/323 |
| 2008/0046697 A1* | 2/2008 | Sugure | G06F 9/30043 712/218 |
| 2010/0262976 A1* | 10/2010 | Maruyama | G06F 9/462 718/108 |
| 2011/0252221 A1* | 10/2011 | Matsuyama | G06F 9/461 712/205 |
| 2013/0031388 A1* | 1/2013 | Sakarda | G06F 1/3203 713/320 |
| 2015/0074676 A1* | 3/2015 | Maruyama | G06F 9/4881 718/103 |
| 2018/0293095 A1* | 10/2018 | Ishida | G06F 9/4818 |

FOREIGN PATENT DOCUMENTS

WO WO 2013/175610 A1 11/2013

* cited by examiner

*Primary Examiner* — Meng Al T An
*Assistant Examiner* — Willy W Huaracha
(74) *Attorney, Agent, or Firm* — McDermott Will & Emery LLP

(57) ABSTRACT

A semiconductor device containing a CPU capable of receiving an interrupt request signal and a task control circuit is provided. The semiconductor device includes a CPU (processor), a save circuit, and a task control circuit. The CPU includes a program counter that is updated when a task is executed. The semiconductor device includes an interrupt-related data save circuit that stores the data of the program counter when the CPU receives a CPU interrupt request signal. The data of the program counter stored in the interrupt-related data save circuit is stored in an save circuit and is used for restoring from the interrupt processing.

9 Claims, 38 Drawing Sheets

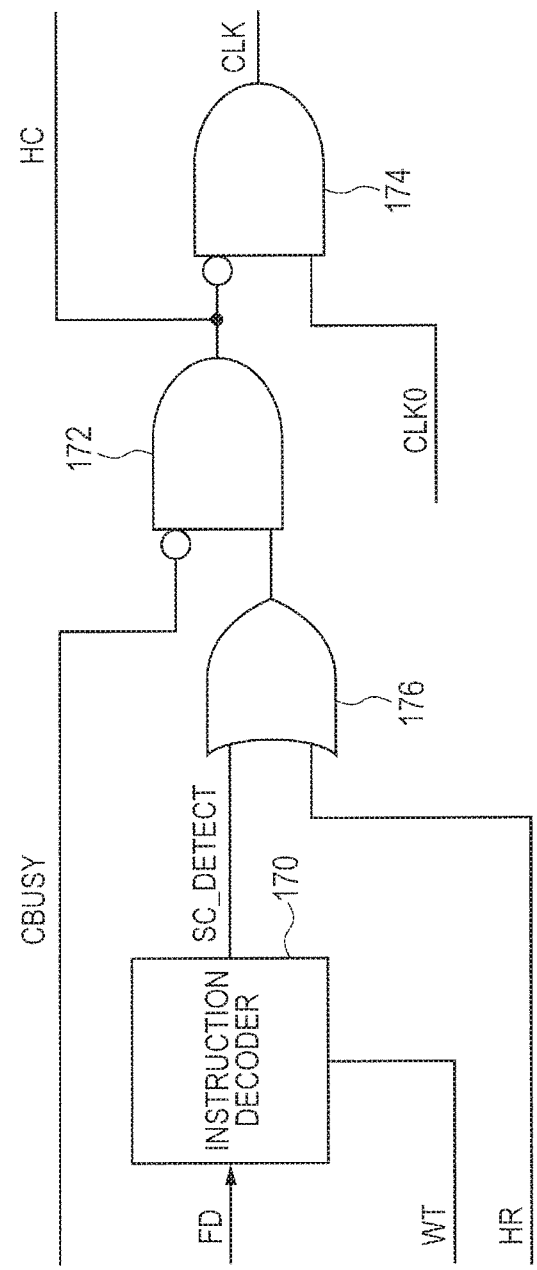

| EID | QUEUE ORDER REGISTER | QUEUE IDENTIFICATION REGISTER | TASK PRIORITY REGISTER |
|---|---|---|---|
| E0 | 0 | Q0 | 0 |
| E1 | 0 | Q1 | 0 |
| E2 | 1 | Q0 | 1 |
| E3 | 2 | Q0 | 0 |
| E4 | 0 | Non | 0 |
| E5 | 0 | Non | 0 |
| E6 | 0 | Non | 0 |
| E7 | 0 | Non | 0 |

| EID | QUEUE ORDER REGISTER | QUEUE IDENTIFICATION REGISTER | TASK PRIORITY REGISTER |
|-----|----------------------|-------------------------------|------------------------|
| E0  | 0                    | Q0                            | 0                      |
| E1  | 1                    | Q1                            | 0                      |
| E2  | 1                    | Q0                            | 1                      |
| E3  | 2                    | Q0                            | 0                      |
| E4  | 0                    | Q1                            | 0                      |
| E5  | 0                    | Non                           | 0                      |
| E6  | 0                    | Non                           | 0                      |
| E7  | 0                    | Non                           | 0                      |

| EID | QUEUE ORDER REGISTER | QUEUE IDENTIFICATION REGISTER | TASK PRIORITY REGISTER |
|---|---|---|---|
| E0 | 1 | Q0 | 0 |
| E1 | 1 | Q1 | 0 |
| E2 | 2 | Q0 | 1 |
| E3 | 3 | Q0 | 0 |
| E4 | 0 | Q1 | 0 |
| E5 | 0 | Q0 | 1 |
| E6 | 0 | Non | 0 |
| E7 | 0 | Non | 0 |

| EID | QUEUE ORDER REGISTER | QUEUE IDENTIFICATION REGISTER | TASK PRIORITY REGISTER |
|-----|----------------------|-------------------------------|------------------------|
| E0  | 1                    | Q0                            | 0                      |
| E1  | 1                    | Q1                            | 0                      |
| E2  | 2                    | Q0                            | 1                      |
| E3  | 3                    | Q0                            | 0                      |
| E4  | 0                    | Q1                            | 0                      |
| E5  | 0                    | Q0                            | 1                      |
| E6  | 4                    | Q0                            | 1                      |
| E7  | 0                    | Non                           | 0                      |

| EID | QUEUE ORDER REGISTER | QUEUE IDENTIFICATION REGISTER | TASK PRIORITY REGISTER |
|---|---|---|---|
| E0 | 1 | Q0 | 0 |
| E1 | 1 | Q1 | 0 |
| E2 | 2 | Q0 | 1 |
| E3 | 0 | Non | 0 |
| E4 | 0 | Q1 | 0 |
| E5 | 0 | Q0 | 1 |
| E6 | 3 | Q0 | 1 |
| E7 | 0 | Non | 0 |

FIG. 42

```
PUSHM R0-R15 // SAVE TO STACK OF REGISTER

: // MAIN BODY OF INTERRUPT HANDLER PROCESSING

POPM R0-R15 // RESTORING FROM STACK OF REGISTER
RTE (RTFI) // RETURN FROM INTERRUPT HANDLER
```

FIG. 43

```
vent_isr( );  // HW-RTOS SYSTEM CALL
isp = isp + 8;

: // MAIN BODY OF INTERRUPT HANDLER PROCESSING viext_ntc( ); // HW-RTOS SYSTEM CALL
```

*FIG. 45*

```
vent_isr();   // HW-RTOS SYSTEM CALL

: // MAIN BODY OF INTERRUPT HANDLER PROCESSING viext_ntc();  // HW-RTOS SYSTEM CALL
``` under execution, and the data regarding the executing state of the task. The TCB is an area ensured in a memory, in order to hold information specific to the task. The multitasking OS saves the context

SEMICONDUCTOR DEVICE

CROSS-REFERENCE TO RELATED APPLICATIONS

The disclosure of Japanese Patent Application No. 2017-076831 filed on Apr. 7, 2017 including the specification, drawings, and abstract is incorporated herein by reference in its entirety.

BACKGROUND

The present invention relates to a semiconductor device and, in particular, relates to a semiconductor device with the function of an OS (Operating System).

Not only an OS for general-purpose equipment such as a personal computer but also an OS for dedicated equipment such as a mobile phone is recently demanded to have more advanced function. In particular, an OS that can perform multiple tasks by one CPU (Central Processing Unit, hereinafter also called a processor) is increasingly mounted in many kinds of electronic equipment. Such an OS is hereinafter called a multitasking OS.

The multitasking OS divides the processing time of a CPU into a series of unit time (time slice), and assigns a time slice one by one to multiple tasks. Each task can use the CPU only when a time slice is assigned by the OS. One task is performed in each time slice. A time slice is a very short period of time when viewed by a user; accordingly, it looks as if multiple tasks are simultaneously executed. According to such a processing method, it is possible to use effectively the processing capacity of the CPU, such that, when TASK A becomes in a standby state for input and stops requiring the processing capacity of the CPU for the time being, the execution right is granted to another TASK B. The execution right here is equivalent to the right of using of the CPU.

It is called a "task switch" that the multitasking OS switches the execution right of a task. A task switch occurs when a time slice passes, or when a task executes a prescribed instruction. When the multitasking OS reaches the execution timing of a task switch, the context information of the task under execution is saved to a TCB (Task Control Block). The context information is the data stored in a register of the CPU at the time of the task execution, and the data regarding the executing state of the task. The TCB is an area ensured in a memory, in order to hold information specific to the task. The multitasking OS saves the context information of the task under execution to the TCB. Subsequently, the multitasking OS selects a task to assign an execution right next, reads the context information from the TCB of the task, and loads it to the CPU register. In this way, each task advances own processing a little bit at a time in units of a time slice.

The multitasking OS has a merit that multiple tasks can be performed efficiently; however, it also has a demerit that the overhead of saving and loading of the context information is newly generated. Usually, the merit of the multitasking OS far outweighs the overhead accompanying the task switch.

In recent years, a so-called real-time OS is spreading centering on an embedded system. The real-time OS (hereinafter, also called an RTOS (Real Time OS)) strictly demands that the processing should be completed within a determined time. In the RTOS with such a severe time requirement, the overhead in performing the task switch may greatly influence the performance of the entire system.

The present inventors developed a task control circuit that has realized a task switch by hardware logic, as disclosed by Patent Literature 1. By building such a task control circuit and a CPU in a semiconductor device, it becomes possible to mount easily the RTOS in an embedded system for example, and at the same time, it becomes possible to suppress the degradation of the performance of the entire system.

(Patent Literature 1) International Publication WO 2013/No. 175610

SUMMARY

In Patent Literature 1, an interrupt request signal is supplied only to a task control circuit and not supplied to a CPU. Therefore, there arises a problem that, in a semiconductor device containing the task control circuit and the CPU, it becomes difficult to perform interrupt processing, when only the CPU is used. Furthermore, when an existing CPU and the task control circuit are contained in a semiconductor device, the interrupt request signal is supplied only to the task control circuit. Therefore, there arises a problem that it becomes difficult to realize compatibility between the semiconductor device and the existing CPU with regard to the interrupt request processing.

In Patent Literature 1, no consideration is given to supplying the interrupt request signal to the CPU.

The other issues and new features of the present invention will become clear from the description of the present specification and the accompanying drawings.

A semiconductor device includes a CPU; a save circuit to store processing data of the CPU; and a task control circuit to control a state of a task executed by the CPU based on a system call from the CPU. The semiconductor device includes an interrupt-related data save circuit to store data of the program counter when the CPU receives an interrupt request signal, and the data of the program counter stored in the interrupt-related data save circuit is stored in the save circuit and is employed for restoring from the interrupt processing.

It becomes possible to provide a semiconductor device containing a task control circuit and a CPU that is capable of receiving an interrupt request signal. It becomes also possible to provide a semiconductor device containing an existing CPU and the task control circuit and realizing compatibility with the existing CPU with regard to the interrupt request signal.

BRIEF DESCRIPTION OF THE DRAWINGS

FIG. 7 is a circuit diagram of an execution control circuit according to Basic Example 1.

FIG. 42 is a drawing illustrating schematically the configuration of an interrupt handler according to Embodiment 1;

FIG. 43 is a drawing illustrating schematically the configuration of the interrupt handler according to Embodiment 1.

FIG. 45 is a drawing illustrating schematically the configuration of an interrupt handler according to Embodiment 2.

DETAILED DESCRIPTION

Figure 1:
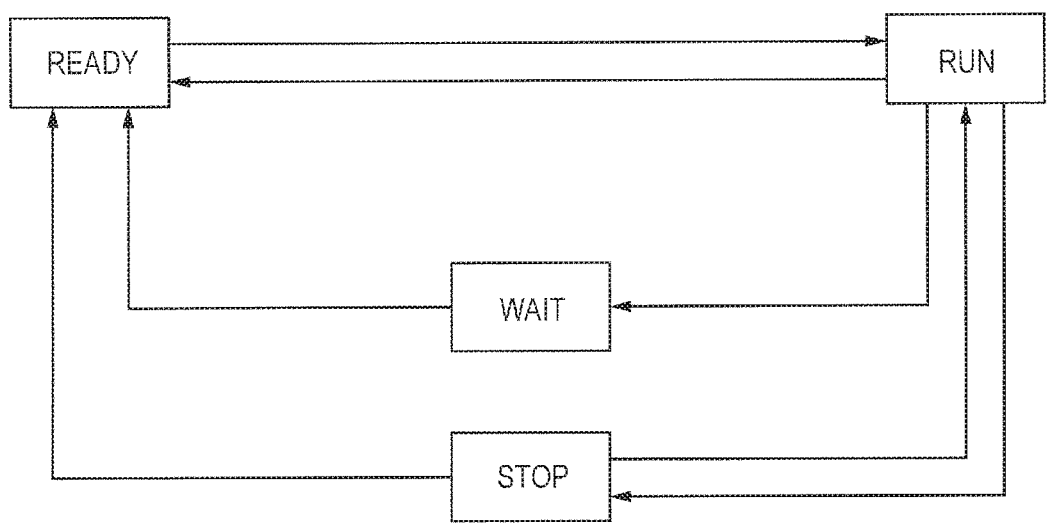
FIG. 1 is a state transition diagram of a task.

Hereinafter, each embodiment of the present invention is explained, referring to the accompanying drawings. The present disclosure is absolutely only an example, and proper modifications that maintain the gist of the present invention and that can be easily thought out by a person skilled in the art are naturally contained in the range of the present invention. The drawings may be schematically expressed about the width, thickness, form, etc. of each part, compared with the actual mode, in order to make the explanation thereof more clearly, however, they are only an example and do not restrict the interpretation of the present invention.

In the present specification and each drawing, the same symbol or reference numeral is attached to the same element as what has been described above regarding the already described drawing, and the detailed explanation thereof may be omitted properly.

Hereinafter, semiconductor devices according to multiple embodiments will be explained. In order to facilitate understanding, in Embodiment 1, <Basic Example 1> of a semiconductor device that contains a CPU and a task control circuit is explained. In Embodiment 1, <Basic Example 2> of a semiconductor device to which a virtual queue algorithm is applied is explained. In <Basic Example 2>, out of the CPU and the task control circuit that are contained in the semiconductor device, the virtual queue algorithm is applied to the task control circuit. After explaining <Basic Example 1> and <Basic Example 2>, <a semiconductor device responding to a CPU interrupt request signal> is explained as an embodiment of the semiconductor device in which an interrupt request signal is supplied to the CPU. In the present specification, when described as Basic Example, it means both <Basic Example 1> and <Basic Example 2>, if it is not clearly indicated. The following explanation is given to the case where one CPU is contained in a semiconductor device, as a typical example. However, the number of CPUs is not restricted to one piece, but the semiconductor device may contain multiple CPUs and the CPUs may execute multiple tasks concurrently.

Embodiment 1

Figure 5:
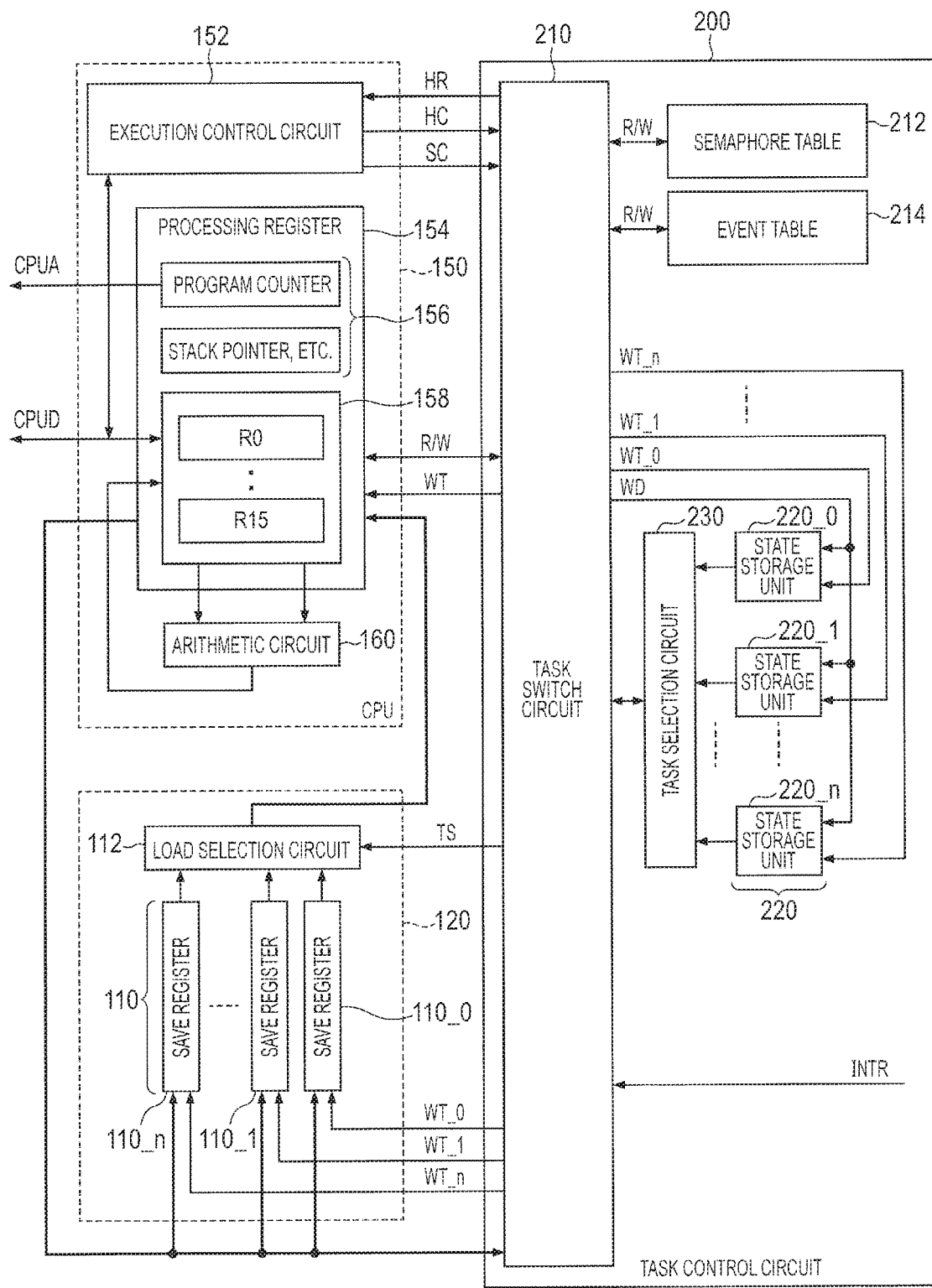
FIG. 5 is a circuit diagram of a semiconductor device according to Basic Example 1.

In FIG. 5, the reference numeral 100 indicates a semiconductor device. The semiconductor device 100 is comprised of multiple circuit blocks formed on one semiconductor substrate, for example. However, in FIG. 5, only circuit blocks necessary for the subsequent explanation are depicted and other circuit blocks are omitted.

<Basic Example 1>

In the semiconductor device 100, the task scheduling function of the multitasking OS is realized by an electronic circuit. Before explaining the details of the semiconductor device 100, task state transition is explained first with reference to FIG. 1. Here, the task state transition in a general multitasking OS is explained. However, the same applies to the task state transition by the semiconductor device 100. A system call to be executed in the semiconductor device 100 is also outlined. After describing the design concept of the general multitasking OS with reference to FIG. 2 and FIG. 3, the processing method in the semiconductor device 100 according to Basic Example 1 is explained in full detail, with reference to FIG. 4 to FIG. 10. Furthermore, the feature of the semiconductor device 100 in the processing on semaphore, mutex, an event, etc. is explained suitably, comparing with general technology.

<<Task State Transition>>

FIG. 1 is a state transition diagram of a task.

In the multitask processing, each task has a "state." Each task makes a transition among multiple states described later and is always in one of the states. A trigger of a state transition is "the execution of a system call" and "the detection of an interrupt request signal (start request signal)." The system call is a special instruction of the instructions that each task executes. The interrupt request signal is generated when prescribed data is received from the peripheral equipment, such as depression of a keyboard, a click of a mouse, and reception of communications data. Of course, when the time slice assigned to each task is consumed completely, a state transition also takes place.

A task is classified roughly into two kinds, a "general task" and a "special task." A general task is a usual task that is executed by the trigger of a system call. A special task is a task that is executed by the trigger of the detection of an interrupt request signal. It is the so-called interrupt handler. First, each task state is described and various kinds of system call instructions are explained.

(1) STOP State (Dormant State: Described as STOP in FIG. 1)

It indicates that a task is in a dormant state. A general task and a special task can be in the STOP state. Hereinafter, a task in the STOP state is called a "STOP-task."

(1)-1. A General Task

When a task executes a system call that instructs start of another task (hereinafter called a "start system call"), a general task in the STOP state makes a transition to a READY state (described as READY in FIG. 1) to be described later.

(1)-2. A Special Task

A special task is ordinarily in the STOP state. When an interrupt request signal is detected by a task switch circuit 210 to be described later, the special task makes a transition from the STOP state to a RUN state (described as RUN in FIG. 1) to be described later. A task in the RUN state at this time makes a transition to the READY state in turn.

(2) RUN State (Executing State)

It indicates that a task is under execution. That is, the task is in the state where the task is assigned a time slice and acquires the right of using of a CPU. A general task and a special task can be in the RUN state. Hereinafter, a task in the RUN state is called a "RUN-task." Among multiple tasks, only one task can be in the RUN state always, and two tasks cannot be in the RUN state simultaneously.

(2)-1. A General Task

A general task in the RUN state makes a transition from the RUN state to the READY state or a WAIT state (described as "WAIT" in FIG. 1) to be described later, when a predetermined system call is executed. A general task in the RUN state makes a transition to the READY state also when the time slice is consumed. In either case, a general task in the READY state makes a transition to the RUN state instead of a general task in the RUN state. When an interrupt request signal is detected, a RUN-task makes a transition to the READY state. At this time, a special task in the STOP state makes a transition to the RUN state.

When a RUN-task executes a system call to terminate oneself (hereinafter called a "stop system call"), the RUN-task makes a transition to the STOP state.

(2)-2. A Special Task

A special task that has made a transition from the STOP state to the RUN state in response to an interrupt request signal returns to the STOP state after completing the own processing. The state that a special task can exist is only the STOP state and the RUN state.

(3) READY State (Executable State)

It indicates that a task is in an executable state. A task in the READY state can make a transition to the RUN state at any time when an execution right is granted by the OS. Only a general task can be in the READY state. Hereinafter, a task in the READY state is called a "READY-task."

When a general task in the RUN state makes a transition to a state other than the RUN state by execution of a system call, or when a special task in the RUN state terminates the own processing and makes a transition to the STOP state, a READY-task makes a transition to the RUN state in turn. A general task makes a transition only from the READY state to the RUN state. When multiple tasks are in the READY state, one of the READY-tasks makes a transition to the RUN state, according to the task priority that is a part of the context information. When multiple READY-tasks have the same task priority, an oldest task among the tasks that have shifted to the READY state makes a transition to the RUN state.

(4) WAIT State (Standby State)

It indicates that a task is waiting for satisfaction of a predetermined WAIT cancelling condition. When the WAIT cancelling condition is satisfied, the task in the WAIT state makes a transition to the READY state. Only a general task can be in the WAIT state. Hereinafter, a task in the WAIT state is called a "WAIT-task." The WAIT cancelling condition will be explained in full detail later.

When what is described above is summarized, each task can advance its processing using the CPU, only when it is in the RUN state. The RTOS switches a RUN-task properly, controlling the state of multiple tasks. Accordingly, a processing mode in which the CPU executes one of the tasks always is realized.

<<System Call>>

Next, an additional remark is given to a system call. The system call is classified roughly into three kinds, a "start group", a "WAIT group", and a "SET group."

(1) A Start-Group System Call

It is a system call relevant to transition between the STOP state and the READY state.

(1)-1. A Start System Call

It is a system call that TASK A as a RUN-task starts another general TASK B. At this time, a general TASK B in the STOP state makes a transition to the READY state.

(1)-2. A Stop System Call

A task that has executed this system call terminates the own processing, and makes a transition from the RUN state to the STOP state. The stop system call may be an instruction that a certain task terminates another task.

(2) A WAIT-Group System Call

It is a system call relevant to transition between the RUN state and the WAIT state.

(2)-1. A Wait Semaphore System Call

It is a system call to request acquisition of a semaphore to be described later.

(2)-2. A Wait Mutex System Call

It is a system call to request acquisition of a mutex to be described later.

(2)-3. A Wait Event System Call

It is a system call to wait for realization of an event to be described later. The wait event system call is executed with variables such as an event ID, a wait flag pattern (to be described later), and flag conditions (to be described later).

In either case, various WAIT cancelling conditions are set up by the WAIT-group system call. In the time of execution of the WAIT-group system call, when the WAIT cancelling condition is already satisfied, the RUN-task that has executed the system call makes a transition to the READY state. On the other hand, when the WAIT cancelling condition is not yet satisfied, the RUN-task makes a transition to the WAIT state and waits for the satisfaction of the WAIT cancelling condition.

(3) A SET Group System Call

It is a system call relevant to transition between the WAIT state and the READY state. Execution of a SET group system call acts as a trigger to satisfy the WAIT cancelling condition.

(3)-1. A Release Semaphore System Call

It is a system call to release a semaphore.

(3)-2. A Release Mutex System Call

It is a system call to release a mutex.

(3)-3. A Set Event System Call

It is a system call to set up a current flag pattern (to be described later) of an event.

(3)-4. A Clear Flag System Call

It is a system call to clear the current flag pattern to zero.

In the present specification, nine kinds of system calls in total as described above are explained; however, it is needless to say that various system calls other than the ones described above can be implemented.

<<Design Concept of a General RTOS>>

Figure 2:
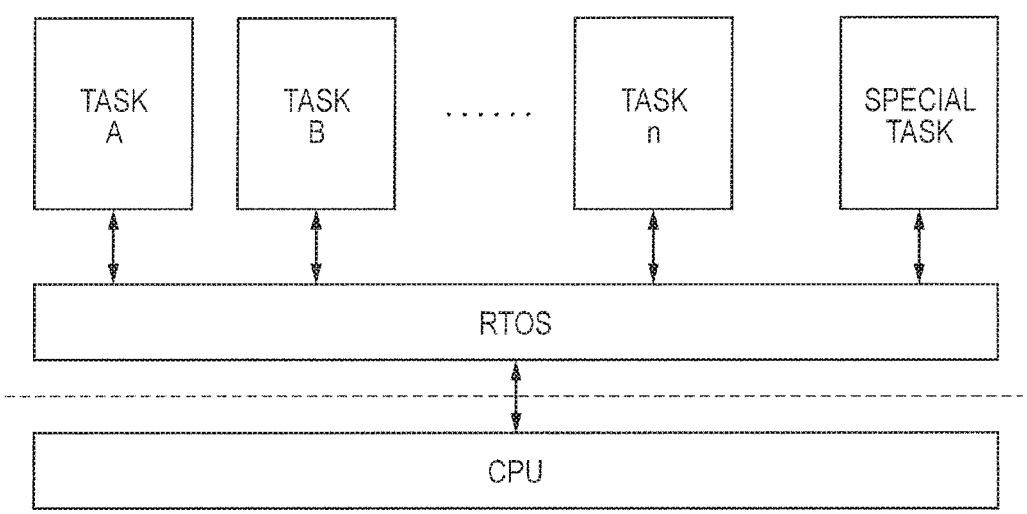
FIG. 2 is a conceptual diagram of an RTOS.

FIG. 2 is a conceptual diagram of a general RTOS.

This RTOS is a multitasking OS. The general RTOS is realized by software. The case where a RUN-task is switched from TASK A to TASK B is explained as an example. Since TASK A occupies the CPU, the RTOS issues an interrupt to the CPU to oust TASK A from the right of using of the CPU. In addition, the context information of TASK A is saved to the TCB (Task Control Block). The RTOS selects TASK B as a next RUN-task, and loads the context information from the TCB of TASK B to the register of the CPU. When loading is completed, the RTOS passes the right of using of the CPU to TASK B. In this way, the RTOS executes the task switch from TASK A to TASK B by acquiring the right of using of the CPU temporarily. The same applies to the execution of a special task. In this case, the task switch is realized by passing the right of using of the CPU to the special task after evacuating the context information of the RUN-task to the TCB.

The RTOS is realized by software; therefore, the RTOS requires the right of using of the CPU in order to execute own processing. In other words, the RTOS and a task are in a competitive relation with regard to the use of the CPU. Hereinafter, the RTOS realized by software in this way is called a "software RTOS."

Figure 3:
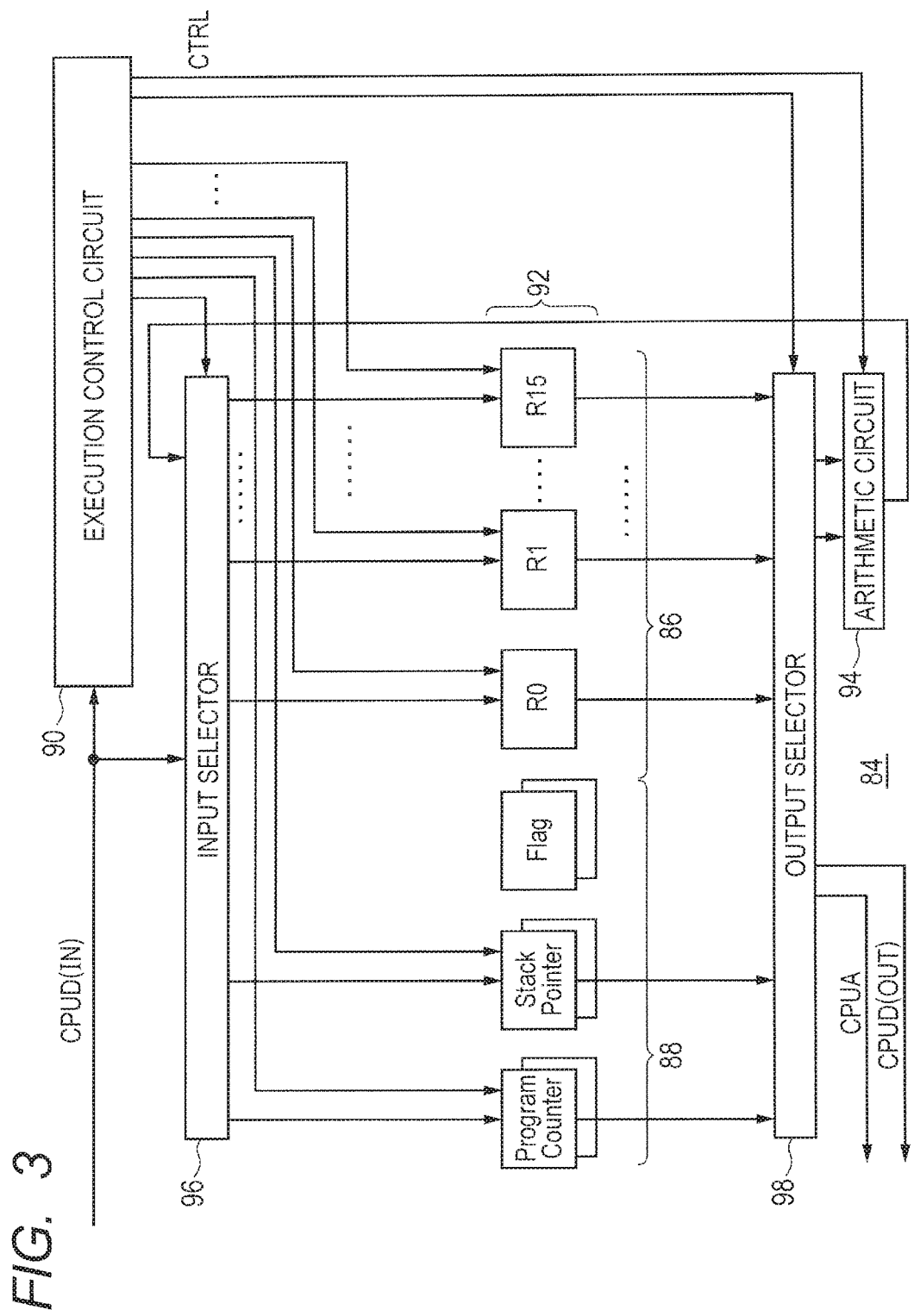
FIG. 3 is a circuit diagram of a CPU in which a software RTOS is executed.

FIG. 3 is a circuit diagram of a general CPU in which the software RTOS is executed.

The CPU 84 includes an execution control circuit 90 that exercises control over memory access and execution of an instruction, a processing register 92 that stores various kinds of data such as context information of a task, and an arithmetic circuit 94 that executes arithmetic. The processing register 92 is a set of several kinds of registers, and is classified roughly into a special register 88 and a general-purpose register 86. The special register 88 includes a program counter, a stack pointer, and a flag. The general-purpose register 86 holds data for work and includes 16 registers R0-R15 in total. The special register 88 has two pages, a user page and a system page. However, the general-purpose register 86 has only one page. Hereinafter, the data stored in the processing register 92 is called "processing data."

The execution control circuit 90 supplies a control signal (CTRL) to an output selector 98 so as to output the processing data of a desired register of the processing register 92 to the arithmetic circuit 94. The arithmetic circuit 94 executes the arithmetic according to the processing data, that is, an instruction and a variable. The arithmetic result is outputted to an input selector 96. The execution control circuit 90 supplies the control signal (CTRL) to the input selector 96 so as to input the arithmetic result to a desired register of the processing register 92.

The execution control circuit 90 reads data from a memory via a CPU data bus (CPUD (IN)), and loads the read data properly to the processing register 92 via the input selector 96. Similarly, the execution control circuit 90 stores the processing data into the memory properly via a CPU data bus (CPUD (OUT)). The execution control circuit 90 executes a task, updating the program counter of the special register 88. In the figure, the symbol CPUA indicates the address bus for accessing the memory, etc.

When a task switch takes place, the execution control circuit 90 saves the processing data to the TCB that is an area on the memory. It is assumed that TASK A executes a system call and the task switch from TASK A to TASK B takes place. The RTOS acquires the right of using of the CPU triggered by the execution of the system call. Therefore, the CPU 84 operates eventually according to a program for the RTOS temporarily. The processing steps are as follows.

<<<Saving of the Context Information of TASK A>>>

1. The execution control circuit 90 switches the special register 88 from the user use to the system use. The processing data for the RTOS processing is loaded to the system page of the special register 88.

2. The execution control circuit 90 saves the data of the general-purpose register 86 to a stack (not shown).

3. The execution control circuit 90 loads the processing data for the RTOS from the storage medium (not shown) for example, from another register to the general-purpose register 86. In this stage, the processing data of the processing register 92 is replaced by the processing data for the RTOS completely.

4. The RTOS detects the TCB of TASK A from the memory, and writes the processing data saved to the stack into the TCB. The processing data of the user-use special register 88 is also written in the TCB as a part of the context information. In this way, the processing data of TASK A is saved to the TCB. The RTOS records the fact that TASK A has made the state transition from "RUN" to "READY (or WAIT)", into the TCB of TASK A.

<<<Load of the Context Information of TASK B>>>

1. The RTOS detects the TCB of TASK B from the memory, and writes the context information of the TCB in the stack and the special register 88. The RTOS records the fact that TASK B has made the state transition from "READY" to "RUN", into the TCB of TASK B.

2. The RTOS saves the processing data for the RTOS processing from the general-purpose register 86 to the recording medium (not shown).

3. The execution control circuit 90 loads the context information of the stack to the general-purpose register 86. The execution control circuit 90 switches the special register 88 from the system page to the user page. In this way, the processing data of TASK B are loaded to the processing register 92.

The task switch is realized through the processing steps described above. Usually, the general-purpose register 86 has one page; therefore, the stack is used in order to switch the processing data for the task and the processing data for the RTOS. When the general-purpose register 86 is designed to have two pages, it becomes unnecessary to perform the saving and loading via the stack. Accordingly, it is possible to realize a much faster task switch.

In Basic Example 1, the much faster task switch is realized by further providing a save register 110 for every task. The task switch using the save register 110 is explained in full detail with reference to FIG. 5. In the case of the CPU 84 and the general software RTOS explained with reference to FIG. 3, it is seen that the access to the TCB arises frequently when performing the task switch. The illustrative example described above is explained assuming that the task switch is executed from TASK A to TASK B. However, in practice, even when the RTOS selects TASK B as a task to be executed next, it is necessary to execute many instructions. Also at this time, the RTOS accesses the memory frequently. In the semiconductor device 100 in Basic Example 1, a task control circuit 200 to be described later executes a task selecting exclusively. Accordingly, the much faster task switch is realized.

<Realization of the RTOS in the Semiconductor Device 100 by Hardware>

Figure 4:
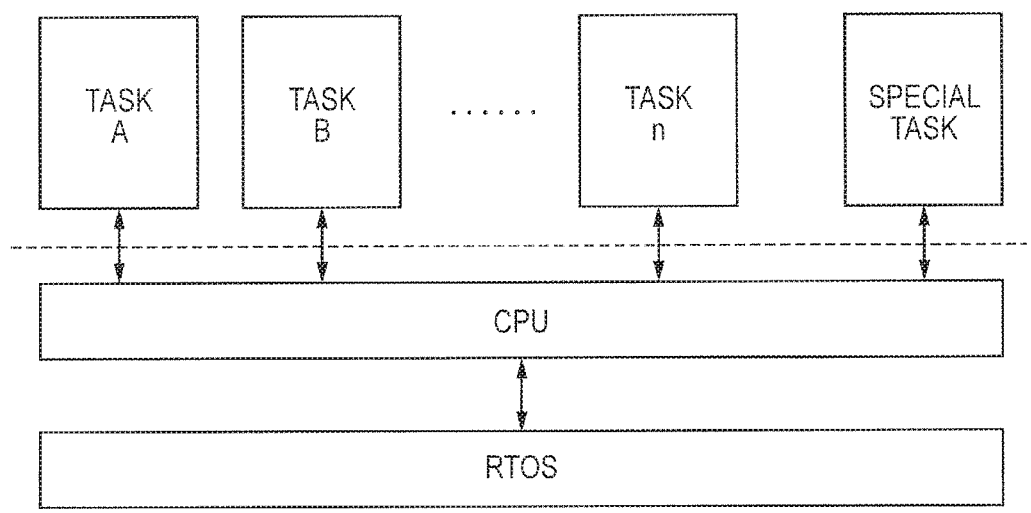
FIG. 4 is a conceptual diagram of an RTOS according to Embodiment 1.

FIG. 4 is a conceptual diagram of the RTOS in Basic Example 1.

Unlike the general software RTOS, the RTOS in Basic Example 1 is realized mainly as separate hardware from the CPU. Hereinafter, the RTOS realized by hardware is called a "hardware RTOS." The RTOS in Basic Example 1 is mainly the separate hardware from the CPU; accordingly, it does not require substantially the right of using of the CPU in order to execute its own processing. In other words, the RTOS and a task are almost not in a competitive relation with regard to the use of the CPU. In the case of the general software RTOS illustrated in FIG. 2, the CPU is a task execution circuit and at the same time, an RTOS execution circuit. On the other hand, in the case of the hardware RTOS in Basic Example 1, the CPU is clarified as a task execution circuit and the task scheduling function can be realized mainly by the save circuit 120 and the task control circuit 200 to be described later.

FIG. 5 is a circuit diagram of a semiconductor device 100 in Basic Example 1.

The semiconductor device 100 includes a CPU 150, a save circuit 120, and a task control circuit 200. The CPU 150 is an execution subject of a task, and the save circuit 120 and the task control circuit 200 play the role of the RTOS illustrated in FIG. 4. The task scheduling is led by the task control circuit 200.

The CPU 150 includes an execution control circuit 152, a processing register 154, and an arithmetic circuit 160. The CPU 150 may be a general CPU explained with reference to FIG. 3. However, the CPU 150 in Basic Example 1 has the connection method of signal lines, etc. that is changed a little from the CPU 84 illustrated in FIG. 3. The concrete circuit configuration thereof is explained in full detail with reference to FIG. 6.

The task control circuit 200 includes a task switch circuit 210, a semaphore table 212, an event table 214, a task selection circuit 230, and a state storage unit 220. The semaphore table 212 and the event table 214 are explained in full detail with reference to FIG. 12 and the subsequent figures. The state storage unit 220 is a set of units each corresponding to each task. Hereinafter, the state storage unit 220 corresponding to TASK A is labeled as a "state storage unit 220_A." Each state storage unit 220 holds task state data.

The state data indicates the attributes of a task, such as task priority and a state in particular, among the context information. The contents of concrete data are described later with reference to FIG. 10. From the state storage unit 220, all the state data of all the tasks are outputted always to the task selection circuit 230. The task selection circuit 230 performs various kinds of task selections, such as selection of a RUN-task, based on each task state data. The task selection circuit 230 is also explained in full detail with reference to FIG. 10 and the subsequent figures. The task switch circuit 210 executes the task switch, when a system call signal (SC) received from the execution control circuit 152 and an interrupt request signal (INTR) received from an external device are detected.

In Basic Example 1, a line of the interrupt request signal is supplied to the task switch circuit 210. However, it is changed in an interrupt processing circuit realized mainly by hardware to be explained in detail later.

The execution control circuit 152 transmits a system call signal (SC) to the task switch circuit 210 at the time of executing the system call. When the task switch circuit 210 detects an interrupt request signal (INTR), the task switch circuit 210 asserts a halt request signal (HR) to the execution control circuit 152. The execution control circuit 152 asserts a halt completion signal (HC) to the task switch circuit 210, when the operation of the CPU 150 has stopped. With these three kinds of signals, the CPU 150 and the task control circuit 200 performs a linkage operation.

The save circuit 120 includes a load selection circuit 112 and a save register 110. The save register 110 also includes a set of units each corresponding to each task, and serves as a register for evacuating the processing data of the processing register 154. Therefore, the save register 110 has the data volume equal to or more than the processing register 154. Hereinafter, the save register 110 corresponding to TASK A is labeled as an "save register 110_A." When instructed by the task switch circuit 210, the load selection circuit 112 loads the data of one unit of the save register 110 to the processing register 154 (hereinafter, the data held by the save register 110 is called the "save data").

Each unit of the save register 110 always outputs each save data to the load selection circuit 112. When the task switch circuit 210 inputs a task selection signal (TS) that specifies a task ID to the load selection circuit 112, the load selection circuit 112 outputs the save data of the save register 110 corresponding to the specified task, to the processing register 154. When the task switch circuit 210 supplies a write signal (WT) to the processing register 154, the save data is actually loaded to the processing register 154.

On the other hand, all the processing data of the processing register 154 are also always outputted to all the save registers 110. When the task switch circuit 210 asserts the write signal (WT) to the desired save register 110, the processing data is saved to the save register 110. Here, the number of bits that the bus coupling the processing register 154 with each save register 110 can transmit at once is set up so that the processing data can be transferred in parallel. Therefore, the task switch circuit 210 transmits the write signal to the save register 110 only once, and can write the processing data into the save register 110 at once. The number of bits of the bus coupling the save register 110 with the load selection circuit 112 and the number of bits of the bus coupling the load selection circuit 112 with the CPU 150 are set up similarly.

Hereinafter, how to execute the task switch for each of the system call and the interrupt request signal is explained.

<<Execution of the System Call>>

When the execution control circuit 152 of the CPU 150 executes the system call, the execution control circuit 152 halts a clock of the CPU 150 (hereinafter called a "CPU clock (CLK)"). A concrete halting method is described later in full detail with reference to FIG. 7 and other figures. The execution control circuit 152 transmits the system call signal (SC) indicative of the execution of the system call to the task switch circuit 210 of the task control circuit 200. When the CLK completes the halt, the execution control circuit 152 asserts the halt completion signal (HC) to the task switch circuit 210.

Nine signal lines are coupled between the CPU 150 and the task switch circuit 210, for the purpose of transmission of the system call signal. Nine signal lines correspond to nine kinds of system calls described previously. The execution control circuit 152 transmits a digital pulse through one of the system call signal lines in response to the kind of the system call executed. The task switch circuit 210 can detect immediately the kind of the system call executed, according to a signal line from which the digital pulse is detected among nine system call signal lines.

Responding to the kind of the system call, the task switch circuit 210 selects necessary data from the output data of the task selection circuit 230, and executes the processing instructed by the system call. This processing is executed on the condition that the HC has been asserted. The relation between the task switch circuit 210 and the task selection circuit 230 is explained in full detail with reference to FIG. 10. A parameter and a return value of the system call are written in a predetermined general-purpose register 158 of the processing register 154. The task switch circuit 210 can execute the read of the parameter or the write of the return value to the general-purpose register 158. Here, it is assumed that TASK A as the RUN-task executes the wait semaphore system call. Therefore, it is necessary to save the processing data of TASK A first.

<<<Saving of the Context Information of TASK A>>>

The execution control circuit 152 inputs into the task switch circuit 210 the SC signal indicative of a wait semaphore system call. The execution control circuit 152 halts the CLK. When the halt is completed, the execution control circuit 152 asserts the HC. The task switch circuit 210 outputs a semaphore ID of the semaphore as a waiting candidate to a semaphore selection circuit 234 (to be described later) among various kinds of selection circuits included in the task selection circuit 230. After that, the task switch circuit 210 selects TASK B to be executed subsequently. The task switch circuit 210 writes the prescribed data into the state storage unit 220_A. For example, the setup is changed from "RUN" to "READY" or "WAIT" as the state of TASK A. More specifically, the task switch circuit 210 outputs "WAIT" as the data indicative of the task state among the state data, to all the state storage units 220. After that, the task switch circuit 210 inputs a write signal (WT_A) only into the state storage unit 220_A. In this way, the setup of the state of TASK A is changed.

Next, the task switch circuit 210 outputs the write signal (WT) to the save register 110_A. The processing data of the processing register 154 are always outputted to each save register 110. Therefore, the processing data is saved to the save register 110_A of TASK A in response to this write signal (WT).

<<<Load of the Context Information of TASK B>>>

When the modification of the state data of TASK A and the save of the processing data are completed, the task switch circuit 210 outputs the task selection signal (TS_B) that specifies TASK B to the load selection circuit 112. Accordingly, the save data of the save register 110_B is outputted to the processing register 154. When the task switch circuit 210 outputs the write signal (WT) to the processing register 154, the save data of TASK B is loaded to the processing register 154. The task switch circuit 210 writes the prescribed data into the state storage unit 220_B of TASK B. For example, it is assumed that the setup of the state of TASK B is changed from "READY" to "RUN." When the above processing is completed, the execution control circuit 152 resumes the CPU clock. The CPU 150 starts the execution of TASK B by the resumed CPU clock. The further details of the processing method are described later with reference to FIG. 8B.

<<Generation of the Interrupt Request Signal>>

The task switch circuit 210 detects the interrupt request signal (INTR) from the peripheral equipment. More specifically, the interrupt request signal (INTR) is transmitted from an interrupt controller (not shown) to the task switch circuit 210. The parameter indicative of the level of the interrupt request signal (INTR) is recorded in a register included in the interrupt controller. The task switch circuit 210 asserts the halt request signal (HR) to the execution control circuit 152, and the execution control circuit 152 halts the CPU clock. In the same manner as in the system call execution, the task switch circuit 210 saves the processing data of the RUN-task to the save register 110. Next, the task switch circuit 210 activates a special task. The special task to be activated is of one kind, irrespective of the parameter of the interrupt request signal. The special task reads the parameter of the INTR from the built-in register of the interrupt controller, and executes the processing corresponding to the parameter. The processing that the special task executes may be execution of the set event system call or the set semaphore system call, or may be the activation of a general task. Depending on the parameter, the special task may terminate itself without executing the special processing. It depends on the implementation of the special task that what kind of processing is executed according to the parameter of the INTR. When the special task terminates the execution, the next RUN-task is selected from the READY-tasks.

The task switch circuit 210 makes the CPU 150 load the processing data of the save register 110 corresponding to the special task. The time required for switching from such a general task to a special task can be estimated in advance by use of the operation clock of the task control circuit 200. When the operation clock of the task switch circuit 210 passes by a predetermined clock after asserting the HR to the execution control circuit 152, the task switch circuit 210 negates the HR in order to release the halt of the CPU clock. When the HR is negated, the execution control circuit 152 makes the CPU clock resume. At this time, the task switch from the general task to the special task is completed by the task switch circuit 210. The details of the processing method are described later with reference to FIG. 8A.

In either case, the following processing as the core of the task switch is realized by hardware:

(A) the saving and the loading of the processing data, and
(B) the task state transition and the selection of the RUN-task.

Elimination of the need for accessing the TCB on the memory with regard to (A) and (B) also contributes to the speeding up of the task switch. In realizing the semiconductor device 100, what is necessary for the CPU 150 is just to add the function to stop and resume the CPU clock. The fact that all of these functions are realized by hardware does not restrict the range of the present invention. For example, the main function of (A) or (B) may be realized by hardware and a part of the RTOS may be realized by software in order to assist the function of the hardware. This is readily understood by the person skilled in the art.

Figure 6:
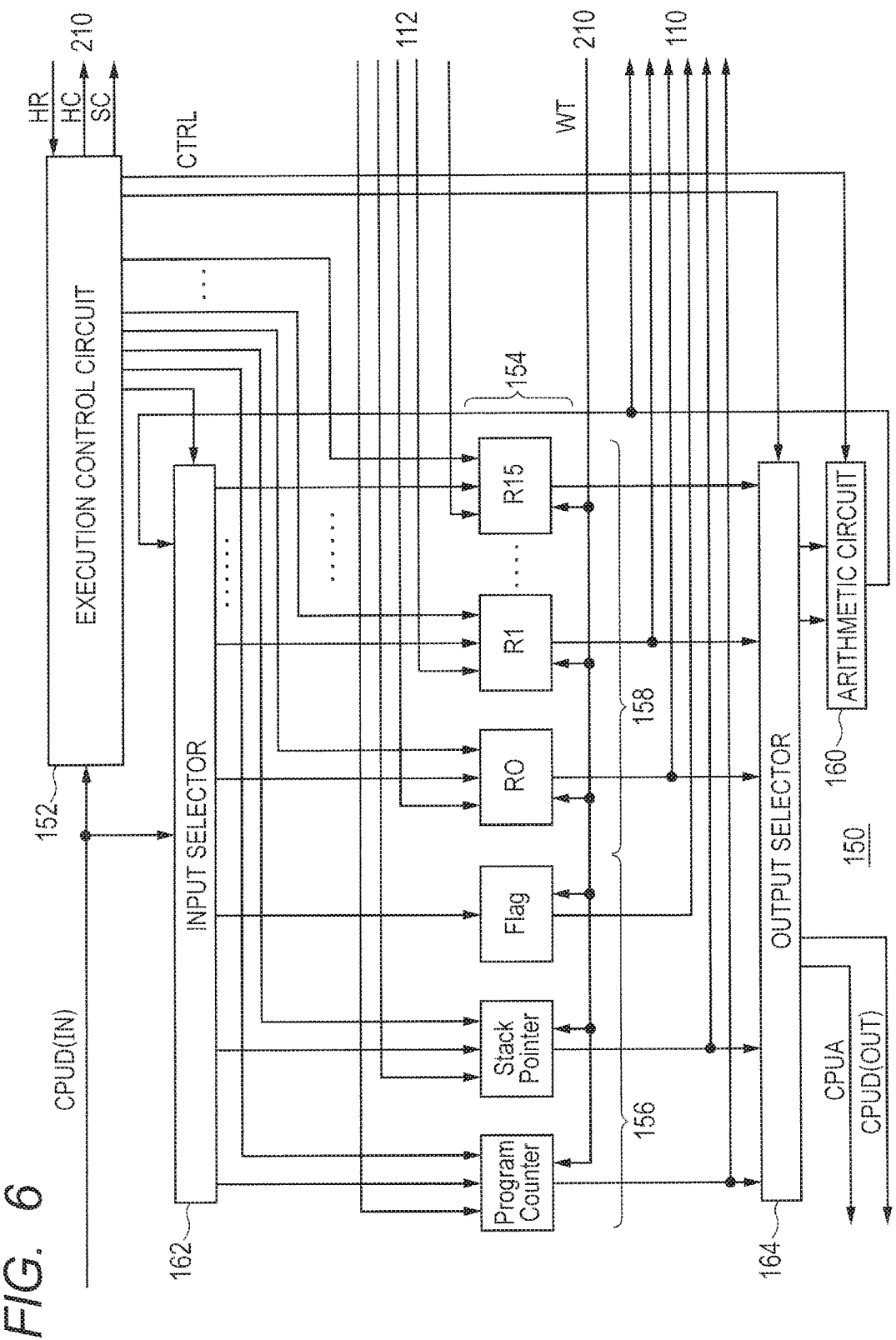
FIG. 6 is a circuit diagram of a CPU according to Basic Example 1.

FIG. 6 is a circuit diagram of the CPU 150 illustrated in FIG. 5.

Different from the CPU 84 illustrated in FIG. 3, in the processing register 154, a special register 156 and a general-purpose register 158 are both configured with one page. Each of the processing register 154 is added with an input bus from the load selection circuit 112, an output bus to the save register 110, and a signal line for the write signal (WT) from the task switch circuit 210. By means of the control signal (CTRL) for the output selector 164, the execution control circuit 152 inputs the data of a desired register of the processing register 154 into the arithmetic circuit 160. The arithmetic result serves as an input to the input selector 162. By means of the control signal (CTRL) for the input selector 162, the execution control circuit 152 inputs the arithmetic result to a desired register of the processing register 154. The execution control circuit 152 executes the task, updating a program counter of the special register 156.

The processing data is saved not to the TCB on the memory but to the save register 110. From the processing register 154, the processing data is always outputted to each save register 110. As described above, it is the task switch circuit 210 that controls at which timing and to which save register 110 the processing data is actually saved.

The save data is loaded to the processing register 154 not from the TCB on the memory but from the save register 110. As described above, it is the task switch circuit 210 that controls at which timing and from which save register 110 the processing data is actually loaded.

The bus that couples the processing register 154 and the load selection circuit 112 and the bus that couples the processing register 154 and the save register 110 have the number of bits by which the processing data can be transferred in parallel at once. Therefore, read and write are possible at once by the write signal (WT) supplied by the task switch circuit 210. The general software RTOS needs to occupy the processing register 154 temporarily on the occasion of the task switch. On the other hand, the hardware RTOS in Basic Example 1 does not need to load the special processing data for the task switching to the processing register 154. When switching from TASK A to TASK B, it is only necessary to load the processing data of TASK B after evacuating the processing data of TASK A. Accordingly, it is not necessary to provide two pages of the system page and the user page to the processing register 154, or to execute replacement processing of data via a stack.

FIG. 7 is a circuit diagram illustrating the mechanism in which the execution control circuit 152 halts the CPU clock.

The inputs of a second AND gate 174 are an original clock (CLKO) and an output of a first AND gate 172, and the latter is a negative logic. The output of the first AND gate 172 is the halt completion signal (HC). Since the halt completion signal (HC) is usually "0", the second AND gate 174 outputs the inputted original clock (CLKO) as it is as the CPU clock (CLK). The CPU 150 operates in response to the CPU clock outputted by the second AND gate 174. When the output of the first AND gate 172 is "1", that is, at the time of the halt completion signal (HC)=1, the output of the second AND gate 174 is fixed to "0" and the CPU clock (CLK) stops.

The input to the first AND gate 172 is an output of an OR gate 176 and a CPU busy signal (CBUSY), and the latter is a negative logic. The CBUSY is a signal outputted from the known state machine to generate the internal cycle of the CPU 150, and becomes "0" when the CPU 150 is ready to halt. For example, when the arithmetic circuit 160 completes a single instruction under execution or the last instruction of locked multiple instructions and the CPU becomes ready to halt, or when the supply of the CPU clock is already stopped, the CBUSY becomes "0."

The inputs of the OR gate 176 are an output (SC_DETECT) of an instruction decoder 170 and the halt request signal (HR) supplied by the task switch circuit 210. The instruction decoder 170 contains a latch circuit to hold the SC_DETECT. The instruction decoder 170 inputs data (FD) fetched from the CPU 150, and outputs SC_DETECT=1 when the FD is a system call instruction. Even if the FD changes after that, the instruction decoder 170 continuously outputs SC_DETECT=1, with the aid of the built-in latch circuit. The write signal (WT) for the processing register 154 of the task switch circuit 210 is also inputted into the instruction decoder 170. When the WT changes from 0 to 1, loading of the save data to the processing register 154 is executed, as described previously. This WT is a pulse signal that returns from 1 to 0 after a prescribed period of time. When the WT changes from 1 to 0, the latch circuit of the instruction decoder 170 is reset and the instruction decoder 170 negates the SC_DETECT. The relation between the SC_DETECT and the write signal (WT) is explained in full detail with reference to FIG. 8B. The instruction decoder 170 of the present example is a device provided in the execution control circuit 152 for exclusive use, in order to determine whether the execution-targeted instruction is a system call. As a modified example, the instruction decoder 170 may be shared with a CPU decoder that takes charge of the decode stage of the CPU 150. In this case, the instruction decoder 170 can be realized by adding to the CPU decoder the function that outputs SC_DETECT=1 when the decoded data is a system call instruction.

When the interrupt request signal (INTR) is generated, the task switch circuit 210 asserts the halt request signal (HR) to the execution control circuit 152. That is, the output of the OR gate 176 is set to "1", when the system call is executed or the halt request signal (HR) is asserted.

In summary, when the system call is executed or the interrupt request signal is generated and when the CPU busy signal is set to "0", the output of the first AND gate 172 is set to "1" and the CPU clock is no longer outputted from the second AND gate 174.

Figure 8A:
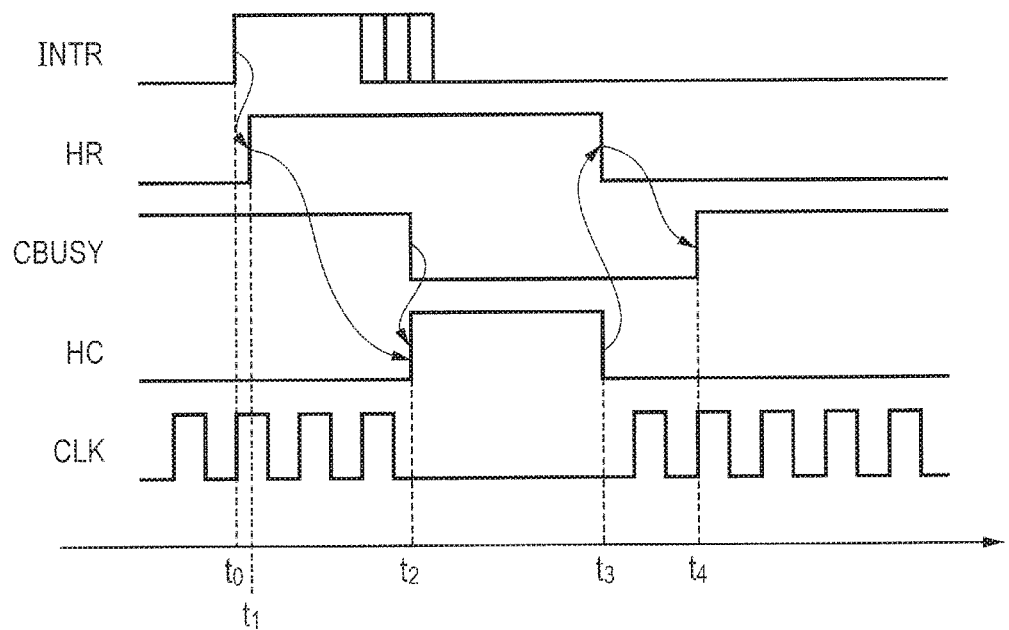
FIG. 8A and FIG. 8B are timing charts according to Basic Example 1.

FIG. 8A is a timing chart illustrating the relation of the various kinds of signals when the interrupt request signal is generated.

In the figure, first, at Time t0, the task switch circuit 210 detects the interrupt request signal (INTR) supplied from the exterior. The task switch circuit 210 asserts the halt request signal (HR) to the execution control circuit 152 in order to execute the special task. The input timing t1 is almost simultaneous with the detection timing t0. At Time t1, the state machine of the CPU 150 is "under execution of the task", and CBUSY=1. The OR gate 176 outputs "1" responding to HR=1; however, CBUSY=1, and the CPU 150 does not stop. Therefore, even if HR=1 is inputted, the CPU clock (CLK) is outputted for the time being synchronizing with the original clock (CLKO).

Time passes and at Time t2, the CBUSY changes to CBUSY=0. At this time, HR=1, therefore, the first AND gate 172 outputs HC=1, and the CPU clock outputted from the second AND gate 174 is fixed to 0. On the other hand, the task switch circuit 210 starts the task switch from the general task to the special task, triggered by the assertion of the HC. Although described later in detail, time required for this task switch is several cycles of the operation clock of the task control circuit 200. On condition that the operation clock of the task control circuit 200 has changed a prescribed number of cycles after the HC has been asserted (Time t3), the task control circuit 200 negates the halt request signal (HR). Since HR=0, the execution control circuit 152 resumes the CPU clock (CLK). When the CPU 150 resumes the processing, the CPU 150 changes the CBUSY from 0 to 1 (Time t4). In this way, the task switch from the general task to the special task is executed for the period from Time t2 to Time t3 when the CPU clock halts.

As another processing method, the HR may be negated on condition that the task control circuit 200 has completed the task switch, instead of the condition that the operation clock of the task control circuit 200 has changed a prescribed number of cycles. Then, the execution control circuit 152 may negate the HC, on condition that the HR has been negated. The execution control circuit 152 resumes the CPU clock (CLK) when the HC becomes HC=0. In this way, the execution of the task may be resumed.

Figure 8B:
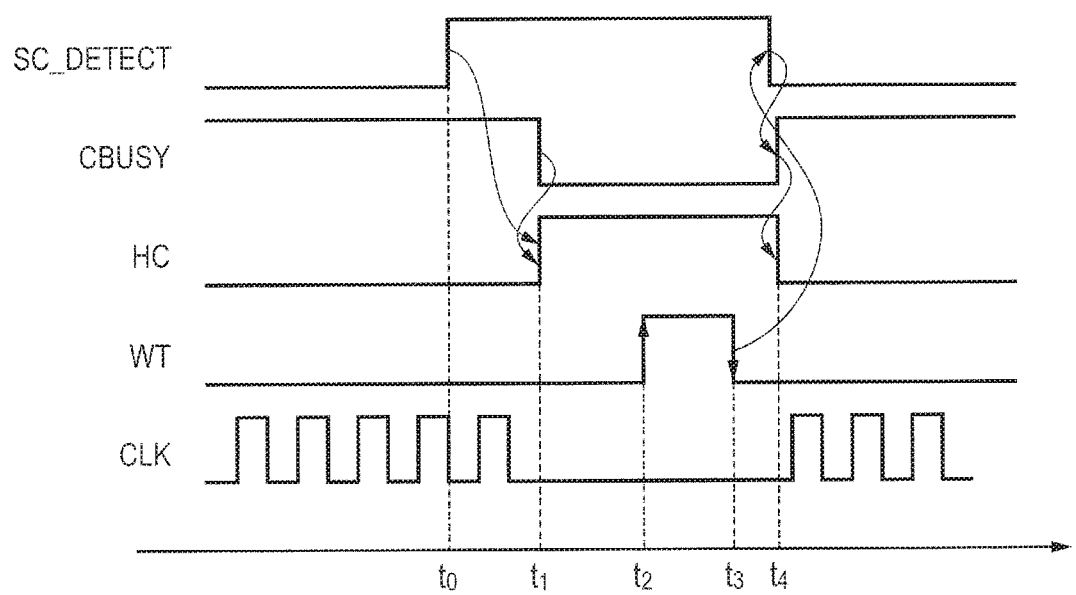

FIG. 8B is a timing chart illustrating the relation of various kinds of signals when the system call is executed.

In the figure, first, at Time t0, the instruction decoder 170 detects a system call and changes the SC_DETECT from 0 to 1. At Time t0, the state machine of the CPU 150 is "under execution of the task", and CBUSY=1. The OR gate 176 outputs "1" responding to SC_DETECT=1. However, CBUSY=1, and the CPU 150 does not stop. Therefore, even if SC_DETECT=1 is outputted, the CPU clock (CLK) is outputted for the time being synchronizing with the original clock (CLKO).

Time passes and at Time t1, the CBUSY changes to CBUSY=0. Since SC_DETECT=1 and CBUSY=0, the HC is negated and the CPU clock stops. When HC=0 is inputted, the task switch circuit 210 starts the task switching and outputs the write signal (WT) to the CPU 150. At Time t2 when the WT changes from 0 to 1, the save data is loaded to the processing register 154. The write signal (WT) is a pulse signal; accordingly, the Wt becomes WT=0 at Time t3 after the prescribed period of time. Triggered by the detection of the WT falling from 1 to 0, the SC_DETECT latched to the instruction decoder 170 is reset (Time t4). At this time, the CBUSY changes from 0 to 1. Since the CBUSY has changed to CBUSY=1, the HC is set to HC=0 and the CPU clock is resumed. The task switch is executed for the period from Time t1 to Time t4 when the CPU clock halts.

As another processing method, the execution control circuit 152 may negate the HC, on condition that the task control circuit 200 has completed the task switch and the HR has been negated, instead of the condition that the WT falling from 1 to 0 is detected. The SC_DETECT is reset on condition that the HC is set to HC=0. The execution control circuit 152 resumes the CPU clock (CLK), and the CBUSY changes from 0 to 1.

In either case, the CPU 150 does not need to recognize that switching of the RUN-task has been performed in the period when the CPU clock halts. The task switch circuit 210 performs the task switching during the period when the CPU clock stops and the CPU 150 freezes so to speak. Therefore, the processing of the CPU 150 and the processing of the task control circuit 200 are separated sequentially.

Figure 9:
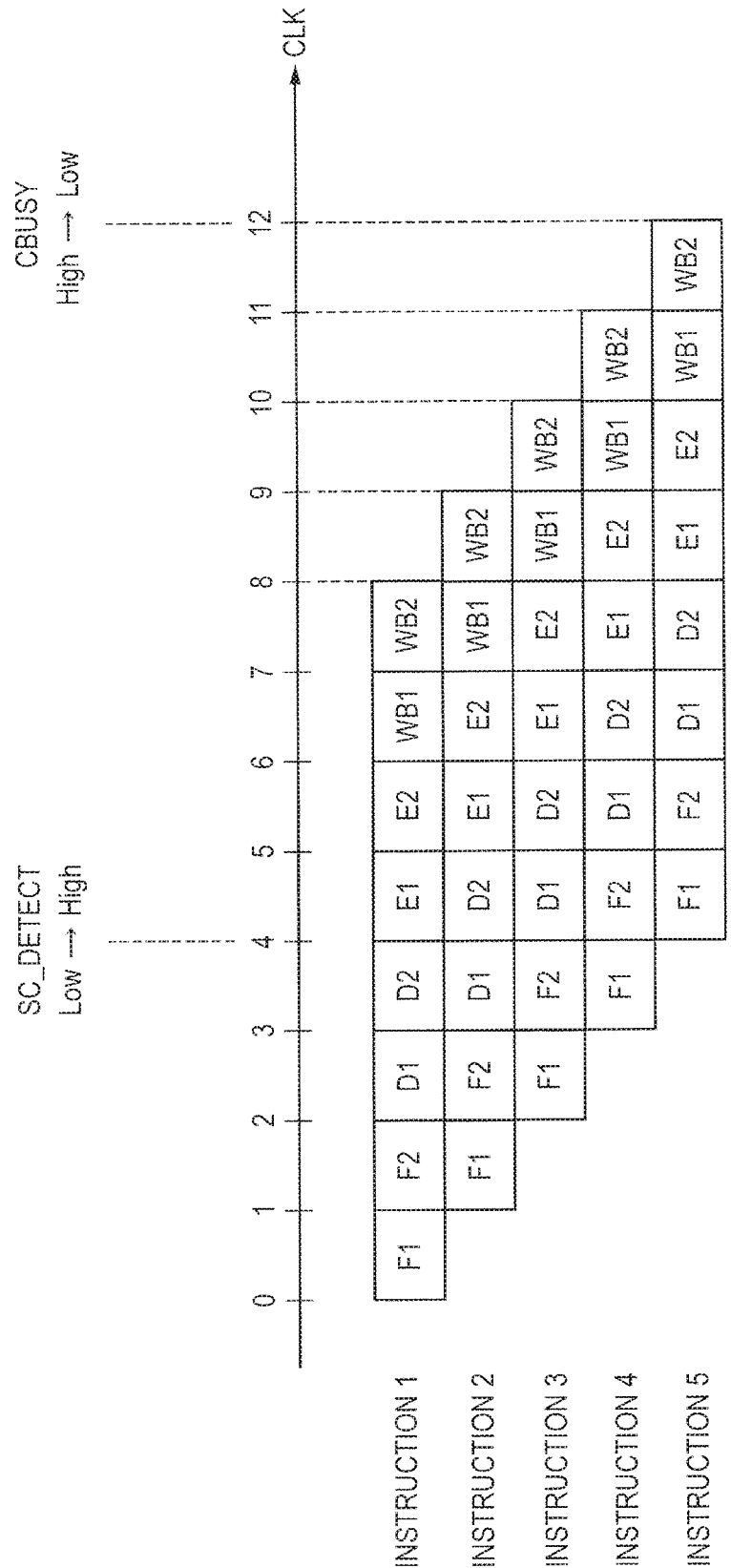
FIG. 9 is a schematic diagram explaining the stopping timing of a CPU clock in pipeline processing.

FIG. 9 is a schematic diagram explaining the stopping timing of the CPU clock in pipeline processing.

The CPU 150 executes a task by fetching multiple instructions sequentially from the memory to the processing register 154 and by executing the instructions. The instruction that is an execution unit of this task is decomposed into the following four phases.

1. F (fetch): To fetch an instruction from the memory.
2. D (decode): To interpret the instruction.
3. E (execute): To execute the instruction.
4. WB (write back): To write an execution result into the memory.

When a certain task executes sequentially from the instruction 1 to the instruction 5, after executing from F phase to WB phase of the instruction 1, F phase of the instruction 2 may be executed. However, for more efficient execution, the execution of the instruction 2 is started during the execution of the instruction 1 in many cases. Such a processing method is called the pipeline processing. For example, when the instruction 1 arrives at D phase, F phase of the instruction 2 is started. When the instruction 1 arrives at E phase, D phase of the instruction 2 and F phase of the instruction 3 are started. By increasing the number of the instructions executed per unit time in this way, the execution time for every task can be decreased.

Furthermore, each phase may be subdivided into two phases. For example, F phase is subdivided into two phases: F1 and F2. When the instruction 1 arrives at F2 phase, F1 phase of the instruction 2 is started. When the instruction 1 arrives at D1 phase, F2 phase of the instruction 2 and F1 phase of the instruction 3 are started. By the subdivision of the phase, the calculation resources of the CPU 150 can be utilized further efficiently. FIG. 9 explains the stopping timing of the CPU clock when a system call arises in the pipeline processing that is executed by subdividing each phase into two phases.

In the figure, the instruction 1 starts the processing at the timing of the CPU clock "0." The decode of the instruction 1 is completed at the timing of the CPU clock "4." It is assumed that the instruction 1 is a system call. The instruction decoder 170 changes the SC_DETECT from 0 to 1. The condition on which the SC_DETECT returns from 1 to 0 next is that the write signal (WT) from the task switch circuit 210 to the processing register 154 changes from 1 to 0. Even when the SC_DETECT becomes SC_DETECT=1, the CBUSY remains as CBUSY=1 because the instruction 2 to the instruction 5 are already under execution or already started. Therefore, the second AND gate 174 outputs the CPU clock next. However, the execution control circuit 152 stops the updating of the program counter when SC_DE- TECT=1, so that a new instruction may not be fetched. Therefore, the instruction 6 and the subsequent instructions are no longer fetched from the memory.

The execution of the instruction 1 is completed at the timing of the CPU clock "8", however, the instruction 2 to the instruction 5 are under execution, therefore, the CPU busy signal (CBUSY) is still "1." At the timing of the CPU clock "12", the execution of the instruction 5 is completed. At this time, the CPU busy signal is set to "0". In addition, the supply of the CPU clock is stopped according to the process relevant to FIG. 8B. The task switch circuit 210 saves the processing data that has completed up to the instruction 5 to the save register 110. According to such a stopping method, the task switch can be performed, without wasting the execution result of the instruction after the system call has been executed. When the task switch is completed, the CPU busy signal is again set to "1", and the processing of the instruction decoder 170 is also resumed. In this way, the CPU clock comes to be supplied again.

As another processing method, at the timing when the execution of the system call instruction is completed, the CPU busy signal may be set to "0" to stop the supply of the CPU clock. In this case, the other instructions that have been executed concurrently with the system call instruction stop in the middle of the execution. The intermediate processing result of the instruction that has been stopped in the middle to the execution is recorded in the processing register 154 and is saved to the save register 110. When this task becomes the RUN-task next time, the rest of the instruction that has been stopped in the middle of the execution is executed. For example, when a certain instruction has been stopped in the middle of the execution in the stage when the fetch is completed, the instruction and the operand that have been read from the memory are saved to the save register 110. At the time of resuming the task, the data of the save register 110 is loaded to the processing register 154, and the processing of the rest is executed from the decode stage.

<<The State Storage Unit and the Task Switch Circuit>>

Figure 10:
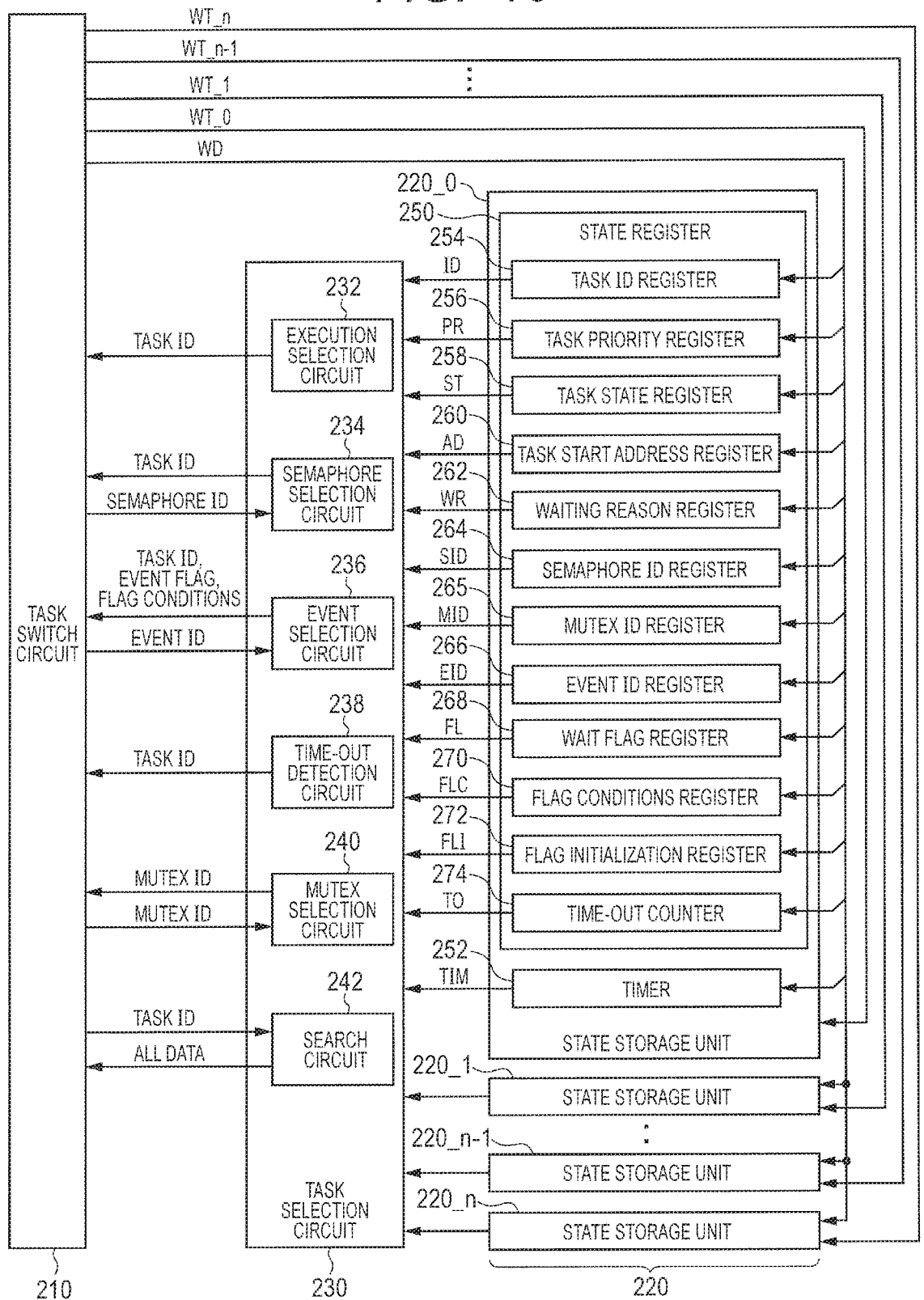
FIG. 10 is a circuit diagram illustrating the relation between a state storage unit and a task switch circuit according to Basic Example 1.

FIG. 10 is a circuit diagram illustrating the relation between the state storage unit 220 and the task switch circuit 210.

The state storage unit 220 includes a state register 250 and a timer 252. The state storage unit 220 holds task state data. The timer 252 starts when a task makes a transition to the READY state or the WAIT state. The time that has passed after the task has made a transition to the READY state is called a "READY elapsed time", and the time that has passed after the task has made a transition to the WAIT state is called a "WAIT elapsed time." The timer 252 always outputs its value as a TIM signal. On the occasion of the task switch, when a certain task changes to the READY state or the WAIT state, the task switch circuit 210 drives the timer 252 of the task to start time measurement.

The state register 250 in the state storage unit 220 is a set of the registers shown below.

(A) A task ID register 254: To hold a task ID. From the task ID register 254, an ID signal indicative of the task ID is always outputted to the task selection circuit 230. Hereinafter, the ID signal outputted from the task ID register 254 of TASK A to the task selection circuit 230 is written as an "ID_A signal." The same notation system is applied to other signals outputted from the state storage unit 220.

(B) A task priority register 256: To hold a task priority. From the task priority register 256, a PR signal indicative of the task priority is always outputted. "0" is the highest priority and a greater value indicates a lower task priority.

(C) A task state register 258: To indicate a task state. One of STOP, READY, RUN, WAIT, and IDLE is always outputted as an ST signal. IDLE is the state before the task is initialized.

(D) A task start address register 260: To indicate the TCB address of the task in the memory. The output is an AD signal.

(E) Awaiting reason register 262: To indicate the reason for waiting as a part of a WAIT cancelling condition, when the task is in the WAIT state. The waiting reason is one of "semaphore waiting", "event waiting", and "mutex waiting." The output is a WR signal.

(F) A semaphore ID register 264: To hold a semaphore ID of the semaphore for waiting (hereinafter, simply called a "waiting semaphore"), when the task is in the WAIT state for reasons of the semaphore waiting. The output is an SID signal.

(G) A mutex ID register 265: To hold a mutex ID of the mutex for waiting (hereinafter, simply called a "waiting mutex"), when the task is in the WAIT state for reasons of the mutex waiting. The output is an MID signal.

(H) An event ID register 266: To hold an event ID of the event for waiting (hereinafter, simply called a "waiting event"), when the task is in the WAIT state for reasons of the event waiting. The output is an EID signal.

(I) Await flag register 268: To hold a wait flag pattern, when the task is in the WAIT state for reasons of the event waiting. The output is an FL signal.

(J) A flag conditions register 270: To hold flag conditions, when the task is in the WAIT state for reasons of the event waiting. The output is an FLC signal. The wait flag pattern and the flag conditions are described later.

(K) A flag initialization register 272: To hold data indicative of the presence or absence of the wait flag pattern. The output is an FLI signal.

(L) A time-out counter 274: In the WAIT-group system call, the time-out value is specified as a variable. The time-out counter 274 holds the time-out value. The task switch circuit 210 decrements the time-out value of each time-out counter 274 periodically. The output is a TO signal. Instead of the task switch circuit 210 decrementing the time-out value, the time-out counter 274 itself may decrement autonomously the time-out value periodically.

The task selection circuit 230 selects a task based on various kinds of signals outputted from each state storage unit 220. The task selection circuit 230 includes circuits illustrated in the following.

(A) An execution selection circuit 232: To select the next RUN-task on the occasion of the task switch. The execution selection circuit 232 has always selected one of the tasks as the RUN-task based on the state data always outputted from the state storage unit 220. The input signal to the execution selection circuit 232 is four kinds of ID, ST, PR, and TIM. The output is a task ID of the next RUN-task. The detailed circuit configuration is explained in full detail with reference to FIG. 11.

(B) A semaphore selection circuit 234: To select the task that should make a transition from the WAIT state to the READY state by execution of the release semaphore system call. The semaphore ID of the semaphore released by the release semaphore system call (hereinafter, simply called a "release semaphore") is inputted from the task switch circuit 210. The input signal from the state storage unit 220 is six kinds of ID, ST, WR, PR, SID, and TIM. The output signal is the task ID of the task that makes a transition from the WAIT state to the READY state. If a pertinent task does not exist, a predetermined value, such as "−1", is outputted. A more concrete circuit configuration is explained in full detail with reference to FIG. 12.

(C) An event selection circuit 236: To select the task that makes a transition from the WAIT state to the READY state by execution of the set event system call. The event ID of the event set by the set event system call (hereinafter, simply called a "set event") is inputted from the task switch circuit 210. The input signal from the state storage unit 220 is six kinds of ID, ST, WR, EID, FL, and FLC. The output signal is the task ID of the task that makes a transition from the WAIT state to the READY state, and the FL and the FLC of the task.

(D) The time-out detection circuit 238: To detect a task in which the time-out value of the time-out counter 274 has become zero among the tasks in the WAIT state. The time-out detection circuit 238 is driven, whenever the time-out value is updated. The input signal of the time-out detection circuit 238 is three kinds of ID, ST, and TO. The output signal is the task ID of the pertinent task. If a pertinent task does not exist, a predetermined value, such as "−1", is outputted.

(E) A mutex selection circuit 240: To select the task which makes a transition from the WAIT state to the READY state by execution of the release mutex system call. The mutex ID of the mutex released by the release mutex system call (hereinafter simply called a "release mutex") is inputted from the task switch circuit 210. The input signal from the state storage unit 220 is six kinds of ID, ST, WR, PR, SID, and TIM. The output signal is the task ID of the task that makes a transition from the WAIT state to the READY state. If a pertinent task does not exist, a predetermined value, such as "−1", is outputted.

(F) A search circuit 242: To output all the state data of the task when the task ID is inputted from the task switch circuit 210.

The following explains about the selection of the RUN-task, the semaphore, the event, the mutex, and the time-out, in association with the task switch, in particular, centering on the processing of the task selection circuit 230 and comparing with the general technology.

<<Selection of the RUN-Task>>

A task-ready list is utilized when selecting the RUN-task by the general software RTOS. The example of this task-ready list is disclosed in FIG. 11 of Patent Literature 1. As explained in relation to FIG. 11 of Patent Literature 1, in the general software RTOS, the task switch is executed with the use of the task-ready list. In this case, the software RTOS chooses a RUN-task from multiple READY-tasks on the following policy.

1. It is a READY-task (the first condition).
2. It is a task with the highest task priority among the READY-tasks (the second condition).
3. When multiple tasks with the highest task priority exist, it is the oldest task in time when the task has become in the READY state (the third condition).

In Patent Literature 1, these three conditions are collectively called as the "RUN-task selection condition." The present specification also follows this. The execution selection circuit 232 of the task selection circuit 230 according to Basic Example 1 realizes such task scheduling function of the RTOS by hardware.

<<<Selection of the RUN-Task by the Hardware RTOS according to Basic Example 1>>>

Figure 11:
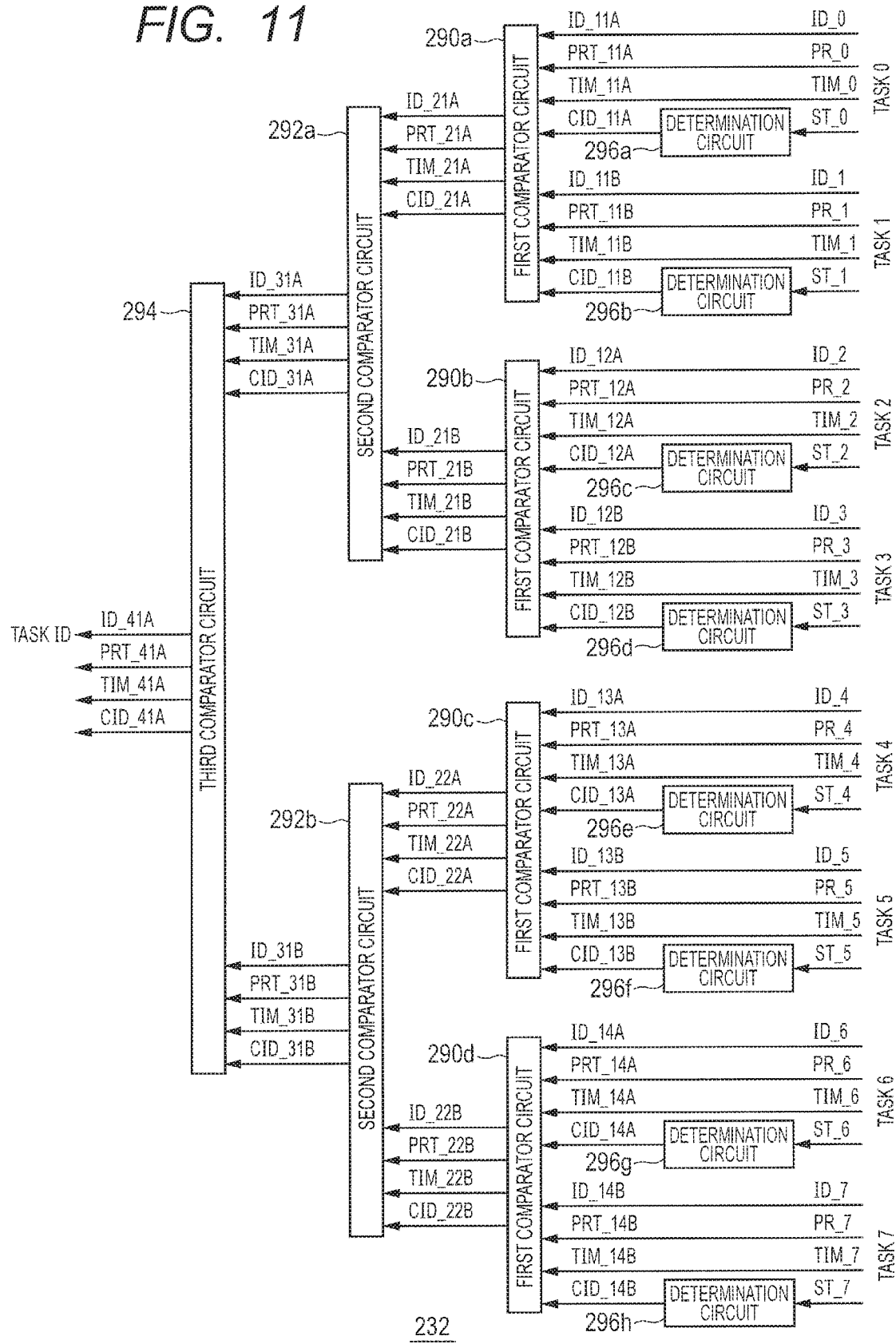
FIG. 11 is a circuit diagram of an execution selection circuit according to Basic Example 1.

FIG. 11 is a circuit diagram of the execution selection circuit 232.

Here, the following explanation is made assuming that a RUN-task is chosen from eight tasks of task 0-task 7. The execution selection circuit 232 includes four first comparator circuits 290 (290a-290d), two second comparator circuits 292 (292a, 292b), one third comparator circuit 294, and eight determination circuits 296 (296a-296h).

The determination circuit 296 inputs the ST signal indicative of the task state. The determination circuit 296 outputs the CID signal indicative of "1" when the ST signal is READY, and outputs the CID signal indicative of "0" when the ST signal is other than READY. The determination circuit 296 performs determining based on the first condition of the RUN-task selection conditions. The first comparator circuit 290 inputs the ID, the PR, the TIM, and the CID signal from the determination circuit 296, for two tasks.

The following explanation is made focusing on the first comparator circuit 290a. The first comparator circuit 290a compares the task 0 and the task 1, and selects the more suitable task based on the above-described RUN-task selection condition.

The first determination: To compare first the CID signals outputted from each of the determination circuit 296a and the determination circuit 296b. When either is "1", that is, when only one of the tasks is in the READY state, the first comparator circuit 290a outputs the ID, PR, and TIM of the task. When both are "0", that is, when neither of the tasks is in the READY state, the first comparator circuit 290a outputs ID=PR=TIM=NULL. This means that neither of the tasks is selected. When both are "1", that is, when both tasks are in the READY state, the next second determination is executed.

The second determination: To compare the PR signal of the task 0 with the PR signal of the task 1, and to select the task with the higher task priority. When the task priority of the task 0 is "1" and the task priority of the task 1 is "2", the ID, PR, and TIM of the task 0 are outputted. By the second determination, the task of the higher task priority is selected as a candidate of the RUN-task. When the task priority of the task 0 and the task 1 is the same, the next third determination is executed.

The third determination: To compare the TIM signal of the task 0 and the TIM signal of the task 1, and to select the task of the longer READY elapsed time. When the READY elapsed time is same, the task 0 is selected. Since the determination is made only by comparing the length of the elapsed time, the order data management of the TCB such as the task-ready list illustrated in FIG. 11 of Patent Literature 1 becomes unnecessary.

In this way, the task 0 and the task 1, the task 2 and the task 3, the task 4 and task 5, and the task 6 and the task 7 are compared respectively based on the RUN-task selection condition. The second comparator circuit 292 narrows down the candidate of the RUN-task further, based on the output from two first comparator circuits 290. The second comparator circuit 292a executes the task selection based on the output of the first comparator circuit 290a and the first comparator circuit 290b. Therefore, the second comparator circuit 292a outputs the ID, PR, and TIM of the task that matches the RUN-task selection condition most among the task 0-the task 3. In the same manner, the third comparator circuit 294 outputs the task ID of one of the task 0-the task 7.

According to such a processing method, it is possible to realize the RUN-task selection condition by hardware. The general software RTOS selects the RUN-task by accessing a task-ready list. However, the execution selection circuit 232 according to Basic Example 1 selects the RUN-task based on the state data always outputted from the state storage unit 220. The processing of the execution selection circuit 232 is summarized as follows.

<<<<State Transition of the RUN-Task>>>>

Here, the following explanation is made assuming that the RUN-task is a task J.

A1. The task switch circuit 210 sets "READY" to the task state register 258 of the task J.

A2. The task switch circuit 210 sets the timer 252 of the task J to start the measurement of the READY elapsed time.

In this way, the task J makes the state transition from RUN to READY. The processing data is saved to the save register 110 of the task J, as described previously. The bus that connects the processing register 154 and the save register 110 can transmit the processing data in parallel. Therefore, it is possible to execute the processing of A1 and A2 in one clock time.

<<<<State Transition of the READY-Task>>>>

B1. The task switch circuit 210 specifies the RUN-task based on the task ID that is outputted by the execution selection circuit 232 when the state transition of the task J is completed. "RUN" is set to the task state register 258 of the task.

In this way, the specified task makes the state transition from READY to RUN. The processing data of the specified task are loaded from the save register 110 to the processing register 154. The bus that couples the save register 110 and the processing register 154 also has the number of bits that can transmit the processing data in parallel. Therefore, the processing of B1 can be executed in one clock time.

The software RTOS consumes much CPU clock time of the CPU in the access to the task-ready list, etc. on the occasion of the task switch. As compared with this, the task control circuit 200 according to Basic Example 1 can complete the task switch in a slight time. The state storage unit 220 always outputs the state data to the execution selection circuit 232. Therefore, the execution selection circuit 232 outputs the task ID of one of the tasks always. The selection process of the RUN-task is not started after the task switch takes place, but the RUN-task is selected by the output of the execution selection circuit 232 when the task switch takes place. This point also contributes to the speeding up of the task switch. Here, the explanation is made assuming that the number of the tasks is eight. However, it is possible to support the case of more tasks by increasing the number of stages of the comparator circuits.

<<<Semaphore Processing>>

<<<The Outline of the Semaphore>>>

A wait semaphore list is utilized in the semaphore processing by the general software RTOS. Before explaining the wait semaphore list, the semaphore is explained briefly.

A semaphore ID and a semaphore counter are recorded in a semaphore table 212 in a corresponding manner. The semaphore counter is set as a finite number as an initial value. For example, it is assumed that it is set up as semaphore ID=4 and semaphore counter=3. When one of tasks executes the wait semaphore system call for the semaphore of semaphore ID=4 as the waiting semaphore, the task switch circuit 210 decrements the semaphore counter of the waiting semaphore. Whenever an acquisition request is made by the wait semaphore event call, the semaphore counter is decremented. When the semaphore counter becomes "0", it becomes impossible to acquire. For the semaphore with the semaphore counter of "0" as the waiting semaphore, the task that has executed the wait semaphore system call makes the state transition to the WAIT state.

On the other hand, when one of the tasks executes a release semaphore system call for the semaphore of semaphore ID=4 as a release semaphore, the task switch circuit 210 increments the semaphore counter of the semaphore table 212.

In summary, when the semaphore counter >0, the task that has executed the wait semaphore system call makes a transition from RUN to READY. At this time, the semaphore counter is decremented.

When the semaphore counter=0, the task that has executed the wait semaphore system call makes a transition from RUN to WAIT. The semaphore counter is not decremented.

In order for the task that has executed the wait semaphore system call to make a transition from the WAIT state to the READY state, another task needs to execute a release semaphore system call.

<<<Semaphore Processing by the General Software RTOS>>>

Figure 13:
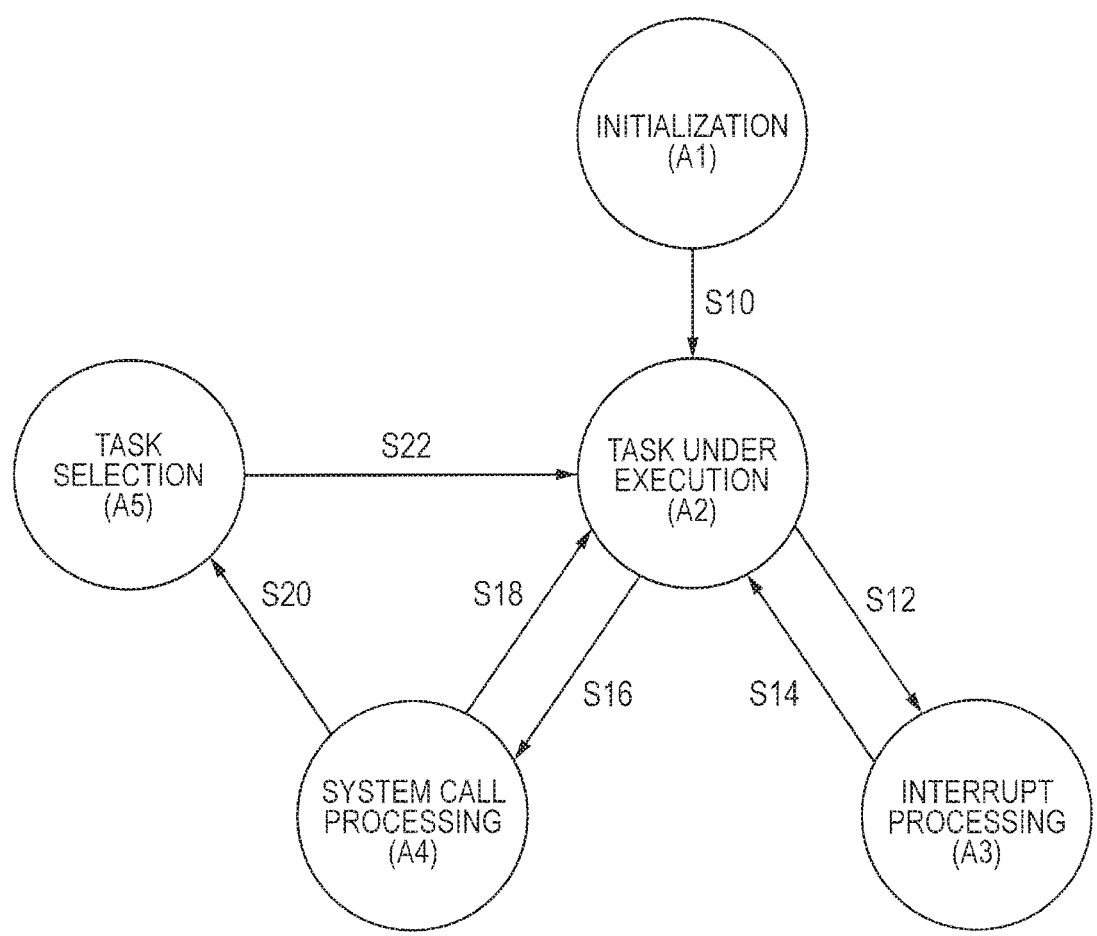
FIG. 13 is a state transition diagram of a task switch circuit according to Basic Example 1.

The example of the wait semaphore list utilized in the general software RTOS is disclosed in FIG. 13 of Patent Literature 1. As explained in relation to FIG. 13 of Patent Literature 1, the semaphore-related processing can be performed by controlling the wait semaphore list. According to Patent Literature 1, in releasing a semaphore, the policy that the software RTOS selects a READY-task from multiple WAIT-tasks is as follows.

1. It is a WAIT-task (the first condition).
2. It is a task that makes the release semaphore a waiting semaphore among the WAIT-tasks (the second condition).
3. When multiple such tasks exist, it is a task with the highest task priority (the third condition).
4. When multiple tasks with the highest task priority exist, it is the oldest task in time when the task has become in the WAIT state (the fourth condition).

In Patent Literature 1, these four conditions are collectively called as the "semaphore-waiting cancelling condition." The present specification is explained following this also. The semaphore selection circuit 234 of the task selection circuit 230 realizes, by hardware, the task scheduling function of the RTOS that is described in Patent Literature 1.

<<<Semaphore Processing by the Hardware RTOS according to Basic Example 1>>>

Figure 12:
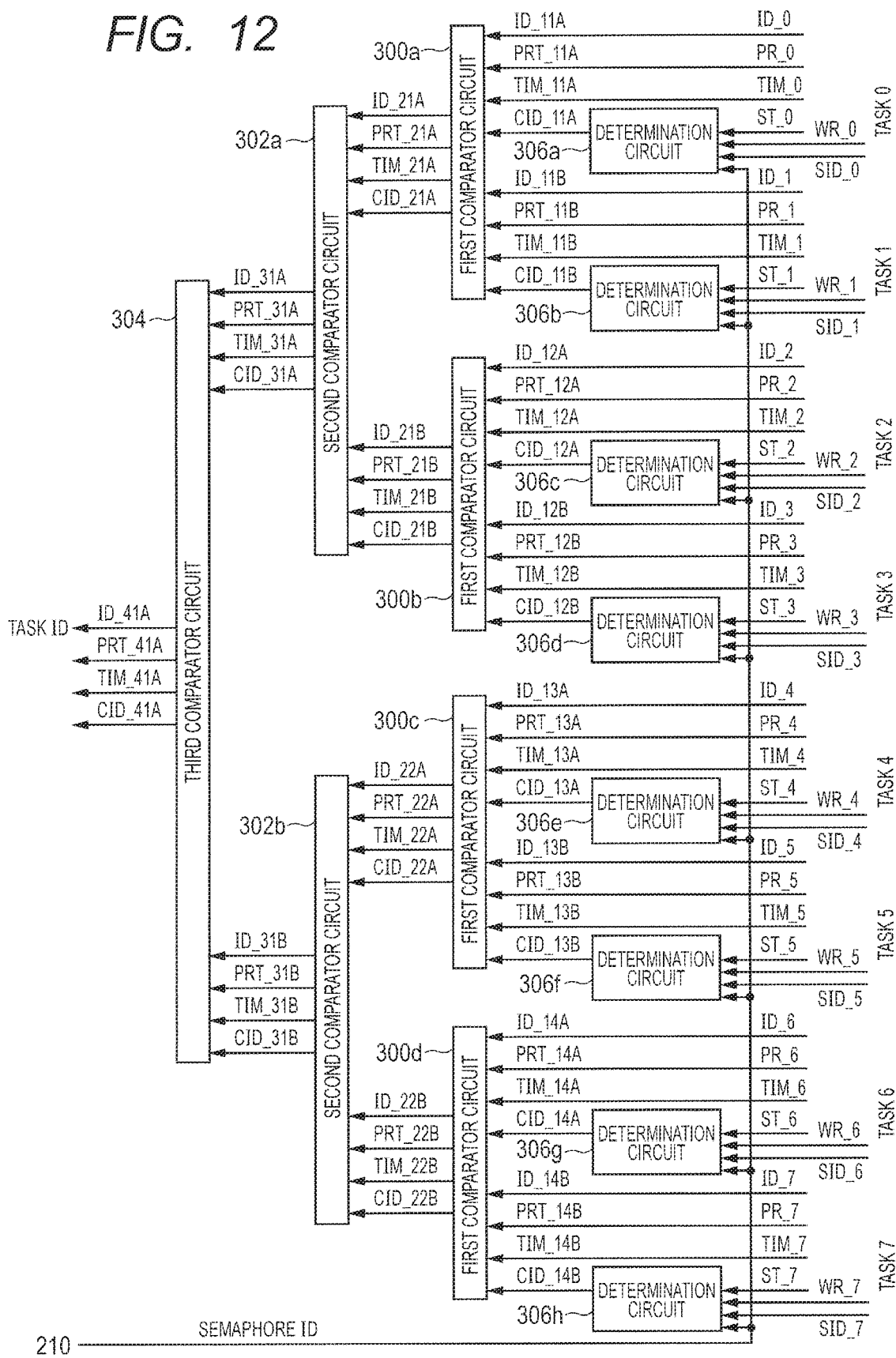
FIG. 12 is a circuit diagram of a semaphore selection circuit according to Basic Example 1.

FIG. 12 is a circuit diagram of the semaphore selection circuit 234.

Here, the following explanation is made assuming eight tasks of task 0-task 7 in a similar fashion. The semaphore selection circuit 234 includes four first comparator circuits 300 (300a-300d), two second comparator circuits 302 (302a, 302b), one third comparator circuit 304, and eight determination circuits 306 (306a-306h).

The determination circuit 306 inputs the ST, the WR, and the SID signal from the state storage unit 220 and the signal indicative of the semaphore ID from the task switch circuit 210. The semaphore ID inputted here is the semaphore ID of the release semaphore. The determination circuit 306 output the CID signal indicative of "1" when the semaphore ID indicates a semaphore waiting task that makes the release semaphore the waiting semaphore, otherwise, outputs the CID signal indicative of "0." The determination circuit 306 outputs the determination result regarding the first condition and the second condition of the semaphore-waiting cancelling conditions. The first comparator circuit 300 inputs the ID, the PR, and the TIM signal, and the CID signal from the determination circuit 306, for two tasks.

The first comparator circuit 300 makes the determination about the third condition and the fourth condition of the semaphore-waiting cancelling conditions. The same applies to the second comparator circuit 302 or the third comparator circuit 304. As clarified already, the second condition and the third condition of the RUN-task selection condition are the same as the third condition and the fourth condition of the semaphore-waiting cancelling condition. Each comparator circuit of the execution selection circuit 232 compares the task state data (PR, TIM). Each comparator circuit of the semaphore selection circuit 234 also compares the task state data (PR, TIM). Therefore, the first comparator circuit 290 of the execution selection circuit 232 and the first comparator circuit 300 of the semaphore selection circuit 234 include an equivalent logic, and they can be communalized. Each task is first determined with respect to the first condition and the second condition by the determination circuit 306, and then undergoes the determination processing by the first comparator circuit 300. Subsequently, one of the task IDs is outputted from the third comparator circuit 304, by the determination processing equivalent to the execution selection circuit 232. The processing at the time of executing the wait semaphore system call and the release semaphore system call is as follows.

<<<<Execution of the Wait Semaphore System Call>>>>

Here, the following explanation is made assuming that the RUN-task is a task J.

A1. The task switch circuit 210 detects the semaphore counter of the semaphore specified by the wait semaphore system call, from the semaphore table 212. Hereinafter, the processing branches responding to the value of the semaphore counter.

(When the Semaphore Counter >0)

A2. The task switch circuit 210 decrements the semaphore counter of the semaphore table 212.

A3. "READY" is set to the task state register 258 of the task J. At this time, the task switch circuit 210 sets the timer 252 of the RUN-task to start the measurement of the READY elapsed time.

(When the Semaphore Counter >0)

A2. The task switch circuit 210 sets "WAIT" to the task state register 258 of the task J, "semaphore waiting" to the waiting reason register 262, the semaphore ID of the waiting semaphore to the semaphore ID register 264, and sets the timer 252 to start the measurement of the WAIT elapsed time.

In this way, the task that has executed the wait semaphore system call makes the state transition from RUN to READY or WAIT.

<<<<Execution of the Release Semaphore System Call>>>>

B1. The task switch circuit 210 inputs the semaphore ID of the release semaphore into each determination circuit 306. Each determination circuit 306 determines the first condition and the second condition of the semaphore-waiting cancelling conditions, for this semaphore ID. Therefore, each of the first comparator circuit 300 to the third comparator circuit 304 selects a task based on the third condition and the fourth condition.

When one of the determination circuits 306 outputs "1" and the third comparator circuit 304 outputs one of the task IDs, the following processing is executed.

B2. "READY" is set to the task state register 258 of the task detected (selected), the waiting reason register 262 and the semaphore ID register 264 are cleared, and the timer 252 is set to measure the READY elapsed time.

B3. "READY" is set to the task state register 258 of the task that has executed the system call and the measurement of the READY elapsed time is started.

On the other hand, when no one of the determination circuits 306 outputs "1" and the third comparator circuit 304 does not output any one of the task IDs, the following processing is executed.

B2. The task switch circuit 210 increments the semaphore counter of the semaphore table 212.

B3. The state of the task that has executed the system call is made a transition from RUN to READY.

The state storage unit 220 always outputs the state data to the semaphore selection circuit 234. Therefore, when the task switch circuit 210 inputs the semaphore ID into the determination circuit 306, the semaphore selection circuit 234 can execute the selection process immediately.

<<Mutex Processing>>

The mutex as well as the semaphore is utilized for synchronous processing among tasks. The mutex and the semaphore are different in the following points.

1. The semaphore counter can set up an integer equal to or greater than one. As compared with this, the mutex is a special semaphore having the semaphore counter of "1" or "0." When the semaphore counter is two or greater, two or more tasks can acquire the same semaphore. However, in the case of the mutex, the number of the task that can acquire a certain mutex is always one.

2. The task that can release a semaphore by the release semaphore system call is not restricted to the task that has acquired the semaphore by the wait semaphore system call. As compared with this, the task that can release a mutex by the release mutex system call is only the task that has acquired the mutex by the wait mutex system call.

The policy to select a READY-task from multiple WAIT-tasks when releasing a mutex is as follows.

1. It is a WAIT-task (the first condition).
2. It is a task that makes a release mutex a waiting mutex among the WAIT-tasks (the second condition).
3. When multiple such tasks exist, it is a task with the highest task priority (the third condition).
4. When multiple tasks with the highest task priority exist, it is the oldest task in time when the task has become in the WAIT state (the fourth condition).

Such four conditions will be collectively called as the "mutex-waiting cancelling condition."

Therefore, the processing of the hardware RTOS according to Basic Example 1 at the time of execution of the wait mutex system call and the release mutex system call is as follows. The semaphore table 212 holds the mutex ID and the occupied state data indicating which task occupies the mutex, in a corresponding manner. The occupied state data is "0" when not occupied, and when occupied, the occupied state data is the task ID of the task that occupies the mutex.

<<<Execution of the Wait Mutex System Call>>>

Here, the following explanation is made assuming that the RUN-task is a task J.

A1. The task switch circuit 210 detects whether the mutex specified by the wait mutex system call is occupied. Hereinafter, the processing branches responding to the occupied state of the mutex.

(When the Mutex is not Occupied)

A2. The task switch circuit 210 records the task ID of the task that has executed the system call as occupancy data of the mutex.

A3. "READY" is set to the task state register 258 of the task J. At this time, the task switch circuit 210 sets the timer 252 of the RUN-task to start the measurement of the READY elapsed time.

(When the Mutex is Occupied)

A2. The task switch circuit 210 sets "WAIT" to the task state register 258 of the task J, "mutex waiting" to the waiting reason register 262, and the mutex ID of the waiting mutex to the mutex ID register 265, and sets the timer 252 to start the measurement of the WAIT elapsed time.

<<<Execution of the Release Mutex System Call>>>

B1. The task switch circuit 210 inputs the release semaphore ID into the mutex selection circuit 240, on condition that the task that has executed the system call occupies the release mutex. As is the case with FIG. 12, the mutex selection circuit 240 also includes the comparator circuits in multi stage connection and a determination circuit that determines the success or failure of the first condition and the second condition of the mutex-waiting cancelling conditions. This determination circuit outputs "1", only when both the first condition and the second condition of the mutex waiting conditions are satisfied for this mutex. When the task that does not occupy the release mutex executes the release mutex system call, the task state makes the state transition from RUN to READY.

When one of the determination circuits of the mutex selection circuit 240 outputs "1" and the mutex selection circuit 240 outputs one of task IDs, the following processing is executed.

B2. "READY" is set to the task state register 258 of the detected task, the waiting reason register 262 and the mutex ID register 265 are cleared, and the timer 252 starts to measure the READY elapsed time.

B3. "READY" is set to the task state register 258 of the task that has executed the system call, and the measurement of the READY elapsed time is started.

On the other hand, when no one of the determination circuits outputs "1" and the mutex selection circuit 240 does not output any one of the task IDs, the following processing is executed.

B2. The task switch circuit 210 sets the mutex as an unoccupied state in the semaphore table 212.

B3. The task that has executed the system call is made the state transition from RUN to READY.

<<Event Processing>>

The event management in Basic Example 1 is explained briefly. A flag pattern (hereinafter called a "current flag pattern") associated with the event ID is recorded on the event table 214. The flag pattern is a bit pattern of 8 bits.

The set event system call is a system call to change the setup of the current flag pattern, with the event ID and the flag pattern (hereinafter called a "set flag pattern") as parameters. When the set event system call is executed, the current flag pattern is changed into a logical addition with the set flag pattern as for the event concerned. When the current flag pattern is "00001100" and the set flag pattern is "00000101", for example, the current flag pattern is changed to "00001101." Hereinafter, the bits of each flag pattern are called, from the left, the 0th bit, the first bit, . . . , and the seventh bit.

The wait event system call is a system call for waiting for the current flag pattern of the waiting event to satisfy a predetermined condition, with the event ID, the flag pattern (hereinafter called a "wait flag pattern"), and the flag condition as parameters. When the wait event system call is executed, it is determined whether the flag condition is satisfied between the current flag pattern and the wait flag pattern. The flag condition is a logical addition (OR) or a logical product (AND). When the flag condition is the logical product (AND), the WAIT cancelling condition is that, as for all the bits that are "1" in the wait flag pattern, all the corresponding bits of the current flag pattern are also "1." When the flag conditions is the logical addition (OR), the WAIT cancelling condition is that, as for any one of the bits that are "1" in the wait flag pattern, the corresponding bit of the current flag pattern is "1."

When the current flag pattern is "00001101", the wait flag pattern is "00000011", and the flag condition is the "logical addition (OR)", for example, while the sixth bit and the seventh bit in the wait flag pattern are "1", the seventh bit in the current flag pattern is "1." Therefore, in this case, the WAIT cancelling condition by the wait event system call is satisfied. On the other hand, when the flag conditions is the "logical product (AND)", the sixth bit in the current flag pattern is "0"; therefore, the WAIT cancelling condition is not satisfied.

<<<Event Processing by the General Software RTOS>>>

The processing of the general RTOS at the time of executing the wait event system call and the set event system call is as follows. In the general RTOS, an event table is held on the memory for the event management. This event table holds not only the event ID and the current flag pattern, but usually holds the task ID of the task in the WAIT state with the event as the waiting event (hereinafter called an "event waiting task"), the wait flag pattern, and the flag conditions, in an associated manner.

<<<<Execution of the Wait Event System Call>>>>

A1. The RTOS reads the current flag pattern of the event specified by the system call from the event table.

A2. The current flag pattern and the wait flag pattern are compared according to the flag condition, and the success or failure of the WAIT cancelling condition is determined.

(When the WAIT Cancelling Condition is Satisfied)

A3. The task state of the task that has executed the system call makes the state transition from RUN to READY.

(When the WAIT Cancelling Condition is not Satisfied)

A3. The task ID of the task that has executed the system call is recorded on the event table.

A4. The wait flag pattern is recorded on the event table.

A5. The flag condition is recorded on the event table.

A6. The task state of the task that has executed the system call makes the state transition from RUN to WAIT.

<<<<Execution of the Set Event System Call>>>>

B1. The RTOS reads the current flag pattern, the task ID, the wait flag pattern, and the flag condition from the event table with regard to the set event specified by the system call.

B2. The logical addition of the current flag pattern and the set flag pattern is recorded as a new current flag pattern.

When the event waiting task does not exist with respect to the set event, or even if it exists, when the WAIT cancelling condition is not satisfied because of the wait flag pattern and the flag condition, the following processing is executed.

B3. The task state of the task that has executed the system call makes the state transition from RUN to READY.

On the other hand, when the event waiting task exists with regard to the set event and the WAIT cancelling condition is satisfied, the following processing is executed.

B3. The task state of the task that has been waiting for the event makes the state transition from WAIT to READY.

B4. The waiting task ID, the wait flag pattern, and the flag condition in the event table are cleared.

B5. The task state of the task that has executed the system call makes the state transition from RUN to READY. The RUN-task is selected.

When the set event system call is executed, the policy to select the READY-task from multiple WAIT-tasks is as follows.

1. It is a WAIT-task (the first condition).
2. It is a task that makes the set event the waiting event among the WAIT-tasks (the second condition).
3. It is a task for which the WAIT cancelling condition is satisfied, when comparing the wait flag pattern, the current flag pattern, according to the flag condition (the third condition).

Such three conditions will be collectively called an "event-waiting cancelling condition."

<<<Event Processing by the Hardware RTOS according to Basic Example 1>>>

The processing at the time of executing the wait event system call and the set event system call of the task control circuit 200 is as follows. In the event table 214 included in the task control circuit 200, the event ID and the current flag pattern are associated. Information including the waiting task ID, the wait flag pattern, etc., is stored in the state storage unit 220.

<<<<Execution of the Wait Event System Call>>>>

A1. The task switch circuit 210 reads the current flag pattern from the event table 214.

A2. The task switch circuit 210 compares the current flag pattern and the wait flag pattern according to the flag condition, and determines the success or failure of the WAIT cancelling condition.

(When the WAIT Cancelling Condition is Satisfied)

A3. "READY" is set to the task state register 258 of the task that has executed the system call.

(When the WAIT Cancelling Condition is not Satisfied)

A3. The task switch circuit 210 sets "WAIT" to the task state register 258 of the task that has executed the system call, the "event waiting" to the waiting reason register 262, the event ID of the waiting event to the event ID register 266, the wait flag pattern to the wait flag register 268, and the flag condition to the flag conditions register 270, respectively.

<<<<Execution of the Set Event System Call>>>>

B1. The task switch circuit 210 reads the current flag pattern from the event table 214 and inputs the event ID of the set event specified by the system call into the event selection circuit 236.

B2. The task switch circuit 210 performs logical addition of the set flag pattern and the current flag pattern of the event table 214.

B3. The event selection circuit 236 selects the task for which the event waiting condition is satisfied with regard to the acquired event ID. At this time, multiple tasks may be chosen irrespective of the task priority and the WAIT elapsed time.

(When the Task that Satisfies the Event-Waiting Cancelling Condition Exists)

B4. "READY" is set to the task state register 258 of the event waiting task. The event ID register 266, the wait flag register 268, and the flag conditions register 270 are cleared.

B5. The task state of the task that has executed the system call makes the state transition from RUN to READY.

(When the Task that Satisfies the Event-Waiting Cancelling Condition does not Exist)

B4. The task state of the task that has executed the system call makes the state transition from RUN to READY.

<<Time-Out Processing>>

The task that has shifted to the WAIT state makes a transition to the READY state when the WAIT cancelling condition is satisfied. However, when the satisfaction of the WAIT cancelling condition is prevented by a certain external factor or a bug of an application program, it becomes impossible for the task to exit the WAIT state. Therefore, when a task is shifted to the WAIT state, a time-out value is usually set up. The time-out value is decremented periodically, and when it becomes zero, the task makes a transition from the WAIT state to the READY state, even if the WAIT cancelling condition is not satisfied. That is, the task is prevented from staying at the WAIT state for a period more than the time-out value.

<<<Time-Out Processing by the General Software RTOS>>>

In the general RTOS by software, a time-out value is set to the TCB of the task in the WAIT state, and this time-out value is decremented periodically. The RTOS interrupts the processing of the CPU periodically, checks all the TCB, and detects the WAIT-task of which the time-out value has reached zero. When such a task is detected, the RTOS makes the state transition of the task from WAIT to READY.

<<<Time-Out Processing by the Hardware RTOS according to Basic Example 1>>>

On the other hand, in the case of Basic Example 1, the task switch circuit 210 decrements the time-out value of each time-out counter 274 periodically. The time-out value is set up as a parameter when performing a WAIT-group system call, and the task switch circuit 210 sets a time-out value to the time-out counter 274 of the task that has executed the system call.

The CPU 150 does not intervene in the decrement processing of the time-out value. Accordingly, the task switch circuit 210 can update the time-out value independently of the task execution processing. Therefore, even while the CPU 150 executes the task, updating of the time-out value is performed autonomously in the task control circuit 200. The time-out detection circuit 238 is supplied with the state data always; accordingly, the time-out detection circuit 238 can detect the task of which the time-out count value has become zero, at almost the same timing as the timing when the time-out count value is updated. The time-out detection circuit 238 outputs the task ID of such a task.

When the task ID is inputted from the time-out detection circuit 238, the task switch circuit 210 recognizes that the time-out has arisen, asserts the HC, and halts the supply of the CPU clock. The task control circuit 200 controls the WAIT-task of which the time-out has arisen to make a transition to the READY state, and controls the RUN-task to make a transition to the READY state. The task switch circuit 210 selects the task to be executed next from the READY-tasks. The task switch circuit 210 restarts the timer 252 of the task of which the time-out has arisen, to measure the READY elapsed time.

According to such a processing method, when the time-out arises during the execution of a task, that is, during the operating time of the CPU clock, it is possible to execute the task switch by interrupting the CPU 150 immediately. During the execution of a task, the task switch circuit 210 can execute updating of the time-out value independently, without borrowing the processing capacity of the CPU 150.

<<The Task Switch Circuit 210 as a Finite State Machine>>

FIG. 13 is a state transition diagram of the task switch circuit 210.

In an initialization (A1), all the tasks are in the IDLE state. When the initialization is completed (S10), one of the tasks becomes a RUN-task and enters in the task execution state (A2). When an interrupt request signal is detected (S12), a special task becomes a RUN-task and the interrupt processing (A3) is executed. After the interrupt processing is completed (S14), the task switch circuit 210 selects a RUN-task from the general task, and the processing state makes a transition to A2.

When a system call is executed (S16) during the execution of the task (A2), the system call processing is executed (A4). When the task switch is not executed, that is, the switching of the RUN-task does not take place (S18), the processing state returns to A2. On the other hand, when the task switch takes place (S20) by the system call processing (A4), the task switch circuit 210 selects a RUN-task based on the output of the execution selection circuit 232 (A5). When the task switch is completed (S22), the processing state shifts to A2.

In relation to Basic Example 1, an additional remark is made further for the case of implementing only one of the save circuit 120 and the task control circuit 200, which are the main elements of the semiconductor device 100.

<<A Semiconductor Device 100 of a Type that does not Mount the Task Control Circuit 200>>

Figure 14:
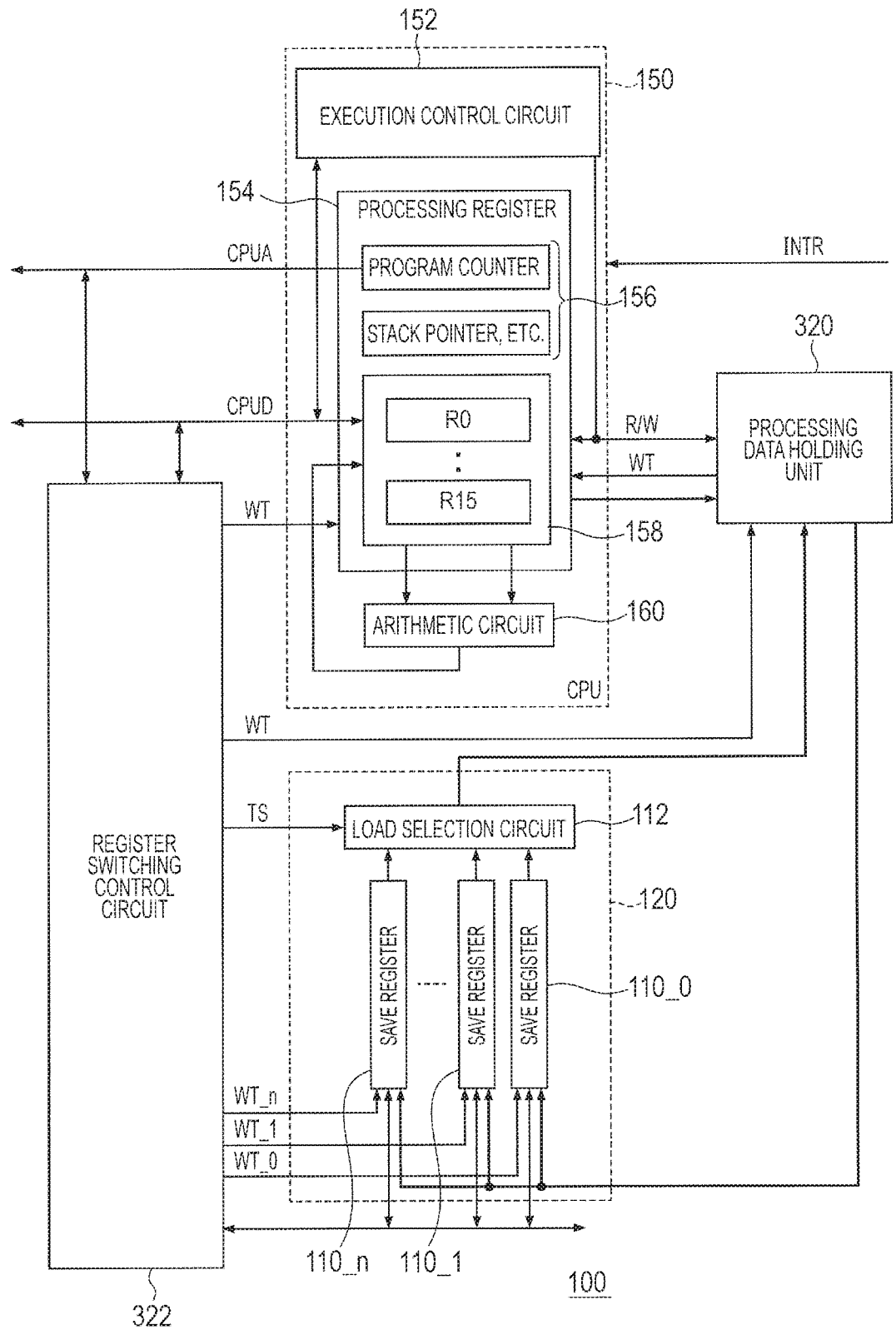
FIG. 14 is a circuit diagram of the semiconductor device according to Basic Example 1, in which a task control circuit is not contained.

FIG. 14 is a circuit diagram of the semiconductor device 100 that does not mount the task control circuit 200 included in the semiconductor device 100 illustrated in FIG. 5.

A register switching control circuit 322 and a processing data holding unit 320 are added, instead of not mounting the task control circuit 200. Since the task control circuit 200 is not mounted, the task scheduling function is realized by the software RTOS. Therefore, the RTOS needs to acquire the right of using of the CPU 150 temporarily on the occasion of the task switch. The processing data holding unit 320 ordinarily holds the processing data for the RTOS. When the RTOS acquires the right of using of the CPU 150, the processing data holding unit 320 replaces the processing data for the RTOS in the processing data holding unit 320 with the processing data for the task in the special register 156. Hereinafter, the processing steps are explained when the task switch is executed from TASK A to TASK B.

A1. When TASK A executes a system call, the variable of the system call and the ID of the system call are recorded in a part of the general-purpose register 158.

A2. The register switching control circuit 322 moves the processing data of TASK A to the processing data holding unit 320, and loads the RTOS processing data of the processing data holding unit 320 to the processing register 154. In this stage, the RTOS acquires the right of using of the CPU 150.

A3. The register switching control circuit 322 inputs the write signal into the save register 110_A, and saves the processing data of TASK A in the processing data holding unit 320 to the save register 110.

A4. The RTOS executes the processing corresponding to the system call based on the variable and the ID of the system call that are recorded in the general-purpose register 158. The task state data of the TCB of TASK A is set as "READY", and the TCB of TASK A is added to the task-ready list.

B1. Next, the RTOS selects the RUN-task (here TASK B), according to the RUN-task selection condition described previously.

B2. The RTOS instructs the register switching control circuit 322 to input the task selection signal specifying TASK B into the load selection circuit 112. The processing data is moved from the save register 110_B to the processing data holding unit 320.

B3. The register switching control circuit 322 replaces the processing data of TASK B in the processing data holding unit 320 with the RTOS processing data in the processing register 154. Accordingly, TASK B acquires the right of using of the CPU 150.

According to such a processing method, it is possible to make compact the circuit size of the semiconductor device 100 as a whole, compared with the semiconductor device 100 illustrated in FIG. 5 that mounts the task control circuit 200. Although the RTOS is realized as software, the loading and saving of the processing data can be controlled by hardware by means of the signal from the register switching control circuit 322. When the bus that couples the processing register 154, the processing data holding unit 320, the load selection circuit 112, and the save register 110, respectively, is set so as to have the number of bits that can transfer the processing data in parallel, a high-speed task switch becomes possible, compared with the saving of the processing data to the TCB, or the loading of the processing data from the TCB.

<<A Semiconductor Device 100 of a Type that does not Mount the Save Circuit 120>>

Figure 15:
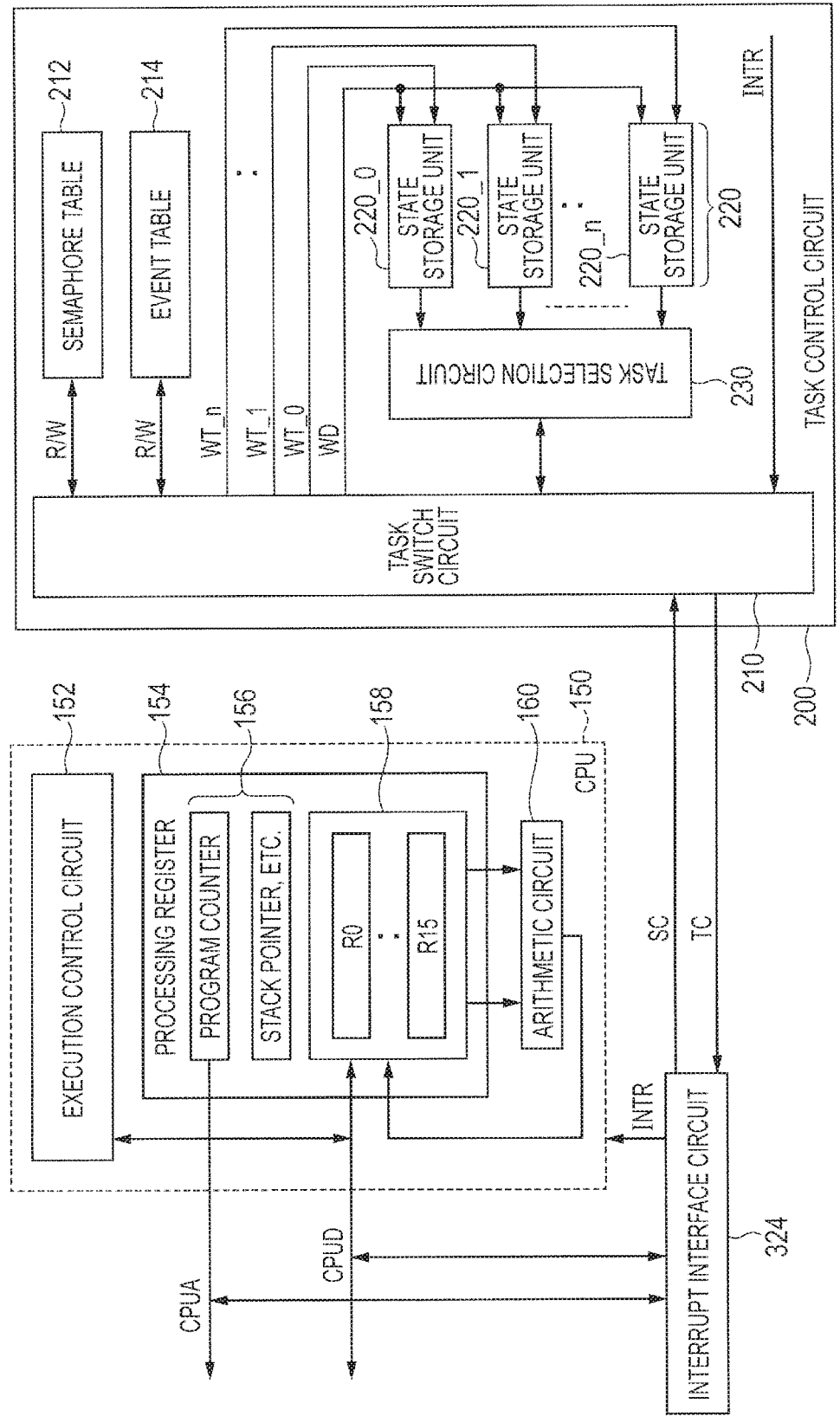
FIG. 15 is a circuit diagram of the semiconductor device according to Basic Example 1, in which a save circuit is not contained.

FIG. 15 is a circuit diagram of the semiconductor device 100 that does not mount the save circuit 120 included in the semiconductor device 100 illustrated in FIG. 5.

The semiconductor device 100 is added with an interrupt interface circuit 324 instead of not mounting the save circuit 120. Since the save circuit 120 is not mounted, the processing data is saved to the TCB of the memory. The saving and loading of the processing data is realized by the software-based RTOS. Therefore, the RTOS needs to acquire the right of using of the CPU 150 temporarily on the occasion of the task switch. Hereinafter, the processing steps are explained when the task switch is executed from TASK A to TASK B.

When the task switch takes place by the execution of a system call, the software RTOS saves the processing data of TASK A to the TCB of TASK A first. Then, the software RTOS loads the RTOS processing data to the processing register 154. The processing method at this time becomes equivalent to the contents explained with reference to FIG. 3.

The software RTOS writes the parameter of the system call into the interrupt interface circuit 324. The execution control circuit 152 halts the CPU clock of the CPU 150. The interrupt interface circuit 324 makes the task control circuit 200 execute the task switch. The task switch circuit 210 sets the task state register 258 of TASK A as READY first, and selects TASK B as the next RUN-task by the output from the task selection circuit 230. The task switch circuit 210 instructs the interrupt interface circuit 324 to load the processing data of TASK B. Here, the interrupt interface circuit 324 makes the execution control circuit 152 resume the CPU clock. The interrupt interface circuit 324 notifies the software RTOS that TASK B has been selected. The software RTOS accesses the TCB of TASK B and loads the processing data of TASK B to the processing register 154.

Also according to such a processing method, it is possible to make compact the circuit size of the semiconductor device 100 as a whole, compared with the semiconductor device 100 illustrated in FIG. 5 that mounts the save circuit 120. Although a part of the function of the RTOS is realized as software, the task selecting can be realized by the task control circuit 200.

Compared with the software RTOS explained with reference to FIG. 2 and FIG. 3, the semiconductor device 100 illustrated in FIG. 14 and FIG. 15 can realize a part of the function of the RTOS by hardware. As explained with reference to FIG. 14, due to the presence of the save circuit 120, it becomes unnecessary to access the TCB for the save and loading of the processing data. Therefore, it is possible to execute the processing of the saving and loading of the processing data by the register switching control circuit 322. As explained with reference to FIG. 15, due to the presence of the task control circuit 200, the software RTOS can transfer the task selection function to the task control circuit 200.

As explained with reference to FIG. 5, in the case of the semiconductor device 100 that mounts the save circuit 120 and the task control circuit 200, the task scheduling function of the RTOS can be realized by hardware completely. It is possible to speedup the task switching further, since the access to the TCB of the memory in the task switch is unnecessary. According to the experiment carried out by the present inventors, it is confirmed that the semiconductor device 100 according to Basic Example 1 operates at the speed about 100 times faster, compared with the general software RTOS explained with reference to FIG. 3 and others.

<Basic Example 2>

Next, a semiconductor device 100 that implements a double-ended queue algorithm by hardware is explained as Basic Example 2. The semiconductor device 100 according to Basic Example 1 mounts the task scheduling function based on the timer management. The task scheduling of Basic Example 1 adopts an algorithm that as long as the task priority is the same, the execution right is assigned to a task with a longer queuing time. Hereinafter, such task scheduling is called "fair task scheduling."

Also in Patent Literature 1, the explanation with reference to FIG. 11 describes the management method that controls the task-ready list based on the view of the fair task scheduling. That is, in FIG. 11 of Patent Literature 1, when TASK J as a RUN-task returns to the READY state, TASK J is concatenated behind TASK F at the tail end. Since TASK A becomes a RUN-task next to TASK J, the TCB of each task is concatenated in the order of TASK D, . . . , TASK F, and TASK J, in the priority pointer 280 of the task priority "0." TASK J is not granted the execution right at least until the execution of TASK F is completed. The processing method in the fair task scheduling resembles an FIFO, that is, the algorithm of a queue. The fair task scheduling is an algorithm that fits to the time management readily. Therefore, the fair task scheduling can be implemented by hardware with the aid of the timer management.

On the other hand, the software OS employs in many cases the task scheduling that as long as the task priority is the same, the execution right is preferentially assigned to a task once executed as a RUN-task. Hereinafter, such task scheduling is called a "reexecution-preferred task scheduling." Now the reexecution-preferred task scheduling is discussed with reference to FIG. 11 of Patent Literature 1. When TASK J as a RUN-task returns to the READY state, TASK J is inserted in the top end instead of the tail end. Since TASK A becomes a RUN-task next to TASK J, the TCB of each task is concatenated in the order of TASK J, TASK D, . . . , TASK F, in the priority pointer 280 of the task priority "0." When TASK A is completed, TASK J is re-granted the execution right earlier than TASK D and TASK F. In the case where there are tasks of the type to be executed in the gross as much as possible, if the execution right is once granted, the reexecution-preferred task scheduling is effective. It can be said that the reexecution-preferred task scheduling includes an LIFO, that is, a stack-wise algorithm. In Basic Example 2, the reexecution-preferred task scheduling is realized by implementing by hardware the double-ended queue algorithm that is based on the FIFO and is able to support the LIFO in a similar fashion.

Not only the reexecution-preferred task scheduling but the double-ended queue algorithm is useful also in the general application program. Therefore, the hardware implementation of the double-ended queue algorithm is effective in improving the processing speed of various computer programs.

Figure 16:
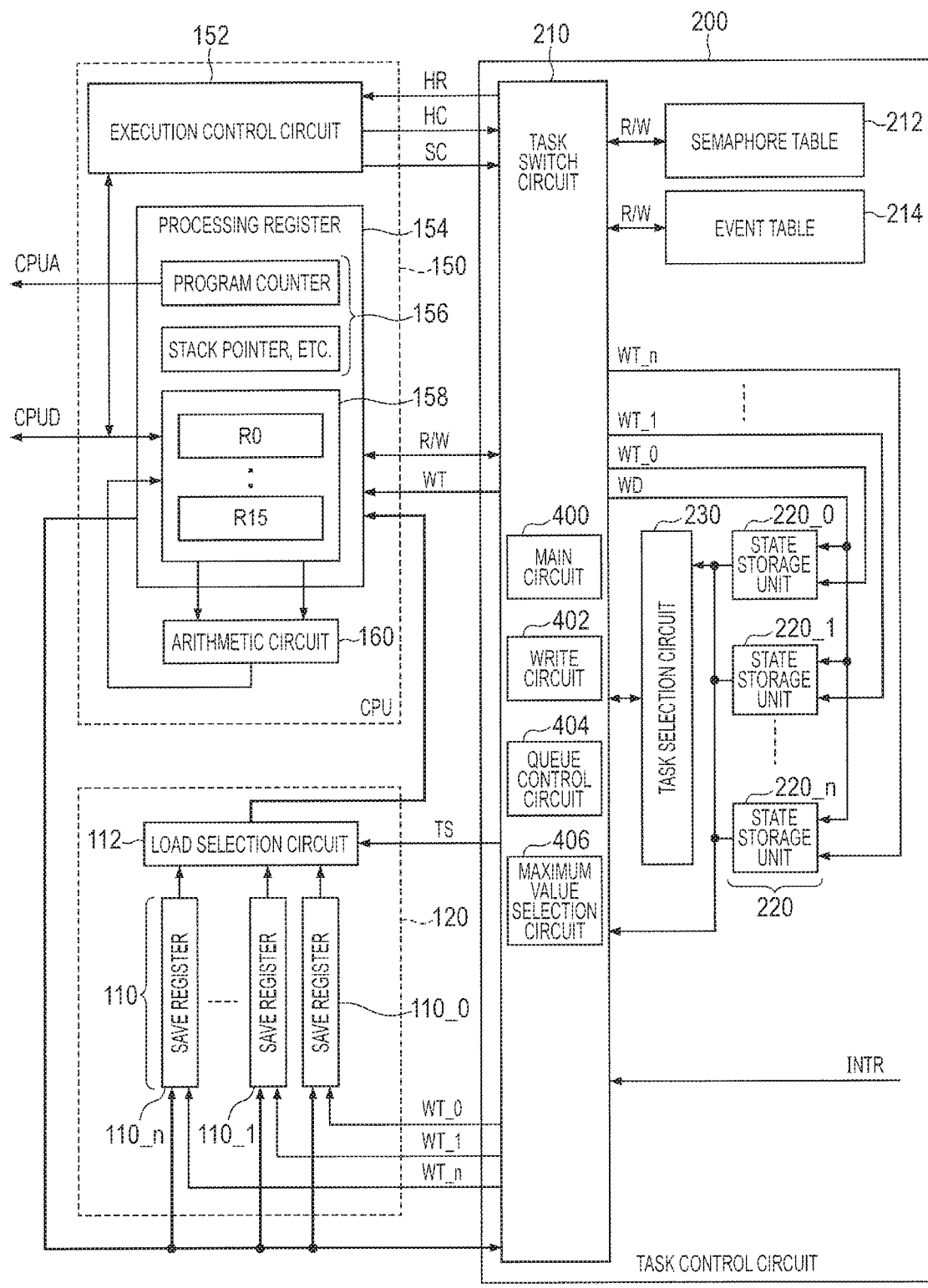
FIG. 16 is a circuit diagram of a task processing unit according to Basic Example 2.

FIG. 16 is a circuit diagram of a semiconductor device 100 according to Basic Example 2.

The semiconductor device 100 according to Basic Example 2 also includes the CPU 150, the save circuit 120, and the task control circuit 200. However, the task switch circuit 210 according to Basic Example 2 includes a main circuit 400, a write circuit 402, a queue control circuit 404, and a maximum value selection circuit 406. The main circuit 400 has function almost equivalent to that of the task switch circuit 210 according to Basic Example 1. Therefore, the task switch circuit 210 according to Basic Example 2 is configured by adding the write circuit 402, the queue control circuit 404, and the maximum value selection circuit 406 to the main circuit 400 as the task switch circuit 210 according to Basic Example 1. From each state storage unit 220, all the state data of all the tasks are always outputted not only to the task selection circuit 230 but to the maximum value selection circuit 406 and the queue control circuit 404.

Figure 17:
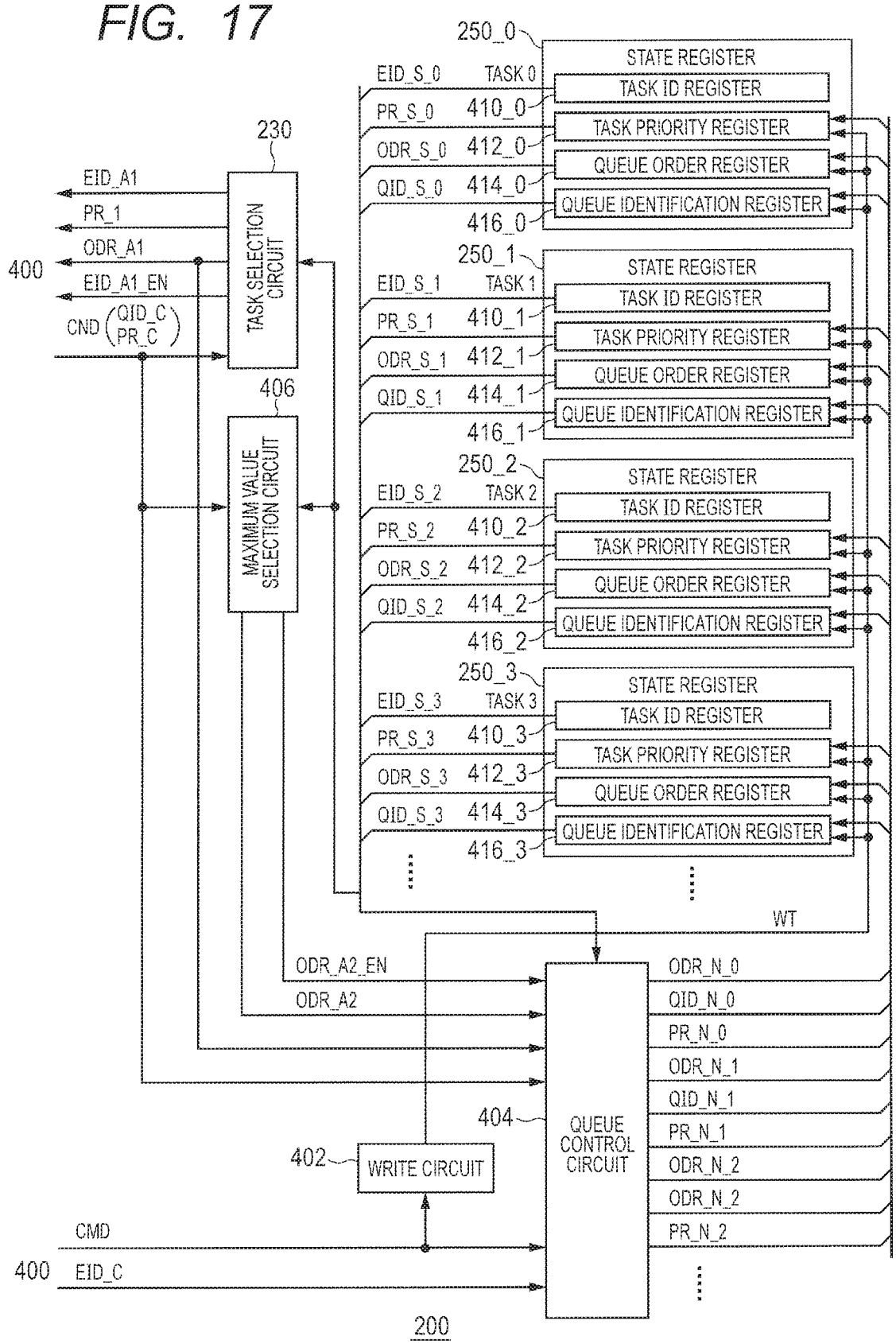
FIG. 17 is a partial circuit diagram of a task control circuit according to Basic Example 2.

FIG. 17 is a partial circuit diagram of the task control circuit 200 in Basic Example 2.

The basic configuration of the task control circuit 200 is almost equivalent to the circuit configuration illustrated in FIG. 10. The state register 250 associated with each task includes a task ID register 410, a task priority register 412, a queue order register 414, and a queue identification register 416. The state register 250 may also include other registers. However, the explanation here is made centering on the register group concerning the double-ended queue algorithm.

(A) A task ID register 410: To hold a task ID. It is equivalent to the task ID register 254 illustrated in Basic Example 1. From the task ID register 410, an EID_S signal indicative of the task ID is always outputted.

(B) A task priority register 412: To hold a task priority (PR). It is the same as the task priority register 256 illustrated in Basic Example 1. The task priority is always outputted as a PR_S signal.

(C) A queue order register 414: To hold "an order value (ODR)" indicative of the enqueued order to a virtual queue to be described later. A greater order value means that the task is enqueued deeper in the virtual queue. The detail is described later. The order value is always outputted as an ODR_S signal.

(D) A queue identification register 416: To hold a "queue ID (QID)" that identifies the virtual queue. The queue ID is always outputted as a QID_S signal.

In particular, the task priority register 412, the queue order register 414, and the queue identification register 416 function as a queue register for controlling the virtual queue.

The virtual queue is associated with a task state. For example, the virtual queue of QID=0 (hereinafter, written as a "virtual queue (0)") may be associated with a READY state, a virtual queue (1) with a semaphore waiting state, and a virtual queue (2) with a mutex waiting state. Alternatively, a virtual queue (1) may be associated with a semaphore waiting state for the semaphore ID=0, and a virtual queue (2) with a semaphore waiting state for the semaphore ID=1. The association of the QID and the task state may be arbitrarily set up by software.

When TASK A is in the READY state, the QID of the virtual queue associated with the READY state is set to a queue identification register 416_A. The task selection circuit 230 and the queue control circuit 404 can determine the task state of each task, by referring to each queue identification register 416. Therefore, the queue identification register 416 can function equivalently with the registers such as the task state register 258, the waiting reason register 262, the semaphore ID register 264, the mutex ID register 265, and the event ID register 266 in Basic Example 1.

The virtual queue does not exist physically, but it is a conceptual queue that can be supposed by the setting contents of the queue order register 414 or the queue identification register 416. This point is important. For example, assume that the queue identification register 416 and the queue order register 414 are set as follows, TASK A: QID=0, ODR=0,
TASK B: QID=0, ODR=1,
TASK C: QID=0, ODR=2, and
TASK D: QID=1, ODR=0.

It is meant that TASK C, TASK B, and TASK A are enqueued in this order to the virtual queue (0) and TASK D alone is enqueued to the virtual queue (1). The number and size of the virtual queue can be flexibly changed by the numeric value range of the QID and the ODR.

The task selection circuit 230 selects a task to be made a state transition, based on the state data outputted from the state register 250. The main circuit 400 inputs a CND signal into the task selection circuit 230. The CND signal indicates the task selection condition, and includes a QID_C indicative of a queue ID and a PR_C indicative of a task priority. For example, when dequeuing a task from the virtual queue (0), the main circuit 400 sets QID_C=0 to the CND. The task selection circuit 230 outputs to an EID_A1 a task ID of the task as a candidate for dequeuing (hereinafter simply called a "dequeuing task") in the specified virtual queue (0), and asserts the EID_A1_EN. The task priority and order value of the dequeuing task are outputted to a PR_A1 and an ODR_A1. In this way, the main circuit 400 can know the dequeuing task of the virtual queue (Qn) by asking the task selection circuit 230 with QID_C=Qn specified. The task selection circuit 230 functions as a dequeuing candidate circuit that selects the dequeuing task. The details are described later with reference to FIG. 30.

The CND signal is inputted into the maximum value selection circuit 406 from the main circuit 400. When QID_C=Qn is specified by the CND, the maximum value selection circuit 406 outputs the maximum order value in the virtual queue (Qn) to the ODR_A2, and asserts the EID_A2_EN. The details are described later with reference to FIG. 26.

The queue control circuit 404 controls the state transition of each task by setting up the state data of each state register 250. The CMD and the EID_C are inputted from the main circuit 400 to the queue control circuit 404. In addition to this, the state data of the CND (QID_C, PR_C), the ODR_A1, the ODR_A2, and the ODR_A2_EN of each state register 250 are inputted.

The CMD indicates the command for operating the virtual queue. The queue ID of the virtual queue as the target of the CMD, the task ID of a task, and the task priority are specified by the QID_C, the EID_C, and the PR_C, respectively. The command is one of the three kinds of an ENQ_TL, an ENQ_TP, or a DEQ.

When the normal enqueuing command ENQ_TL is inputted, a task specified by the EID_C signal is enqueued from the tail end of the virtual queue. Hereinafter, the enqueuing from the tail end of the queue is called a "normal enqueuing." When the dequeuing command DEQ is inputted, a task is dequeued from the top end of the virtual queue. The queue control as the FIFO is executed by the ENQ_TL and the DEQ. When the reverse enqueuing command ENQ_TP is inputted, the task specified by the EID_C signal is enqueued from the top end of the virtual queue. Hereinafter, such an enqueuing from the top end of the queue is called a "reverse enqueuing." The reverse enqueuing is a special enqueuing method because it is not the enqueuing as the FIFO.

When the CMD is inputted from the main circuit 400, the write circuit 402 asserts the WT, and the write of each data outputted from the queue control circuit 404 is executed to the state register 250. Such circuits as the queue control circuit 404, the write circuit 402, the task selection circuit 230, and the maximum value selection circuit 406 function as a virtual queue processing circuit for controlling the virtual queue.

Figure 18:
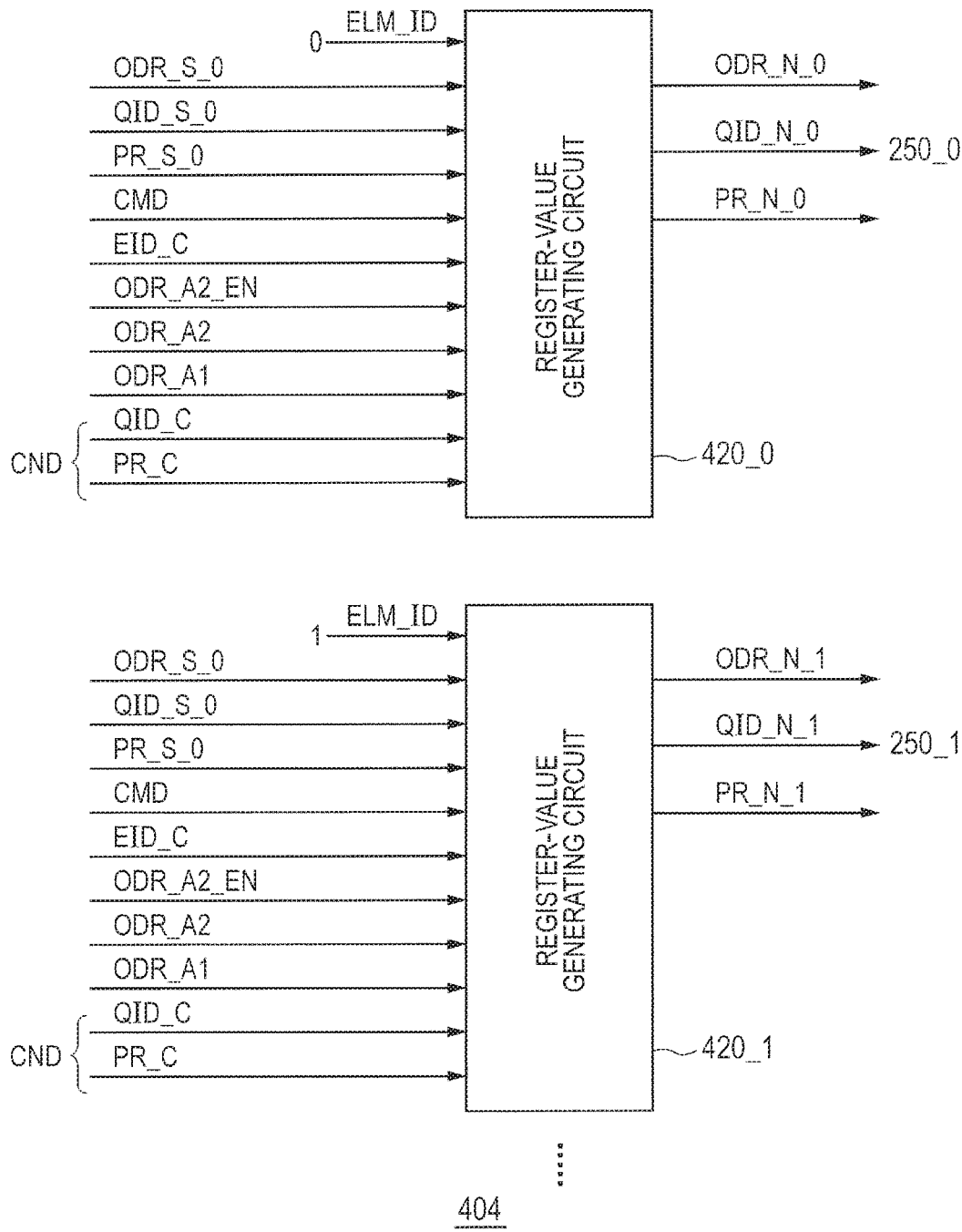
FIG. 18 is a circuit diagram of a queue control circuit according to Basic Example 2.

The circuit configuration of the queue control circuit 404 is explained in full detail with reference to FIG. 18.

FIG. 18 is a circuit diagram of the queue control circuit 404. The queue control circuit 404 is a collective entity of multiple pieces of a register-value generating circuit 420. Each register-value generating circuit 420 is the same circuit. The register-value generating circuit 420 is associated with each task. It can also be said that the register-value generating circuit 420 is associated with each state register 250. A register-value generating circuit 420_En is associated with a task of the task ID=En (hereinafter, written as a "task (En)"). The task ID of the pertinent task is inputted into the register-value generating circuit 420 in a fixed manner as an ELM_ID signal.

The ODR_S, the QID_S, and the PR_S are state data outputted from the state register 250, and indicate an order value, a queue ID, and a task priority, respectively. The order value, the queue ID, and the task priority of the task (En) are inputted into the register-value generating circuit 420_En associated with the task (En), as an ODR_S_En, a QID_S_En, and a PR_S_En, respectively. The CMD and the EID_C are inputted from the main circuit 400. The ODR_A2_EN and the ODR_A2 are inputted from the maximum value selection circuit 406. The ODR_A2 indicative of the maximum order value becomes an effective input when the ODR_A2_EN is asserted. The ODR_A1 is inputted from the task selection circuit 230. The ODR_A1 indicates the order value of the dequeuing task. The QID_C and the PR_C are the CND signals inputted from the main circuit 400, and indicate the QID and the PR as the task selection condition, respectively.

The order value, the queue ID, and the task priority of the task (En) are outputted by the register-value generating circuit 420_En as a QID_N_En, an ODR_N_En, and a PR_N_En, respectively, and are written in the state register 250_En when the WT is asserted by the write circuit 402.

When the write circuit 402 asserts the WT, the QID_N_En, the ODR_N_En, and the PR_N_En of all the register-value generating circuits 420 are written in all the state registers 250. The register-value generating circuit 420 concerning the task affected by the CMD writes the new data specified by the algorithm described later in the state register 250. On the other hand, the register-value generating circuit 420 concerning the task not affected by the CMD also re-outputs and executes the write of the same data as the data currently written in the state register 250.

The WT of the register-value generating circuit 420 may be directly inputted to the queue control circuit 404 instead of each state register 250. In this case, only the register-value generating circuit 420 concerning the task of which the state should be changed by the CMD in the register-value generating circuit 420 contained in the queue control circuit 404 may write new data in the state register 250.

The concrete contents of processing of the register-value generating circuit 420 are described later.

Figures 19, 20:
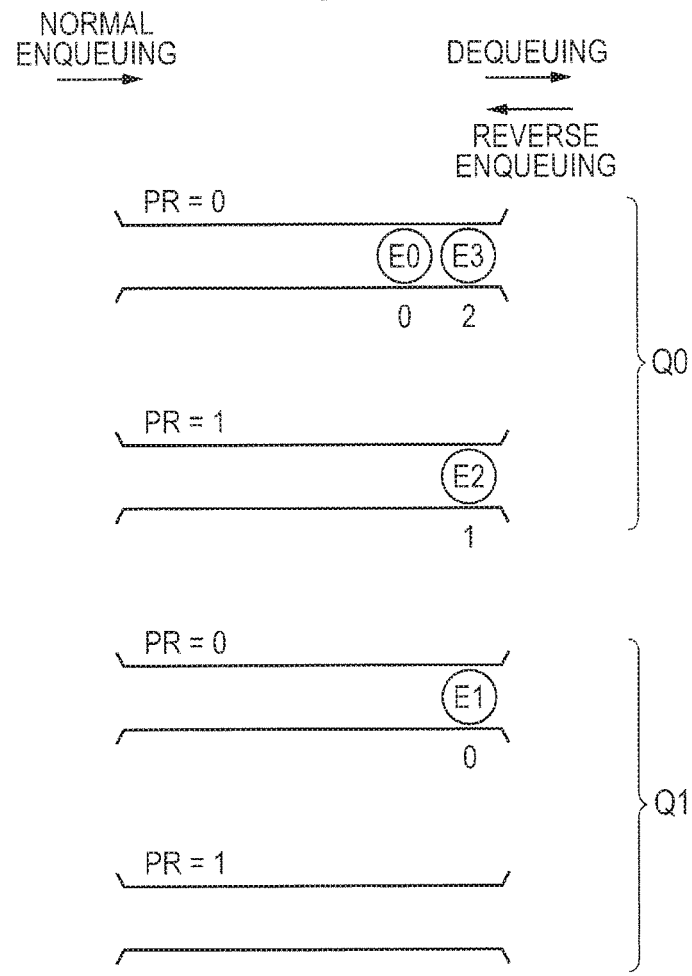
FIG. 19 is a conceptual diagram illustrating the relation between a virtual queue and a task, according to Basic Example 2.
FIG. 20 is a data structure diagram of a state register corresponding to FIG. 19.

FIG. 19 is a conceptual diagram illustrating the relation between the virtual queue and tasks.

Here, two virtual queues, a virtual queue (Q0) and a virtual queue (Q1), are assumed. The virtual queue (Q0) is a set of two priority queues, a priority queue to which a task of the task priority PR=0 is enqueued (hereinafter written as a "priority queue (Q0:0)"), and a priority queue (Q0:1) to which a task of the task priority PR=1 is enqueued. The same applies to the virtual queue (Q1). As a result, four priority queues are assumed substantially. For example, the virtual queue (Q0) may be associated with the READY state and the virtual queue (Q1) may be associated with the WAIT state.

Each virtual queue has an enqueuing end on the left of the figure, and a dequeuing end on the right. In the normal enqueuing, a task is enqueued from the left-hand side, and in the reverse enqueuing, a task is enqueued from the right-hand side. It is always from the right-hand side that a task is dequeued.

In FIG. 19, four tasks of the task ID=E0, E1, E2, and E3 are enqueued to the virtual queue. The task (E0), the task (E2), and the task (E3) are enqueued to the virtual queue (Q0). Among these, the task (E0) and the task (E3) have the task priority PR=0, accordingly, they are enqueued to the priority queue (Q0:0). The task (E2) has the task priority PR=1, accordingly, it is enqueued to the priority queue (Q0:1). The order value ODR of the task (E3), the task (E2), and the task (E0) enqueued to the virtual queue (Q0) is 2, 1, and 0. The task (E1) of the task priority PR=0 is enqueued to the virtual queue (Q1). The order value ODR is "0."

FIG. 20 is a data structure diagram of the state register 250 corresponding to FIG. 19.

The enqueued state of each task to the virtual queue illustrated in FIG. 19 is expressed by the setup of the state register 250. In the state illustrated in FIG. 19, the task (E0)–the task (E3) are enqueued to the virtual queue among the task (E0)–the task (E7). Therefore, for the other tasks, "Non" indicative of "not yet enqueued" is set to the queue identification register 416. "Q0" is set to the queue identification register 416 of the task (E0), the task (E3), and the task (E2) that are enqueued to the virtual queue (Q0). "Q1" is set to the queue identification register 416 of the task (E1) that is enqueued to the virtual queue (Q1). The setting contents of the queue identification register 416 expresses which task is enqueued to which virtual queue.

The ODR of 0, 2, and 1 are set to the queue order register 414 of three tasks of the task (E0), the task (E3), and the task (E2) that are enqueued to the virtual queue (Q0), respectively. Since the task enqueued to the virtual queue (Q1) is only the task (E1), the minimum order value "0" is set up. The setting contents of the queue order register 414 expresses the position of each task in the virtual queue.

The task priority PR of the task (E0), the task (E1), and the task (E3) is "0." Accordingly, "0" is set to the task priority register 412 of these tasks. The task priority PR of the task (E2) is "1", accordingly, "1" is set to the task priority register 412_E2. The setup of the task priority register 412 expresses a priority queue to which each task is enqueued.

Based on the above setup, the contents of processing in the normal enqueuing, the reverse enqueuing, and the dequeuing are explained in full detail.

<Normal Enqueuing>

Figures 21, 22:
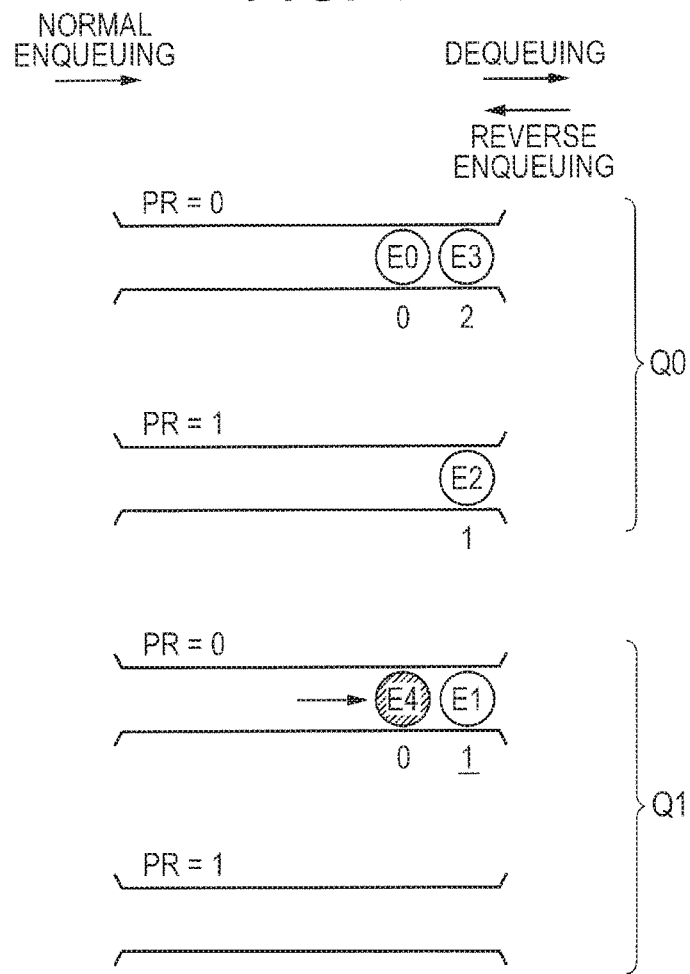
FIG. 21 is a conceptual diagram when performing normal enqueuing of a task (E4) to the virtual queue illustrated in FIG. 19.
FIG. 22 is a data structure diagram of the state register corresponding to FIG. 21.

FIG. 21 is a conceptual diagram when performing the normal enqueuing of the task (E4) to the virtual queue illustrated in FIG. 19.

Here, the following explanation is made for the normal enqueuing performed for the task (E4) of the task priority PR=0 to the virtual queue (Q1). The main circuit 400 sets up EID_C=E4, QID_C=Q1, and PR_C=0 as CMD=ENQ_TL (a normal enqueuing command). The register-value generating circuit 420_E4 contained in the queue control circuit 404 detects EID_C=ELM_ID=E4, and outputs QID_N_E4=QID_C=Q1, ODR_N_E4=0, and PR_N_E4=PR_C=0. The QID_N_E4 is the QID of the virtual queue as the enqueuing destination of the task (E4), the ODR_N_E4 is the order value at the time of enqueuing, and the PR_N_E4 is the task priority of the task (E4). The ODR_N about the task to which the normal enqueuing is performed is always set as "0." This is the order value that indicates the newest enqueuing to the queue.

Not only the register-value generating circuit 420_E4 but also a register-value generating circuit 420_En serving as QID_S_En=QID_C=Q1 reacts. The register-value generating circuit 420_En outputs ODR_N_En=ODR_S_En+1. Here, the register-value generating circuit 420_E1 detects QID_S_E1=QID_C=Q1, and outputs ODR_N_E1=0+1=1. The ODR_N_E1 is the order value after the task (E1) is enqueued. The task already enqueued to the virtual queue (Q1) as the normal enqueuing destination of the task (E4) is affected with regard to the order value. Passing through such processing steps, the state data of the task (E4) and the task (E1), which are elements of the virtual queue (Q1), are adjusted.

FIG. 22 is a data structure diagram of the state register 250 corresponding to FIG. 21.

The portion underlined in the figure has changed from the setting contents of the state register 250 illustrated in FIG. 20. By the normal enqueuing of the task (E4) to the virtual queue (Q1), "Q1" is set to the queue identification register 416_E4 according to the QID_N_E4. The ODR of the task (E4) is "0" and the PR is "0." By the normal enqueuing of the task (E4), the ODR of the task (E1) already enqueued to the virtual queue (Q1) is incremented from "0" to "1." According to the setting contents of the state register 250 after modification, the state of the virtual queue (Q1) illustrated in FIG. 21 is expressed.

Figures 23, 24:
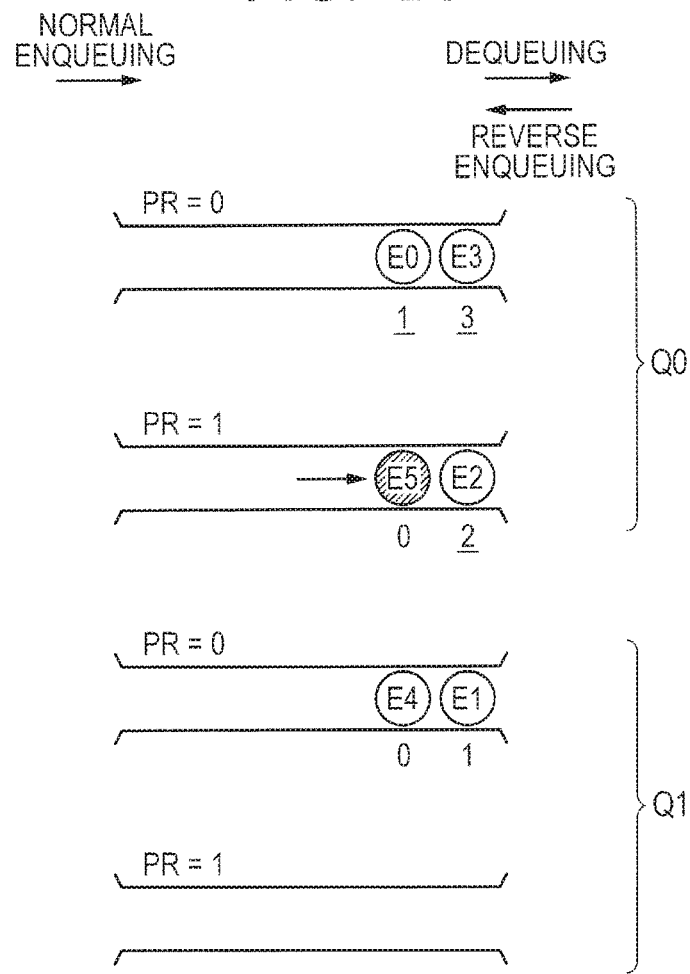
FIG. 23 is a conceptual diagram when performing normal enqueuing of a task (E5) to the virtual queue illustrated in FIG. 21.
FIG. 24 is a data structure diagram of the state register corresponding to FIG. 23.

FIG. 23 is a conceptual diagram when performing normal enqueuing of a task (E5) to the virtual queue illustrated in FIG. 21.

Here, the following explanation is made for the normal enqueuing performed for the task (E5) of the task priority PR=1 to the virtual queue (Q0). The main circuit 400 sets up EID_C=E5, QID_C=Q0, and PR_C=1 as CMD=ENQ_TL (a normal enqueuing command). The register-value generating circuit 420_E5 outputs QID_N_E5=QID_C=Q0, ODR_N_E5=0, and PR_N_E5=PR_C=1.

Not only the register-value generating circuit 420_E5, but also the register-value generating circuit 420_En as QID_C=QID_S_En=Q0 detects QID_C=QID_S_En and outputs ODR_N_En=ODR_S_En+1. In this example, the register-value generating circuit 420 corresponding to the task (E0), the task (E2), and the task (E3) is applicable. In this way, the state data of the task (E5), the task (E0), the task (E2), and the task (E3), which are elements of the virtual queue (Q0), are adjusted.

FIG. 24 is a data structure diagram of the state register 250 corresponding to FIG. 23.

The portion underlined in the figure has changed from the setting contents of the state register 250 illustrated in FIG. 22. First, by the normal enqueuing of the task (E5) to the virtual queue (Q0), "Q0" is set to the queue identification register 416_E5 newly. The ODR of the task (E5) is "0" and the PR is "1." By the normal enqueuing of the task (E5), the ODR of the task (E0), the task (E2), and the task (E3), which are already enqueued to the virtual queue (Q0), is incremented respectively.

Figure 25:
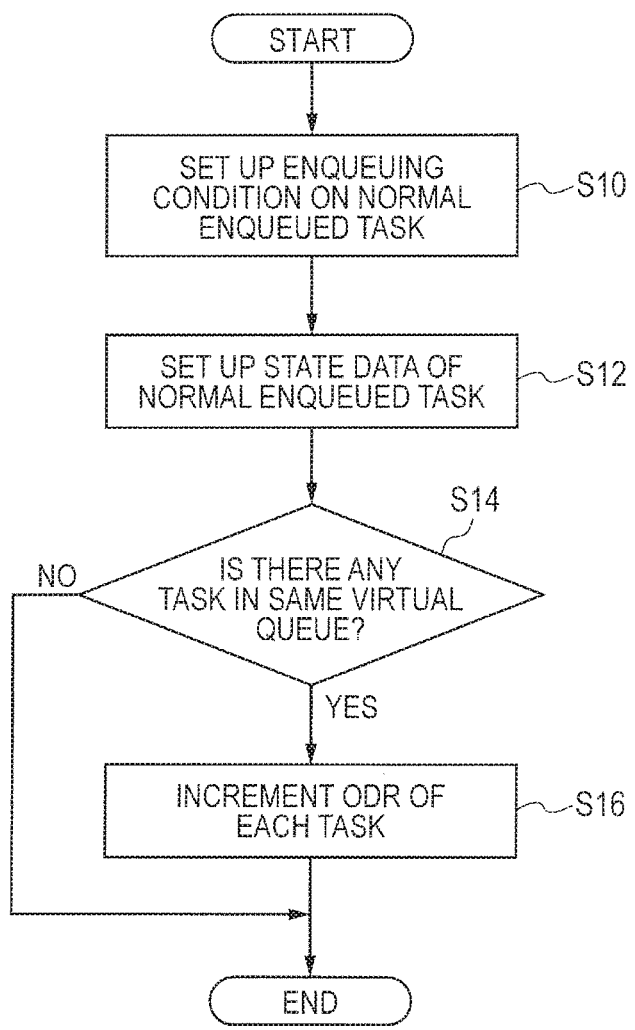
FIG. 25 is a flowchart illustrating the processing steps of the normal enqueuing according to Basic Example 2.

FIG. 25 is a flow chart illustrating the processing steps of the normal enqueuing.

The main circuit 400 sets up the enqueuing condition about the task that is normally enqueued (hereinafter called a "normal enqueued task") (S10). Specifically, the EID_C, the QID_C, and the PR_C are set up as the CMD=ENQ_TL. The register-value generating circuit 420 corresponding to the normal enqueued task among the queue control circuit 404 sets "PR_C", "0", and "QID_C", respectively, to the task priority register 412, the queue order register 414, and the queue identification register 416 of the normal enqueued task (S12).

When other tasks are already enqueued to the virtual queue (QID_C) (Y at S14), each ODR of the tasks already enqueued is incremented (S16). In the case of the example illustrated in FIG. 23, the ODR is incremented for the task (E0), the task (E2), and the task (E3). The processing at Steps S12, S14, and S16 is executed mostly in parallel in time.

<Reverse Enqueuing>

Figure 26:
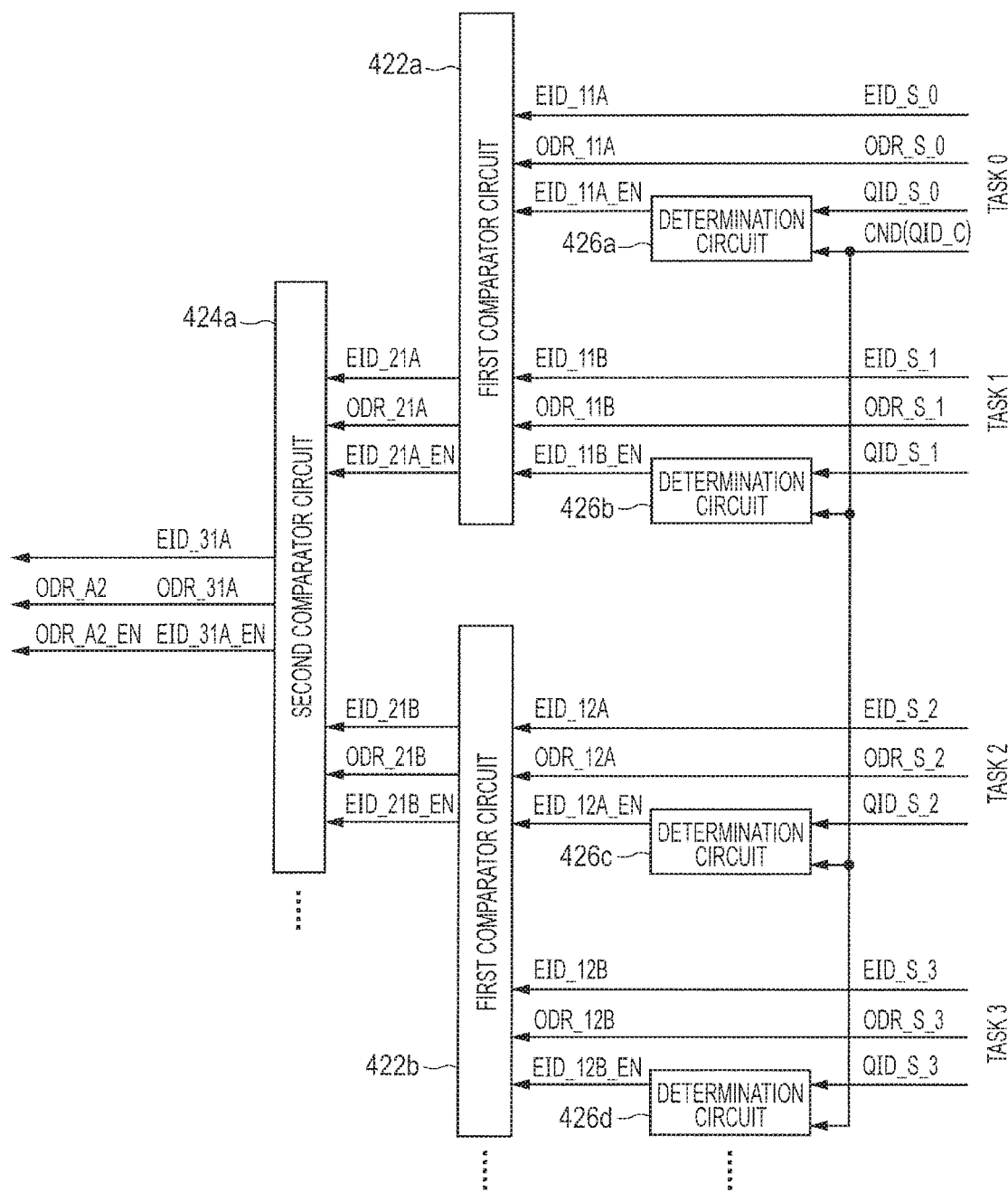
FIG. 26 is a partial circuit diagram of a maximum value selection circuit according to Basic Example 2.

FIG. 26 is a partial circuit diagram of the maximum value selection circuit 406.

The maximum value selection circuit 406 is driven by the main circuit 400 for the reverse enqueuing. When QID_C=Qn is inputted as the CND signal, the maximum value selection circuit 406 outputs the maximum order value in the virtual queue (Qn) to the ODR_A2, and asserts the ODR_A2_EN. The maximum value selection circuit 406 is comprised of several steps of comparator circuits, as is the case with the execution selection circuit 232 and the semaphore selection circuit 234 illustrated in Basic Example 1. The maximum value selection circuit 406 includes four first comparator circuits 422 (such as 422a, 422b), two second comparator circuits 424 (such as 424a), and one third comparator circuit (not shown), and eight determination circuits 426 (such as 426a, 426b, 426c, 426d).

The following explanation is made focusing on the first comparator circuit 422a. The first comparator circuit 422a compares the task 0 and the task 1. When both tasks are enqueued to the virtual queue (Qn), the first comparator circuit 422a selects a task with the greater order value. The task ID and the order value of the task 0 and the task 1 are inputted into the first comparator circuit 422a as the EID_S and the ODR_S.

The first determination: The determination circuit 426a asserts the EID_11A_EN when the task 0 is already enqueued at the virtual queue (Qn). The determination circuit 426b asserts the EID_11B_EN when the task 1 is already enqueued at the virtual queue (Qn). The first comparator circuit 422a first refers to the EID_11_EN signal outputted from each of the determination circuit 426a and the determination circuit 426b. When either of the EID_11_EN signal is "1", the task corresponding to the EID_11_EN signal of "1" is determined to be enqueued to the virtual queue (Qn). At this time, the first comparator circuit 422a outputs the task ID (EID_S) and the order value (ODR_S) of the task enqueued to the virtual queue (Qn) as the EID_21A and the ODR_21A, respectively, and asserts the EID_21A_EN.

When both the determination circuit 426a and the determination circuit 426b output "0", no task is enqueued to the virtual queue (Qn). At this time, the EID_21A_EN is negated and henceforth, neither the task 0 nor the task 1 becomes as the target of consideration in the second comparator circuit 424a.

When both the determination circuit 426a and the determination circuit 426b output "1", both tasks are already enqueued at the virtual queue (Qn). At this time, the next second determination is performed.

The second determination: To compare the ODR_S_0 of the task 0 with the ODR_S_1 of the task 1, and to select a task with the greater order value. The first comparator circuit 422a outputs the task ID (EID_S) and the order value (ODR_S) of the task with the greater order value as the EID_21A and the ODR_21A, respectively, and asserts the EID_21A_EN.

The contents of processing of other first comparator circuits 422 are the same, and the task 0 and the task 1, the task 2 and the task 3, the task 4 and the task 5, and the task 6 and the task 7 are compared respectively. The second comparator circuit 424 selects a task with a still greater order value according to the output from two first comparator circuits 422. The following explanation is made focusing on the second comparator circuit 424a. The second comparator circuit 424a compares the output signal of the first comparator circuit 422a with the output signal of the first comparator circuit 422b, and selects a task with the greater order value. The EID_21, the ODR_21, and the EID_EN are inputted into the second comparator circuit 424a, respectively from the first comparator circuit 422a and the first comparator circuit 422b. The second comparator circuit 424 selects a task with the greatest order value in the virtual queue (Qn) among the task 0-the task 3. The same applies to the other second comparator circuits 424. Finally, the maximum order value in the virtual queue (Qn) is outputted as the ODR_A2 signal. When one of the tasks is selected, the ODR_A2_EN is asserted, and when neither of the tasks exists in the virtual queue (Qn), the ODR_A2_EN is negated.

A PR invalid signal to disenable the priority determination may be inputted into the first comparator circuit 422, the second comparator circuit 424, and the third comparator circuit. When the PR invalid signal is asserted, each comparator circuit removes the priority from the determination condition, and selects the task. The same applies to each comparator circuit illustrated in FIG. 30.

Figures 27, 28:
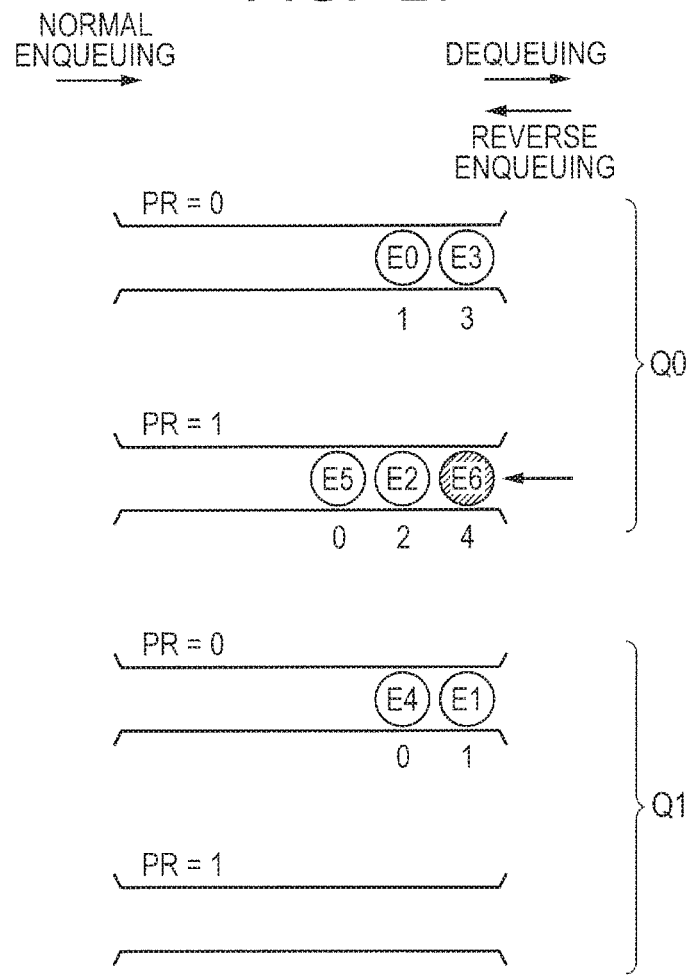
FIG. 27 is a conceptual diagram when performing reverse enqueuing of a task (E6) to the virtual queue illustrated in FIG. 23.
FIG. 28 is a data structure diagram of the state register corresponding to FIG. 27.

FIG. 27 is a conceptual diagram when performing reverse enqueuing of a task (E6) to the virtual queue illustrated in FIG. 23.

Here, the following explanation is made for the reverse enqueuing performed for the task (E6) of the task priority PR=1 to the virtual queue (Q0). First, the main circuit 400 inputs QID=Q0 indicative of the enqueuing destination into the maximum value selection circuit 406 by means of the QID_C signal. The maximum value selection circuit 406 outputs the maximum order value of the virtual queue (Q0) to the queue control circuit 404 as the ODR_A2, and asserts the ODR_A2_EN. According to FIG. 27, the maximum order value of the virtual queue (Q0) is "3" of the task (E3), accordingly, ODR_A2=3.

Next, the main circuit 400 sets up EID_C=E6, QID_C=Q0, and PR_C=1 as CMD=ENQ_TP (a reverse enqueuing command). At this time, the register-value generating circuit 420_E6 contained in the queue control circuit 404 detects EID_C=ELM_ID=E6, and outputs QID_N_E6=QID_C=Q0, ODR_N_E6=ODR_A2+1=3+1=4, and PR_N_E6=PR_C=1.

At the time of CMD=ENQ_TP (the reverse enqueuing command), only the register-value generating circuit 420 associated with the task specified by the EID_C operates. Therefore, only the state data of the task (E6) that is reverse-enqueued is changed.

FIG. 28 is a data structure diagram of the state register 250 corresponding to FIG. 27.

The portion underlined in the figure has changed from the setting contents of the state register 250 illustrated in FIG. 24. First, by the reverse enqueuing of the task (E6) to the virtual queue (Q0), "Q0" is set to the queue identification register 416_E6 newly. The ODR of the task (E6) is "4" and the PR is "1." The reverse enqueuing of the task (E6) does not affect the state data of the other tasks.

Figure 29:
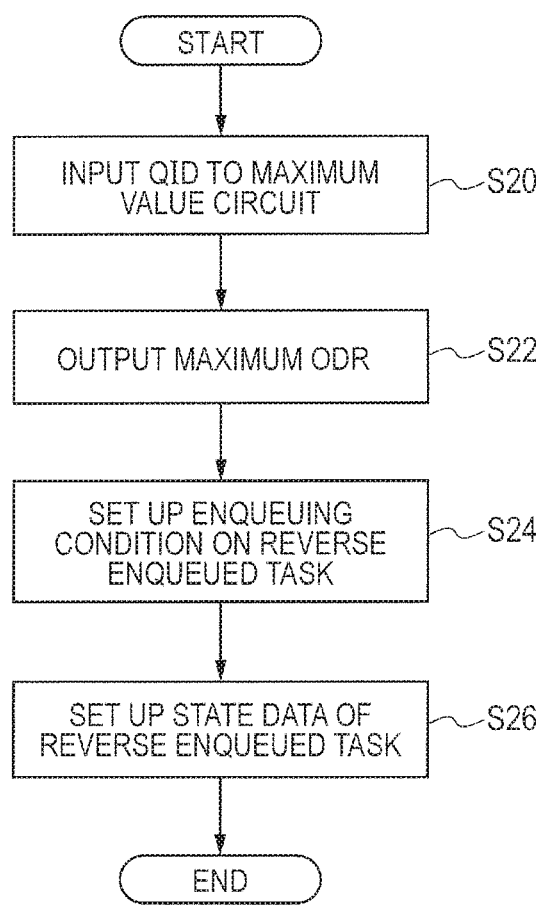
FIG. 29 is a flowchart illustrating the processing steps of the reverse enqueuing according to Basic Example 2.

FIG. 29 is a flowchart illustrating the processing steps of the reverse enqueuing.

The main circuit 400 inputs QID=Qn of the virtual queue as the reverse enqueuing destination to the maximum value selection circuit 406 first (S20). The main circuit 400 outputs the maximum order value of the virtual queue (Qn) to the queue control circuit 404 (S22). The main circuit 400 sets up the enqueuing condition about the task that is reversely enqueued (hereinafter called a "reverse enqueued task") (S24). Specifically, the EID_C, the QID_C, and the PR_C are set up as CMD=ENQ_TP (a reverse enqueuing command). The register-value generating circuit 420 corresponding to the reverse enqueued task in the queue control circuit 404 sets the PR_C, the maximum order value+1, and the QID_C to the task priority register 412 of the reverse enqueued task, the queue order register 414, and the queue identification register 416, respectively (S26). However, when maximum order value=0 and the ODR_A2_EN is negated, that is, when no task is enqueued to the virtual queue (Qn), the order value "0" indicative of the first enqueuing is set to the queue order register 414.

As shown above, at the time of the normal enqueuing, adjustment of the order value of other tasks may be necessary, but at the time of the reverse enqueuing, such adjustment is not necessary. When the virtual queue is observed on the assumption of the FIFO, the task enqueued earlier in the past has a greater order value. In other words, the task that is the more deeply enqueued in the virtual queue has the greater order value. On the contrary, it may set up such that the task that is the more deeply enqueued in the virtual queue may have the smaller order value. In this case, at the time of the normal enqueuing, adjustment of the order value of other tasks becomes unnecessary, however, at the time of the reverse enqueuing, adjustment of the order value of other tasks may become necessary.

<Dequeuing>

Figure 30:
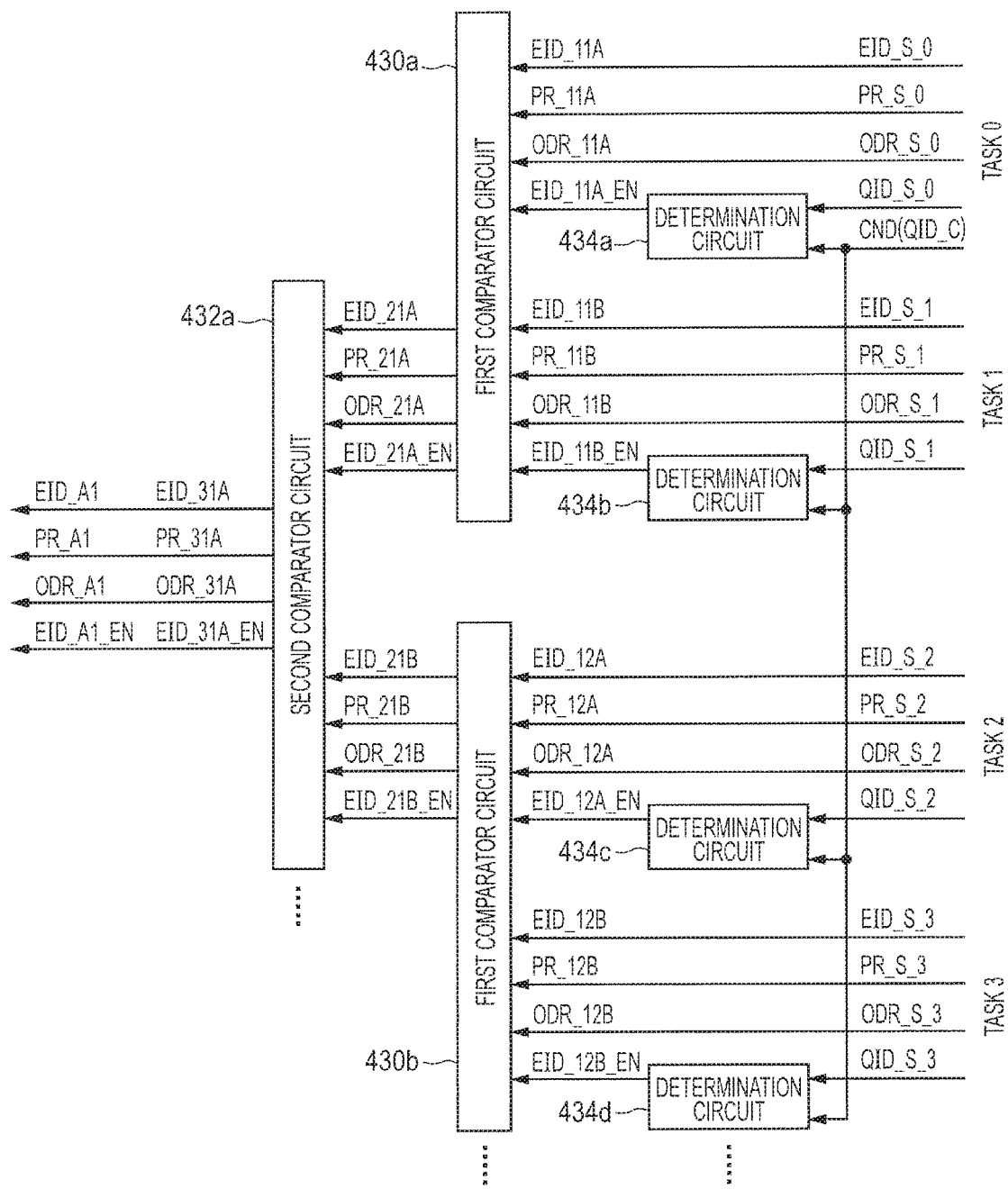
FIG. 30 is a partial circuit diagram of a task selection circuit according to Basic Example 2.

FIG. 30 is a partial circuit diagram of the task selection circuit 230.

The basic configuration of the task selection circuit 230 has been explained with reference to FIG. 11 as Basic Example 1. The task selection circuit 230 in the implementation example of the virtual queue specifies a dequeuing task, when inquired by the main circuit 400. Here, the circuit configuration concerning the scheme for specifying this dequeuing task is explained. When QID_C=Qn is inputted as the CND signal, the task selection circuit 230 selects the dequeuing task from the priority queue with the highest task priority in the virtual queue (Qn). Then, the task selection circuit 230 outputs the task ID, the task priority, and the order value of the dequeuing task to the EID_A1, the PR_A1, and the ODR_A1, respectively, and asserts the EID_A1_EN. The task selection circuit 230 is comprised of several steps of the comparator circuits, as is the case with the execution selection circuit 232 and the semaphore selection circuit 234 that are shown in Basic Example 1. The task selection circuits 230 includes four first comparator circuits 430 (such as 430*a*, 430*b*), two second comparator circuits 432 (such as 432), one third comparator circuit (not shown), and eight determination circuits 434 (such as 434*a*, 434*b*, 434*c*, 434*d*).

The following explanation is made focusing on the first comparator circuit 430*a*. The first comparator circuit 430*a* compares the task 0 and the task 1, and selects a task of the higher task priority when both are enqueued to the virtual queue (Qn) and selects a task with the greater order value when the task priority is the same. The task ID, the task priority, and the order value of the task 0 and the task 1 are inputted into the first comparator circuit 430*a* as the EID_S, the PR_S, and the ODR_S.

The first determination: The determination circuit 434*a* asserts the EID_11A_EN when the task 0 is already enqueued at the virtual queue (Qn). The determination circuit 434*b* asserts the EID_11B_EN when the task 1 is already enqueued at the virtual queue (Qn). The first comparator circuit 430*a* first refers to the EID_11_EN signal outputted from each of the determination circuit 434*a* and the determination circuit 434*b*. When either of the EID_11_EN signal is "1", the task corresponding to the EID_11_EN signal of "1" is determined to be enqueued to the virtual queue (Qn). At this time, the first comparator circuit 430*a* outputs the task ID (EID_S), the task priority (PR_S), and the order value (ODR_S) of the task enqueued to the virtual queue (Qn) as the EID_21A, the PR_21A, and the ODR_21A, respectively, and asserts the EID_21A_EN.

When both the determination circuit 434*a* and the determination circuit 434*b* output "0", neither of the tasks is enqueued to the virtual queue (Qn). At this time, the EID_21A_EN is negated and henceforth, neither the task 0 nor the task 1 becomes as the target of consideration in the second comparator circuit 432*a*.

When both the determination circuit 434*a* and the determination circuit 434*b* output "1", both of the tasks are already enqueued at the virtual queue (Qn). At this time, the next second determination is performed.

The second determination: To compare the PR_S_0 of the task 0 with the PR_S_1 of the task 1, and to select a task of the higher task priority, in other words, to select a task of the smaller PR_S. The first comparator circuit 430*a* outputs the task ID (EID_S), the task priority (PR_S), and the order value (ODR_S) of the task with the higher task priority as the EID_21A, the PR_21A, and the ODR_21A, respectively, and asserts the EID_21A_EN. When the task priority of two tasks is the same, the next third determination is performed.

The third determination: To compare the ODR_S_0 of the task 0 with the ODR_S_1 of the task 1, and to select a task with the greater order value. The first comparator circuit 430*a* outputs the task ID (EID_S), the task priority (PR_S), and the order value (ODR_S) of a task with the greater order value as the EID_21A, the PR_21A, and the ODR_21A, respectively, and asserts the EID_21A_EN.

The contents of processing of other first comparator circuits 430 are the same, and the task 0 and the task 1, the task 2 and the task 3, the task 4 and the task 5, and the task 6 and the task 7 are compared respectively. The second comparator circuit 432 narrows down the candidate of the dequeuing task further, based on the output from two first comparator circuits 430. Finally, the dequeuing task is selected from the priority queue with the highest task priority in the virtual queue (Qn). When one of the tasks is selected, the EID_A1_EN is asserted and when neither of the tasks exists in the virtual queue (Qn), the EID_A1_EN is negated.

Figures 31, 32:
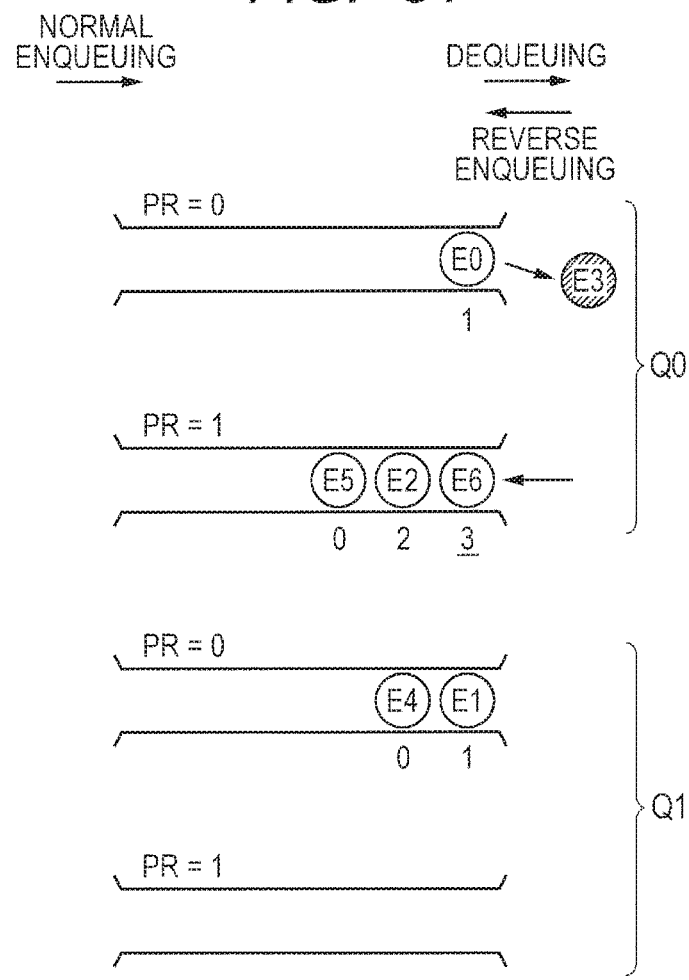
FIG. 31 is a conceptual diagram when dequeuing a task (E3) from the virtual queue illustrated in FIG. 27.
FIG. 32 is a data structure diagram of the state register corresponding to FIG. 31.

FIG. 31 is a conceptual diagram when dequeuing the task (E3) from the virtual queue illustrated in FIG. 27.

Here, the following explanation is made for the case of dequeuing one task from the virtual queue (Q0). The main circuit 400 inputs QID_C=Q0 into the task selection circuit 230. According to FIG. 27, in the priority queue (Q0:0) corresponding to the highest task priority in the virtual queues (Q0), the task (E0) of the order value "1" and the task (E3) of the order value "3" are enqueued. The task selection circuit 230 selects the task (E3) with the greater order value as the dequeuing task. The task selection circuit 230 asserts the EID_A1_EN as EID_A1=E3, PR_A1=0, and ODR_A1=3.

Next, the main circuit 400 sets up EID_C=EID_A1=E3 and QID_C=Q0 as CMD=DEQ (the dequeuing command). The register-value generating circuit 420_E3 outputs QID_N_E3=Non, ODR_N_E3=0 (reset), and PR_N_E3=0 (reset). In this way, the relation between the task (E3) and the virtual queue (Q0) is dissolved in the state register 250.

Not only the register-value generating circuit 420_E3 but also the register-value generating circuit 420_En corresponding to QID_S_En=QID_C=Q0 determines whether the relation of ODR_S_En>ODR_A1 is satisfied, when QID_C=QID_S_En is detected. Here, the ODR_A1 is the order value of the dequeuing task (E3) before the dequeuing. When the relation of ODR_S_En>ODR_A1 is satisfied, that is, the register-value generating circuit 420_En of the task (En) with the order value greater than the order value of the dequeuing task outputs ODR_N_En=ODR_S_En−1. In the example illustrated in FIG. 31, the register-value generating circuit 420_E6 corresponding to the task (E6) is applicable. The register-value generating circuit 420_E6 outputs ODR_N_E6=ODR_S_E6−1=4−1=3. In this way, the state data of the task (E6) that is an element of the virtual queue (Q0) is adjusted.

FIG. 32 is a data structure diagram of the state register 250 corresponding to FIG. 31.

The portion underlined in the figure has changed from the setting contents of the state register 250 illustrated in FIG. 28. First, by the dequeuing of the task (E3) from the virtual queue (Q0), "Non" is newly set to the queue identification register 416_E3, "0" is set to the queue order register 414 and the task priority register 412 as the reset value, respectively. According to the dequeuing of the task (E3), the ODR is decremented for the task (E6) of which the order value is greater than the dequeuing task (E3) among the task (E0), the task (E2), the task (E5), and the task (E6), that have been enqueued to the virtual queue (Q0).

Figure 33:
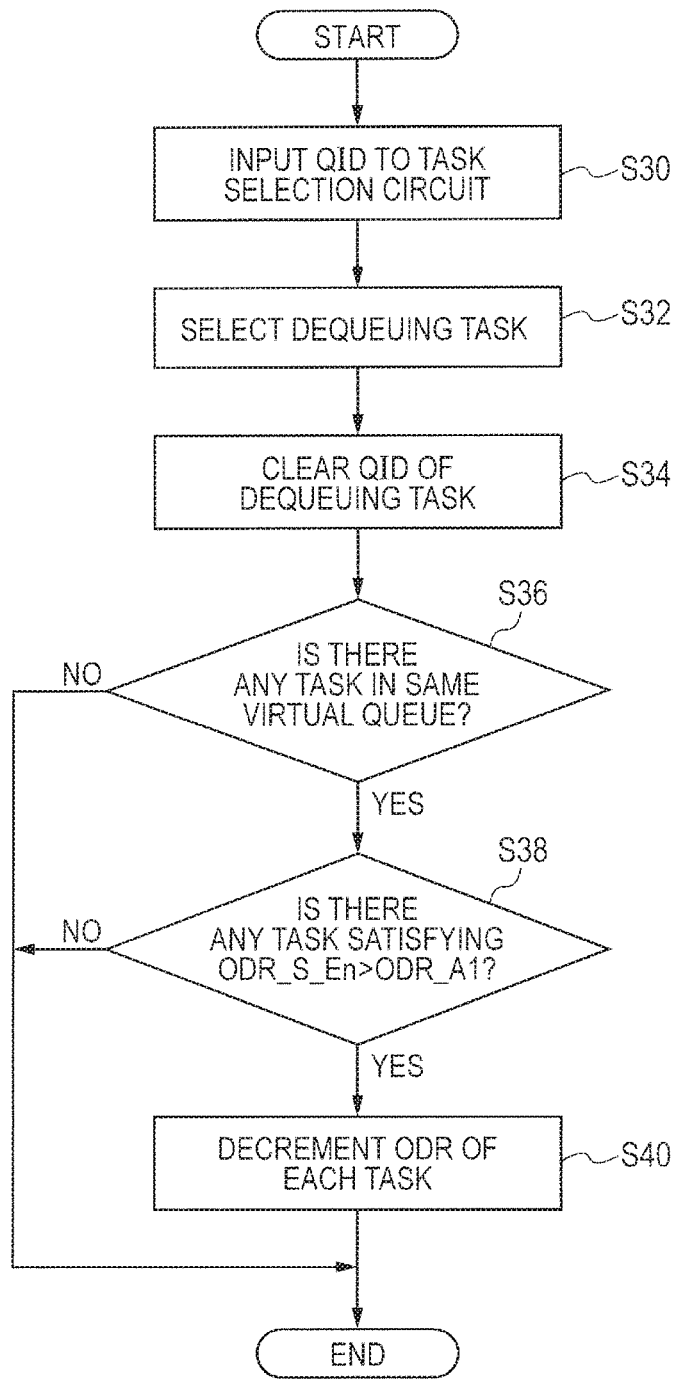
FIG. 33 is a flowchart illustrating the processing steps of dequeuing according to Basic Example 2.

FIG. 33 is a flow chart illustrating the processing steps of the dequeuing.

The main circuit 400 inputs QID=Qn of the virtual queue as the dequeuing destination into the task selection circuit 230 first (S30). The task selection circuit 230 selects a dequeuing task from the virtual queue (Qn) (S32). When the main circuit 400 inputs the task ID=En of the dequeuing task into the queue control circuit 404, the queue control circuit 404 clears QID=Qn from the state data of the dequeuing task (En) (S34). The PR and the ODR are reset as "0" at this time, however, it is not necessary to necessarily perform the reset.

When other tasks are enqueued in the virtual queue (Qn) (Y at S36) and a task that satisfies the relation ODR_S_En>ODR_A1 exists (Y of S38), the order value of the task concerned is decremented (S40). The processing from S30 to S40 is not necessary to be performed in serial; however, it may be performed in parallel in time.

From the implementation viewpoint, a task can be dequeued even from the middle of the virtual queue. For example, in FIG. 31, it is assumed that the task (E2) is required to be dequeued from the middle of the virtual queue (Q0). It is assumed that the task (E2) can operate on condition that a certain flag A is set as ON. When this flag A is set as ON, dequeuing the task (E2) from the middle of the virtual queue (Q0) becomes necessary. Also when the queuing time set up in advance about the task (E2) is spent out, dequeuing the task (E2) from the middle of the virtual queue (Q0) becomes necessary. In this case, by clearing the QID of the task (E2) and by decrementing the ODR of a task of which the order value is greater than the order value "2" of the task (E2), it becomes possible to dequeue the task (E2) even from the middle of the virtual queue (Q0). In the case of FIG. 31, the ODR of the task (E6) is set as "2." The virtual queue is formed in the manner that it does not receive physical restrictions by hardware. Therefore, it is possible to perform enqueuing and dequeuing even from the middle of the queue.

According to the virtual queue control described above, it is possible to realize by hardware logic the special queue that realizes an LIFO-like operation in spite of the FIFO basics. If the double-ended queue algorithm is implemented by software, the implementation employs ordinarily a chained list. However, as long as it is processing by software, the overhead accompanying memory accesses or address management must arise. On the contrary, the virtual queue control described in the implementation example of the virtual queue is realized by hardware logic; accordingly, it is possible to realize a markedly simple and high-speed control. In particular, in the RTOS with a severe time requirement, the significance that the double-ended queue algorithm can be implemented by hardware is great. Next, the illustrative embodiment is explained to realize reexecution-preferred task scheduling by the virtual queue control method described above.

Figure 34:
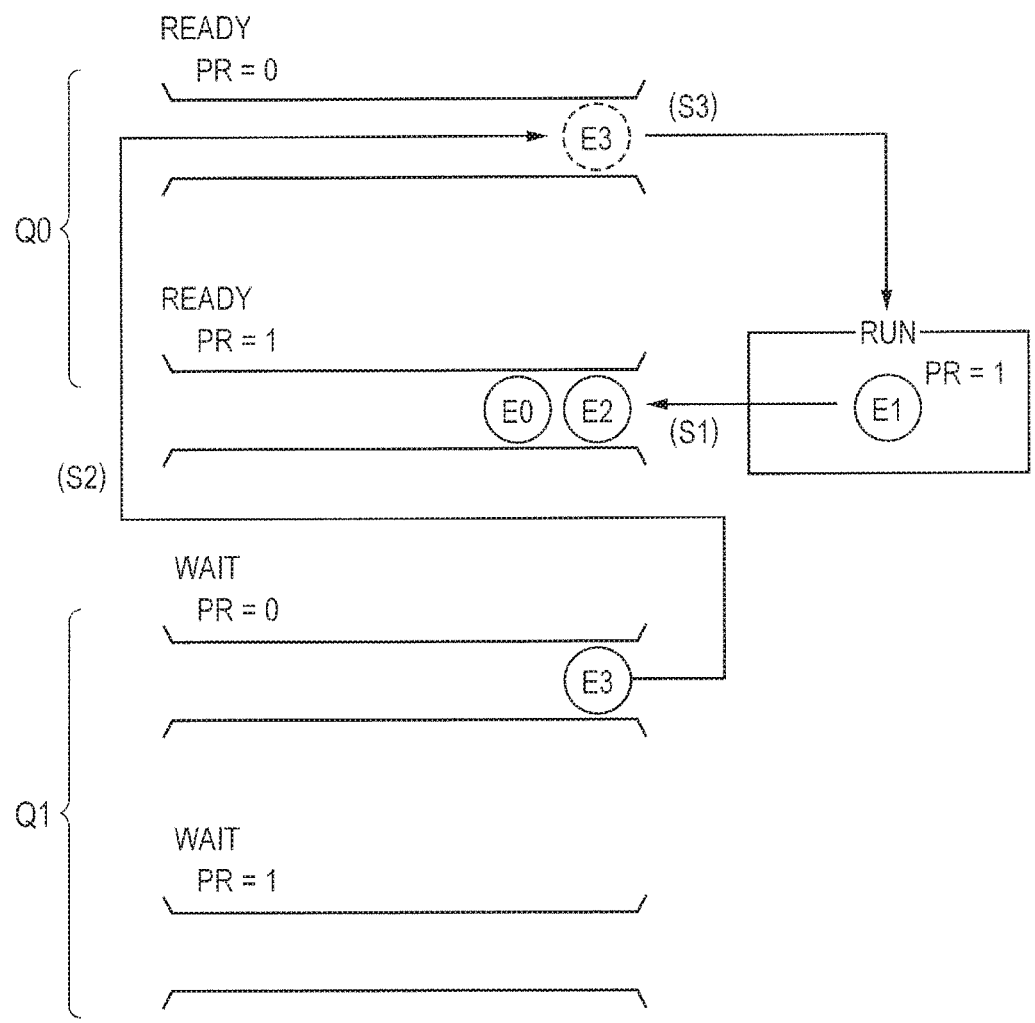
FIG. 34 is a first conceptual diagram illustrating the relation between a virtual queue and a task in reexecution-preferred task scheduling, according to Basic Example 2.

FIG. 34 is a first conceptual diagram illustrating the relation between a virtual queue and a task in the reexecution-preferred task scheduling.

Here, two virtual queues are assumed: a virtual queue (Q0) corresponding to the READY state and a virtual queue (Q1) corresponding to the WAIT semaphore state. The virtual queue (Q0) is a set of two priority queues, a priority queue to which a task of the task priority PR=0 is enqueued (hereinafter written as a "priority queue (Q0:0)"), and a priority queue (Q0:1) to which a task of the task priority PR=1 is enqueued. The same applies to the virtual queue (Q1), and four priority queues are assumed substantially.

In the figure, the task (E1) of PR=1 is in the RUN state. Similarly, the task (E0) and the task (E2) of PR=1 stand by in the READY state in the priority queue (Q0:1). The task (E3) of PR=0 stands by in the WAIT semaphore state in the priority queue (Q1:0). Here, it is assumed that the task (E1) is to be performed intensively and preferentially if once performed.

First, it is assumed that the task (E1) in the RUN state executes a release semaphore system call and returns to the READY state (S1). Since the task (E1) is to be reexecuted in a stage as early as possible, the task (E1) is reverse-enqueued to the priority queue (Q0:1). On the other hand, it is assumed that the WAIT cancelling condition of the task (E3) has been satisfied by the release semaphore system call.

The task (E3) is dequeued from the priority queue (Q1:0), and is normal-enqueued to the priority queue (Q0:0) (S2). Next, the task selection circuit 230 selects a new RUN-task. The task selection circuit 230 selects the task (E3) with the highest task priority in the tasks in the READY state as a dequeuing task. In this way, the task (E3) that is just shifted from the WAIT state to the READY state is dequeued from the priority queue (Q0:0) and becomes a new RUN-task. According to such task scheduling, the task with a high task priority can acquire the execution right in a comparatively early stage, when the WAIT cancelling condition is satisfied.

Figure 35:
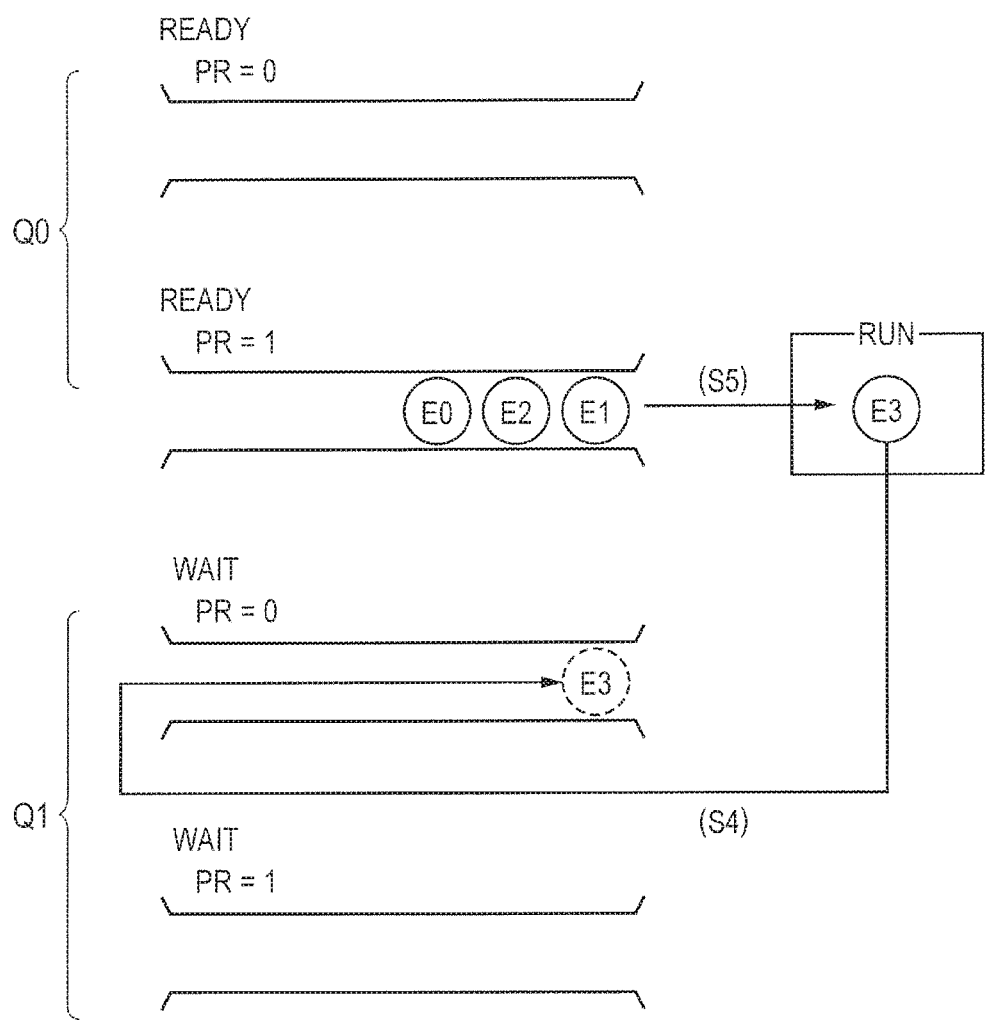
FIG. 35 is a second conceptual diagram illustrating the relation between the virtual queue and the task in the reexecution-preferred task scheduling, according to Basic Example 2.

FIG. 35 is a second conceptual diagram illustrating the relation between the virtual queue and a task in the reexecution-preferred task scheduling.

When the task (E3) executes a wait semaphore system call, the task (E3) is normal-enqueued to the priority queue (Q1:0) (S4). Next, the task selection circuit 230 selects a new RUN-task. The task selection circuit 230 selects a task with the highest task priority in the tasks in the READY state, however, the task priority of the task (E0), the task (E2), and the task (E1) is the same in the present case. In this case, as explained in the first conceptual diagram, the task (E1) has been "reverse-enqueued"; accordingly, the task (E1) is dequeued from the priority queue (Q0:1) (S5). The task (E1) becomes a new RUN-task. According to such a processing method, it is possible to meet the specification of the task (E1) that the task is not such as to set up the task priority PR=0, but that the task is to be executed as continuously as possible, if once executed.

According to the reexecution-preferred task scheduling, it is possible to control the execution order of a task, by using the normal enqueuing and the reverse enqueuing properly, in response to the execution situation or the kind of tasks. Therefore, in addition to the feature of the high-speed processing performance of the semiconductor device 100 according to Basic Example 1, it is possible to realize the more precise task scheduling.

Also in Basic Example 2, it is also preferable to implement only one of the save circuit 120 and the task control circuit 200, as explained in FIG. 14 and FIG. 15 of Basic Example 1.

<Interruption Processing>

In Basic Example, as shown in FIG. 5 and FIG. 16, a line of the interrupt request signal INTR is supplied to the task switch circuit 210, and the interrupt processing circuit that processes the interrupt request signal INTR concerned is configured hardware-wise with the task control circuit 200 acting as the main part. Next, the explanation is made for the case where the interrupt processing is performed by the semiconductor device 100 according to Basic Example.

Figure 36:
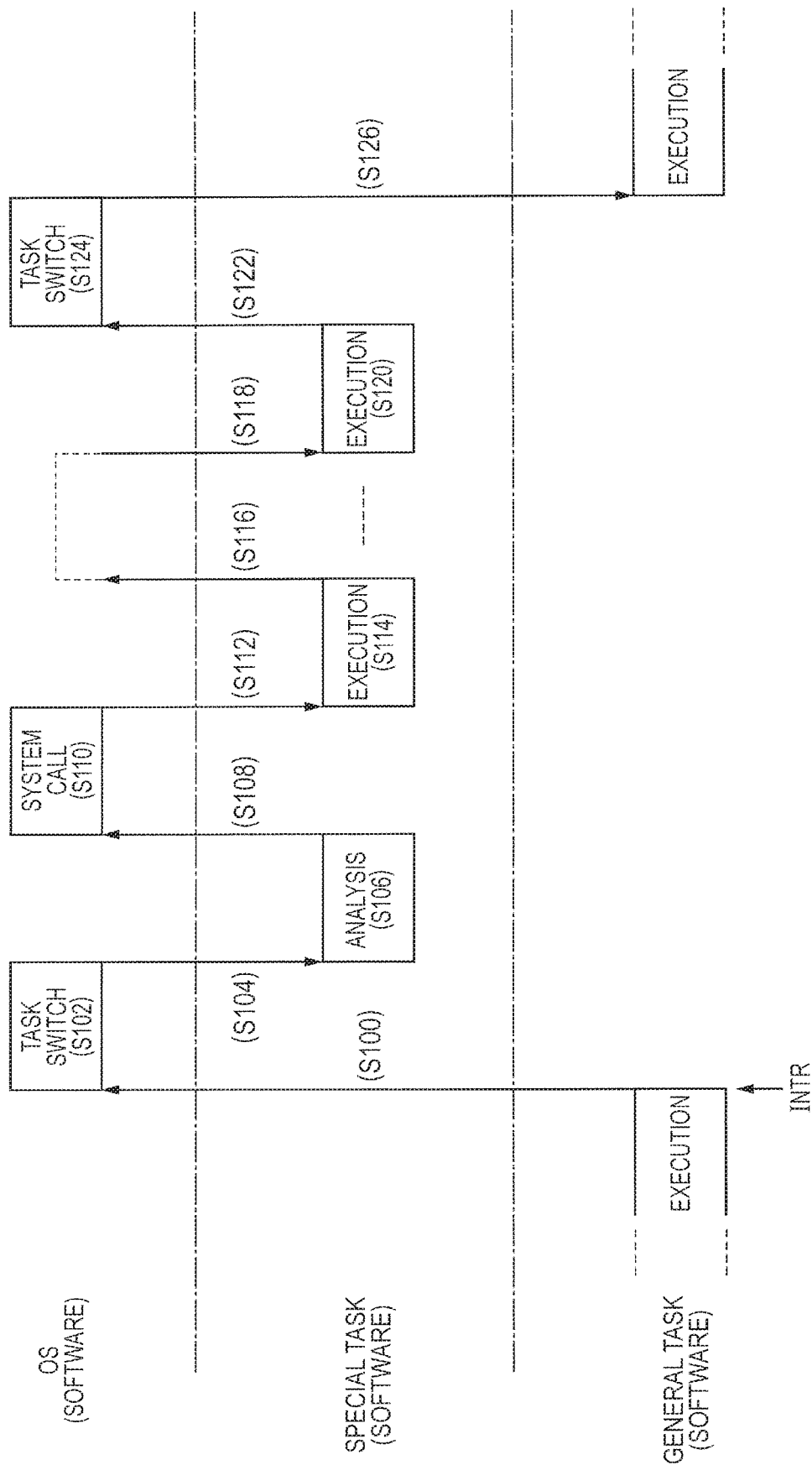
FIG. 36 is a timing chart of interrupt processing by a software OS.

First, the interrupt processing by the general software OS is explained. FIG. 36 is a timing chart of the interrupt processing by the general software OS. When an interrupt request signal is received from an interrupt controller (ICU: not shown), the software OS activates an interrupt handler, that is, the special task as referred to in Basic Example. Various phenomena, such as keyboard depression, reception of a communication packet, completion of DMA transfer, or mere expiration of a prescribed period of time, can trigger the generation of the interrupt request signal. The special task is implemented by software and executes various kinds of interrupt processing corresponding to the interrupt factor.

In the figure, the interrupt request signal INTR is first detected during the execution of a general task. When it is an interrupt request signal that should be answered immediately, the general task under execution is interrupted and the execution right moves to the OS (S100). The OS saves the context information of the general task to the TCB (S102), and activates a special task (S104).

The special task analyzes the interrupt factor (S106). By the interrupt request signal, various kinds of write are performed into an interrupt factor register (not shown). Therefore, the interrupt factor can be specified by checking the interrupt factor register. The special task determines the interrupt processing that should be executed corresponding to the interrupt factor, and starts the interrupt processing. Various system call instructions are executed in the process of the interrupt processing. When executing the system call instruction, the execution right moves to the OS again (S108). The OS executes the specified system call (S110). The execution right shifts again to the special task after executing the system call (S112). Since the interrupt processing has high priority, so far as the processing of the special task is not completed, the execution right does not move ordinarily to the general task.

When the special task continues the interrupt processing (S114) and the system call instruction is executed again, the execution right shifts to the OS (S116). In this way, after the special task and the OS acquire the execution right by turns, the last execution right shifts to the special task (S118), and the special task completes the interrupt processing (S120). When the interrupt processing is completed, the execution right shifts to the OS (S122), and the task switch from the special task to the general task is executed (S124). In this way, the ordinary processing by the general task is resumed (S126).

The semiconductor device 100 illustrated in Basic Example is different from the software OS in that the function as the RTOS is realized by hardware logic. However, the basic flow in the interrupt processing is almost same as that of the software OS. However, as explained with reference to Basic Example, the task switch at S102 or S124 and the execution of the system call at S110 are markedly enhanced in speed, compared with the software OS.

In the case of the semiconductor device 100 of Basic Example, the processing of the RTOS is executed after halting the CPU clock (CLK) at S100, S108, S116, and S122. After resuming the CPU clock (CLK) at S104, S112, S118, and S126, the processing of the special task or the general task is executed. The special task has a particularly high task priority. However, the special task is the same as the general task from the viewpoint that the special task is also a context-based task that operates in accordance with the CPU clock (CLK).

<A Semiconductor Device Responding to a CPU Interrupt Request Signal>

In Basic Example, the interrupt request signal INTR is supplied to the task control circuit 200. When the task control circuit 200 detects the interrupt request signal INTR, the task switch is executed to a special task and the special task is executed. In this case, the interrupt factor is specified by the special task, and the interrupt handler starts to execute the interrupt processing corresponding to the specified interrupt factor.

Figure 37:
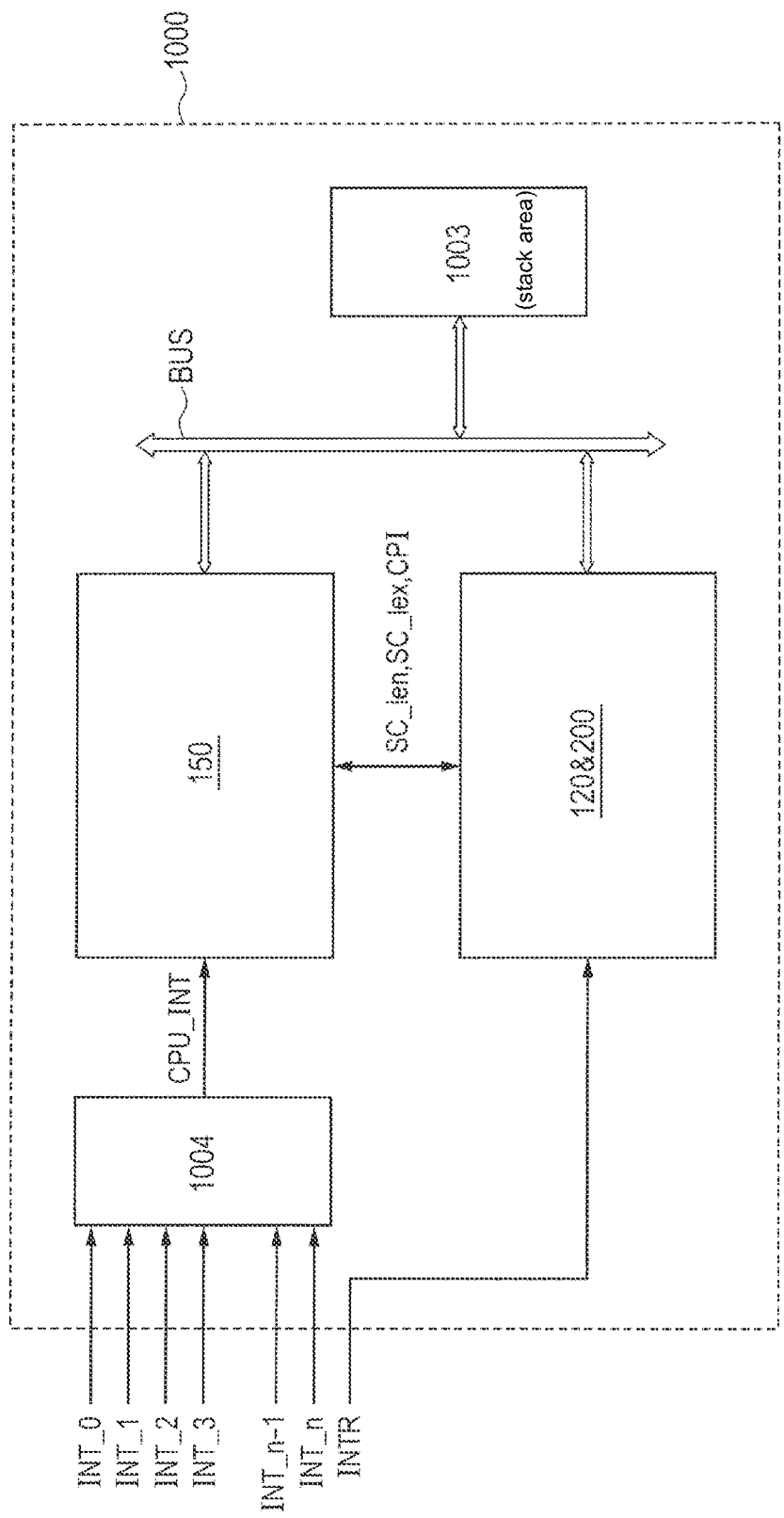
FIG. 37 is a block diagram illustrating the configuration of a semiconductor device according to Embodiment 1.

In Basic Example, the example is explained in which the interrupt request signal INTR is supplied only to the task control circuit 200. However, the following explains the semiconductor device in which the interrupt request signal is also supplied to the CPU 150. In order to distinguish from the interrupt request signal INTR that the task control circuit 200 detects, the interrupt request signal that is supplied to and detected by the CPU 150 is called a CPU interrupt request signal hereinafter. FIG. 37 is a block diagram illustrating the configuration of a semiconductor device 1000 to which the interrupt request signal INTR and the CPU interrupt request signal INT_0-INT_n are supplied. Although various circuit blocks are formed in the semiconductor device 1000, only the circuit blocks necessary for the explanation are illustrated in FIG. 37, and other circuit blocks are omitted. Although not limited in particular, the circuit blocks enclosed by the dashed line are encapsulated in one semiconductor package. In the figure, the reference numeral 120&200 indicates the save circuit 120 and the task control circuit 200 that are explained in Basic Example as one circuit block, and is called a task control unit hereinafter.

In the figure, the symbol BUS indicates a bus that is coupled to the CPU 150, the task control unit 120&200, and a memory circuit 1003. The bus BUS includes an address bus CPUA and a data bus CPUD of the CPU 150, and a bus 1002 in the task control circuit 200 to be explained later with reference to FIG. 38. Data transfer between the CPU 150 and the memory circuit 1003 and data transfer between the task control circuit 200 and the memory circuit 1003 are performed via the bus BUS.

In the figure, the reference numeral 1004 indicates the interrupt controller. Multiple CPU interrupt request signals INT_0-INT_n are supplied to the interrupt controller 1004 from the exterior of the semiconductor device 1000, and an interrupt request signal INTR is supplied to the task control circuit 200 in the task control unit 120&200 from the exterior of the semiconductor device 1000. The interrupt controller 1004 detects each of the CPU interrupt request signals INT_0-INT_n, generates a CPU interrupt request signal CPU_INT, and notifies the interrupt factor to the CPU 150. For example, when one of the interrupt request signals INT_0-INT_n is asserted, the interrupt controller 1004 asserts the CPU interrupt request signal CPU_INT, notifies the occurrence of the interrupt request to the CPU 150, and notifies the data (a vector number, for example) corresponding to the interrupt factor assigned to the asserted interrupt request signal to the CPU 150. When the CPU 150 receives the CPU interrupt request signal CPU_INT, the CPU 150 saves the value (data) of the program counter at that time and the data of a status register (to be described later) to a stack area in the memory circuit 1003 specified by a stack pointer. Subsequently, the CPU 150 starts execution of the interrupt handler corresponding to the notified vector number, and starts the interrupt processing corresponding to the interrupt factor.

Although not limited in particular, when multiple CPU interrupt request signals are asserted simultaneously, the interrupt controller 1004 notifies the interrupt factor corresponding to a CPU interrupt request signal with a high priority to the CPU 150. Accordingly, the CPU 150 starts the interrupt processing corresponding to the CPU interrupt request signal with a high priority.

On the other hand, the task control circuit 200 detects the interrupt request signal INTR supplied from the exterior of the semiconductor device 1000. For example, when the interrupt request signal INTR is asserted, the special task is started as described above and the execution of the interrupt handler is started. In this case, in the special task, the interrupt factor is specified and the interrupt processing corresponding to the specified interrupt factor is executed in the interrupt handler. Accordingly, even for one interrupt request signal INTR, the task control circuit 200 can perform the interrupt processing corresponding to each of multiple interrupt factors. Since the task switch, etc. take place in the special task that specifies the interrupt factor, it is likely that the start of the interrupt processing is delayed, compared with the case of supplying the CPU interrupt request signal CPU_INT from the interrupt controller 1004 to the CPU 150.

In order to accelerate the start of the interrupt processing in the task control circuit 200, it is possible to provide an interrupt controller similar to the interrupt controller 1004 to the task control circuit 200, and to supply the interrupt request signal INTR to the task control circuit 200 via this interrupt controller. However, it is necessary to provide two interrupt controllers 1004 in the semiconductor device 1000 in this case, leading to the cost rise of the semiconductor device 1000.

As illustrated in Basic Example, the transmitting and receiving of multiple signals are performed among the CPU 150 and the save circuit 120 and the task control circuit 200. FIG. 37 illustrates the transmitting and receiving of these multiple signals by the bidirectional arrow line that couples the task control unit 120&200 and the CPU 150. In the figure, only the system call signals SC_Ien and SC_Iex and the CPU save signal CPI (to be explained later with reference to FIG. 38) are shown, as an example of the transmitted and received signals.

<<Configuration of the Semiconductor Device 1000>>

Figure 38:
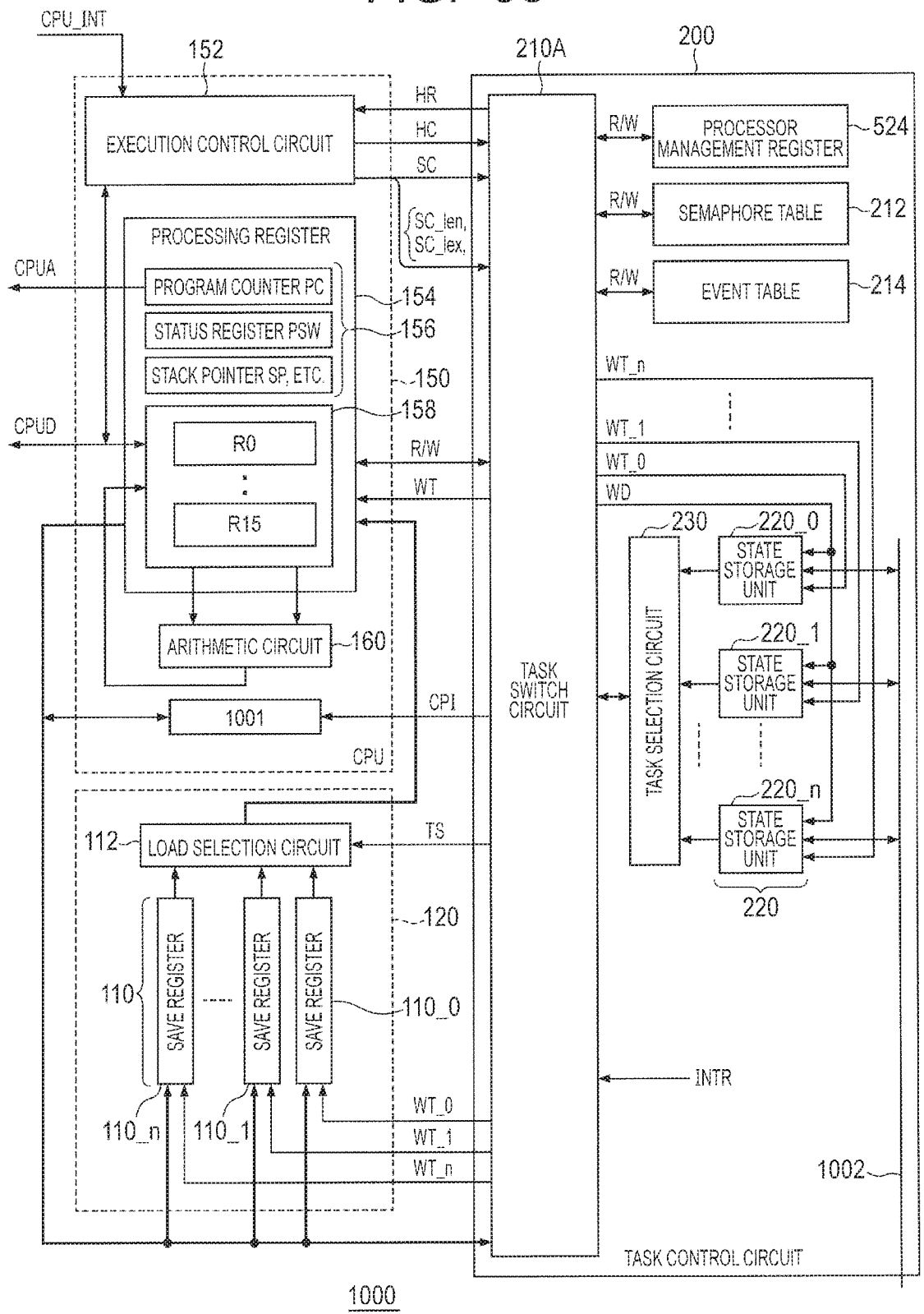
FIG. 38 is a circuit diagram illustrating the configuration of the semiconductor device according to Embodiment 1.

FIG. 38 is a circuit diagram illustrating the configuration of the semiconductor device 1000 according to Embodiment 1. In the figure, the interrupt controller 1004 explained in FIG. 37 is omitted, and only the CPU interrupt request signal CPU_INT supplied from the interrupt controller 1004 to the CPU 150 is shown. The memory circuit 1003 is also omitted. Here, the following explanation is made for the semiconductor device 1000 similar in configuration to the semiconductor device 100 explained in FIG. 5 of Basic Example 1. However, it is needless to say that the semiconductor device 1000 may be similar in configuration to the semiconductor device 100 explained in Basic Example 2. In FIG. 38, the same element as in FIG. 5 is labeled with the same symbol and number, and the explanation thereof is omitted as long as there is no necessity.

When compared with the semiconductor device 100 of FIG. 5, the CPU interrupt request signal CPU_INT is supplied to the CPU 150. In Embodiment 1, the CPU interrupt request signal CPU_INT is supplied to the execution control circuit 152. The execution control circuit 152 generates two kinds of system call signals SC_Ien and SC_Iex, in addition to nine kinds of the system call signal SCs, and supplies them to the task switch circuit 210A. The interrupt-related data save circuit 1001 is added to the CPU 150. Although omitted in Basic Example, the special register 156 of the CPU 150 includes a status register to store the status data indicative of the state of the CPU 150. In FIG. 38, the status register is specified by the symbol PSW, the program counter is specified by the symbol PC, and the stack pointer is specified by the symbol SP.

The interrupt-related data save circuit 1001 described above is coupled to the special register 156 and the save register 110, and is controlled by the CPU save signal CPI supplied by the task switch circuit 210A. More specifically, the interrupt-related data save circuit 1001 is coupled to the program counter PC and the status register PSW in the special register 156, and the save register 110. When the CPU interrupt request signal CPU_INT is received, the interrupt-related data save circuit 1001 stores the data (value) of the program counter PC and the data of the status register PSW at that time. In response to the CPU save signal CPI, the value of the program counter PC and the data of the status register PSW that are stored in the interrupt-related data save circuit 1001 are supplied to the save register 110.

Figure 39:
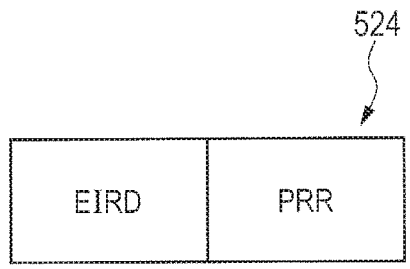
FIG. 39 is a drawing illustrating the configuration of a processor management register according to Embodiment 1.

As compared with FIG. 5, a processor management register 524 is added to the task control circuit 200. The processor management register 524 is coupled to the task switch circuit 210A, and serves as a register to which the task switch circuit 210A can perform read and write (R/W). FIG. 39 illustrates the configuration of processor management register 524. The processor management register 524 includes two storage areas EIRD and PRR. Before executing a task (a general task or a special task) by the CPU 150, the task switch circuit 210A writes the task ID (hereinafter also called a context ID) of the task to execute in the storage area (the task ID storage area) EIRD of the processor management register 524, and writes the data of the priority (priority data) of the task to execute in the storage area (the priority storage area) PRR.

When performing the task switch of the READY-task to the RUN-task, for example, the task switch circuit 210A writes the task ID and the priority data of the task to switch in the processor management register 524. Accordingly, the task switch circuit 210A can recognize the task that the CPU 150 executes and its priority, by referring to the processor management register 524. It is also possible for the task switch circuit 210A to recognize the state register by means of the task ID and to recognize various data of the task from the state register concerned. When performing the task switch, the task switch circuit 210A compares the priority data stored in the processor management register 524 with the priority data of the task to switch, for example. When the priority of the task to perform the task switch is higher than the priority indicated by the processor management register 524, the task switch is executed, and when the former priority is equal to or less than the latter priority, the task switch is not executed.

Compared with the task switch circuit 210 illustrated in FIG. 5, the task switch circuit 210A is added with the function to respond to the system call signals SC_Ien and SC_Iex and to perform the related processing. This function will be explained in <<A CPU interrupt-group system call>> and <<Processing of the CPU interrupt request signal CPU_INT by the task control circuit>> to be described later.

Although omitted in FIG. 5, the state storage unit 220 is coupled to the bus 1002, and each task state is set up from the memory circuit 1003 (FIG. 37) via the bus 1002. For example, the task ID of the corresponding task is written in the task ID register 254 (FIG. 10), and the start address data of the corresponding task is written in the task start address register 260 (FIG. 10).

<<A CPU Interrupt-Group System Call>>

In addition to the nine system calls described above, a CPU interrupt-group system call is implemented in the semiconductor device 1000 according to Embodiment 1. Although not limited in particular, as the CPU interrupt-group system call, two kinds of the system call instructions are implemented. That is, one is a CPU interrupt request notifying system call instruction (hereinafter, also called a first system call) vent_isr ( ), which notifies the reception of the CPU interrupt request signal to the task control circuit 200, and the other is a CPU interrupt request ending system call instruction (hereinafter, also called a second system call) viext_ntc ( ), which notifies the end of the interrupt processing by means of the CPU interrupt request signal.

Although it will be explained later with reference to FIG. 40 and other figures, the first system call and the second system call are described in the interrupt handler that is executed when the CPU 150 receives the CPU interrupt request signal CPU_INT. For example, the first system call is described in the start portion before the description portion that specifies the interrupt processing corresponding to the interrupt factor in the interrupt handler. The second system call is described in the end portion after the above-described description portion. Accordingly, the first system call is executed by the CPU 150 before the interrupt processing corresponding to the interrupt factor is started, and the second system call is executed after the interrupt processing is completed.

The first system call is accompanied by an argument. As the argument, the data corresponding to the interrupt factor notified from the interrupt controller 1004 is employed. The CPU 150 executes, as a task, the interrupt processing corresponding to the interrupt factor. Therefore, the interrupt factor indicates the task ID of the task as the interrupt processing. Accordingly, the first system call is issued accompanied by the task ID as the argument. The second system call may be accompanied or not accompanied by the interrupt factor (the task ID) as the argument.

When the execution control circuit 152 executes the first system call, the execution control circuit 152 generates the system call signal SC_Ien corresponding to the first system call. At this time, the task ID as the argument is supplied as an immediate operand of the first system call. In response to the system call signal SC_Ien, the task switch circuit 210A generates the CPU save signal CPI, and asserts the write signal (WT) of the save register corresponding to the task ID supplied as the immediate operand. For example, the task switch circuit 210A asserts the write signal (WT_n) corresponding to the save register 110_n in FIG. 38.

Accordingly, the processing data stored in the general-purpose register 158 and the processing data stored in the special register 156 are written in the save register 110_n. However, the CPU save signal CPI is generated in Embodiment 1; accordingly, as for the data of the program counter PC and the data of the status register PSW in the special register 156, the data stored in the interrupt-related data save circuit 1001 is supplied to the save register 110_n, and is saved to the save register 110_n.

Although not limited in particular, in response to the system call signal SC_Ien, the task switch circuit 210A writes the task ID given as the argument in the task ID storage area EIRD of the processor management register 524. At this time, the task switch circuit 210A searches the state storage unit (220_n) corresponding to the task ID of the state storage unit 220 based on the task ID given as the argument, and writes the priority data of the task priority register 256 (FIG. 10) stored in the state storage unit 220_n searched, in the priority storage area PRR.

The execution control circuit 152 executes the second system call and then generates the system call signal SC_Iex corresponding to the second system call. In response to this system call signal SC_Iex, the task switch circuit 210A generates a task selection signal (TS) that specifies the task ID given as an argument in advance, and supplies it to the load selection circuit 112. Thereby, the processing data stored in the save register 110_n is supplied and written back to the general-purpose register 158 and the special register 156 of the CPU 150. The data of the program counter PC and the data of the status register PSW when the CPU interrupt request signal CPU_INT is received are stored in the save register 110_n. Accordingly, the data written back to the program counter PC and the status register PSW becomes the data before executing the interrupt handler.

<<State Flow of the CPU 150>>

Figure 40:
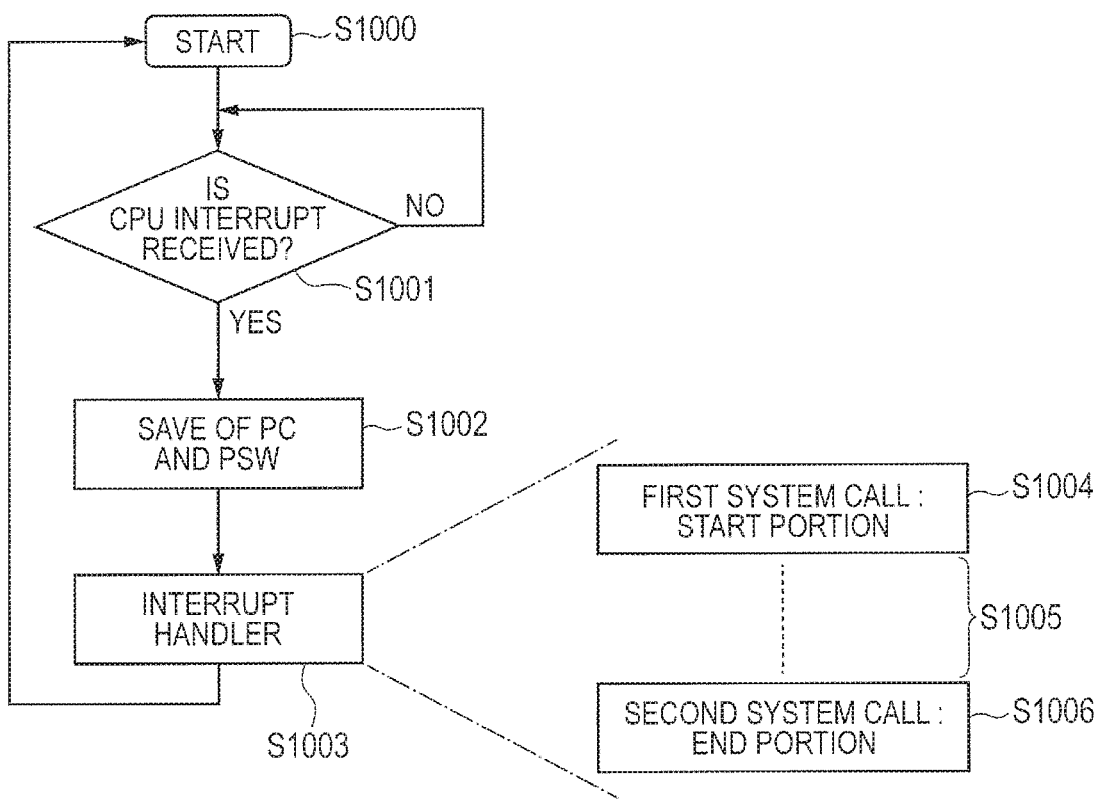
FIG. 40 is a state flow chart illustrating the state of a CPU according to Embodiment 1.

FIG. 40 is a state flow chart illustrating the state of the CPU 150 in the semiconductor device 1000 according to Embodiment 1. The figure illustrates the state when the CPU interrupt request signal CPU_INT is supplied to the CPU 150. At Step S1000, the CPU 150 starts operation (START). When the CPU interrupt request signal CPU_INT is supplied, at Step S1001, it is determined whether to receive the CPU interrupt request signal CPU_INT or not. Although not limited in particular, in the figure, determining at Step S1001 is repeatedly performed until the CPU interrupt request signal CPU_INT is received. When the CPU interrupt request signal CPU_INT is received (Y), Step S1002 is executed.

At Step S1002, the data of the program counter PC and the data of the status register PSW are saved. In the semiconductor device 1000, the execution control circuit 152 saves the data of the program counter PC and the data of the status register PSW to the stack area in the memory circuit 1003 indicated by the stack pointer SP. The execution control circuit 152 writes the data of the program counter PC and the data of the status register PSW at this time in the interrupt-related data save circuit 1001. That is, the data of the program counter PC and the data of the status register PSW at this time are saved to each of the stack area and the interrupt-related data save circuit 1001.

Next, at Step S1003, the interrupt handler corresponding to the interrupt factor notified from the interrupt controller 1004 is executed. The interrupt handler includes Step S1004 of a start portion, Step S1006 of an end portion, and Step S1005 of the interrupt processing that is executed between the start portion and the end portion.

At Step S1005 of the interrupt processing, the processing corresponding to the interrupt factor is executed. In this case, at Step S1004 before Step S1005, the first system call described above is executed, and at Step S1006 after Step S1005, the second system call described above is executed.

By executing the first system call, as described above, the data of the program counter PC and the data of the status register PSW that have been stored in the interrupt-related data save circuit 1001 are stored in the save register corresponding to the interrupt factor. By executing the second system call, the processing data saved into the save register corresponding to the interrupt factor are written back into the general-purpose register 158 and the special register 156 of the CPU 150. In this case, the data stored in the interrupt-related data save circuit 1001 are written back to the program counter PC and the status register PSW. Therefore, as for the program counter PC and the status register PSW, the data before starting the interrupt handler is saved to the save register, and when the interrupt handler is completed, the data are written back to the program counter PC and the status register PSW. Consequently, when the interrupt handler is completed, it becomes possible to return to the state before receiving the CPU interrupt request signal CPU_INT.

In the state flow illustrated in FIG. 40, at Step S1002, the data of the program counter PC and the data of the status register PSW are saved to the stack area in the memory circuit 1003 in a similar fashion. Therefore, it is also possible to set such that, for example, in response to the first system call described above, the task control circuit 200 accesses the memory circuit 1003 via the bus BUS and writes the data saved to the stack area into the save register. However, in this case, multiple accesses to the memory circuit 1003 via the bus BUS become necessary, therefore, the processing by the interrupt handler (Step S1005) for example is delayed.

On the other hand, at Step S1002, it is also possible to set such that the data of the program counter PC and the data of the status register PSW are not saved to the stack area. However, when the task control circuit 200 is set in the non-operating state and the semiconductor device 1000 is operated maintaining compatibility with the existing CPU, for example, the data saved to the interrupt-related data save circuit 1001 is not saved to the save register; therefore, appropriate operation is not performed. On the other hand, as illustrated in FIG. 40, when the data of the program counter PC and the data of the status register PSW are saved to the stack area in a similar fashion at Step S1002, the data saved to the stack area is extracted as in the existing CPU (pop operation), and is written back to the program counter PC and the status register PSW. Accordingly, it becomes possible to perform appropriate operation. That is, it becomes possible to ensure compatibility with the existing CPU.

<<Processing of the CPU Interrupt Request Signal CPU_INT by the Task Control Circuit>>

In Basic Example, the task control circuit 200 controls the execution of the task by the CPU 150. As opposed to this, as for the CPU interrupt request signal CPU_INT, the CPU 150 supplies the data corresponding to the interrupt factor to the task control circuit 200 as the task ID, and the CPU 150 itself executes the interrupt handler corresponding to the interrupt factor. In this case, the task control circuit 200 executes processing as if the supplied task ID is the task ID that the task control circuit 200 itself controls. The task switch circuit 210A makes the processor management register 524 store the task ID supplied and the priority data obtained by referring to the task ID. Accordingly, it becomes possible for the task switch circuit 210A also to perform the task switch, based on comparison with the priority stored in the processor management register 524.

When setting each task state to the state storage unit 220, multiple state storage units among the state storage units 220_0-220_n are assigned to the CPU interrupt request signal CPU_INT. Similarly, multiple save registers among the save registers 110_0-110_n are assigned to the CPU interrupt request signal CPU_INT. The state storage units assigned and the save registers assigned are respectively associated with the interrupt factor on a one-to-one basis. That is, in the multiple state storage units and the multiple save registers that are assigned, one state storage unit and one save register correspond to one interrupt factor.

When setting each task state to the state storage unit 220, the data corresponding to the interrupt factor is set to the state storage unit (220_n, for example) corresponding to the interrupt factor. For example, the task ID is set to the task ID register 254 (FIG. 10). The priority data of the task corresponding to the interrupt factor is set to the task priority register 256.

In response to the system call signal SC_Ien, the task switch circuit 210A writes the RUN state into the task state register 258 of the corresponding state storage unit 220_n. In response to the second system call signal SC_Iex, the task switch circuit 210A writes the STOP state into this task state register 258. At this time, the data (the task ID) corresponding to the interrupt factor is supplied as the argument in advance. Therefore, on the basis of this data, it is possible to specify the target state storage unit by referring to the task ID register 254 of each of the state storage units 220_0-220_n.

Accordingly, by referring to the corresponding state storage unit 220_n, it is possible for the task control circuit 200 to recognize and to control the task state resulting from the CPU interrupt request signal CPU_INT, as if it is the task that the task control circuit 200 itself controls. That is, when processing the CPU interrupt request signal CPU_INT, the task control circuit 200 performs the similar processing that would be performed to the task that the task control circuit 200 itself controls. Since what is to be performed is the similar processing, it becomes possible to achieve simplification of the task control circuit 200, leading to the suppress of the cost rise of the semiconductor device 1000. Furthermore, the save register to which the processing data is saved in the case of the task switch is employed as the register to which the processing data is saved when the CPU interrupt request signal CPU_INT is received. Therefore, it becomes possible to achieve the speeding up of the semiconductor device 1000.

In the corresponding state storage unit 220_n, the start address data of the interrupt handler may be set, or may not be set, to the task start address register 260 in advance. Alternatively, arbitrary address data may be set to it. This is because the task control circuit 200 does not need to supply the start address data of the interrupt handler to the CPU 150, because the CPU 150 itself executes the interrupt handler regarding the CPU interrupt request signal CPU_INT.

It is desirable that the state storage unit 220_n and the save register 110_n corresponding to the CPU interrupt request signal CPU_INT have the same configuration as the state storage unit and the save register that the task control circuit 200 employs for management of a task. Accordingly, it becomes possible to assign the state storage unit and the save register freely to the use for management of the task by the task control circuit 200 and the use for the CPU interrupt request signal. The number of the state storage unit and the save register that are assigned to the use for the CPU interrupt request signal CPU_INT may not be plural but may be one.

In response to the system call signal SC_Ien, the processing data of the processing register 154 of the CPU 150 (except for the program counter PC and the status register PSW) and the data stored in the interrupt-related data save circuit 1001 are saved to the save register 110_n specified by the argument (the task ID) accompanying the first system call. In response to the system call signal SC_Iex, the processing data saved to the save register 110_n is loaded to the processing register 154 of the CPU 150. That is, the task switch takes place as explained in Basic Example. Therefore, as is the case with the system call explained in Basic Example, also when the first system call and the second system call are executed, the CPU clock is stopped, and the saving and loading of the processing data are performed in the period when the CPU clock is stopped. The configuration in which the CPU clock is stopped is the same as in Basic Example. Therefore, the explanation thereof is omitted. The explanation is made for the example in which the CPU clock is stopped during the period of the task switch. However, it is not restricted to this. For example, it is preferable to restrict so that updating of the program counter PC may not be performed in the period of the task switch.

<<The Outline of Processing of the CPU Interrupt Request Signal in the Semiconductor Device 1000>>

Figure 41:
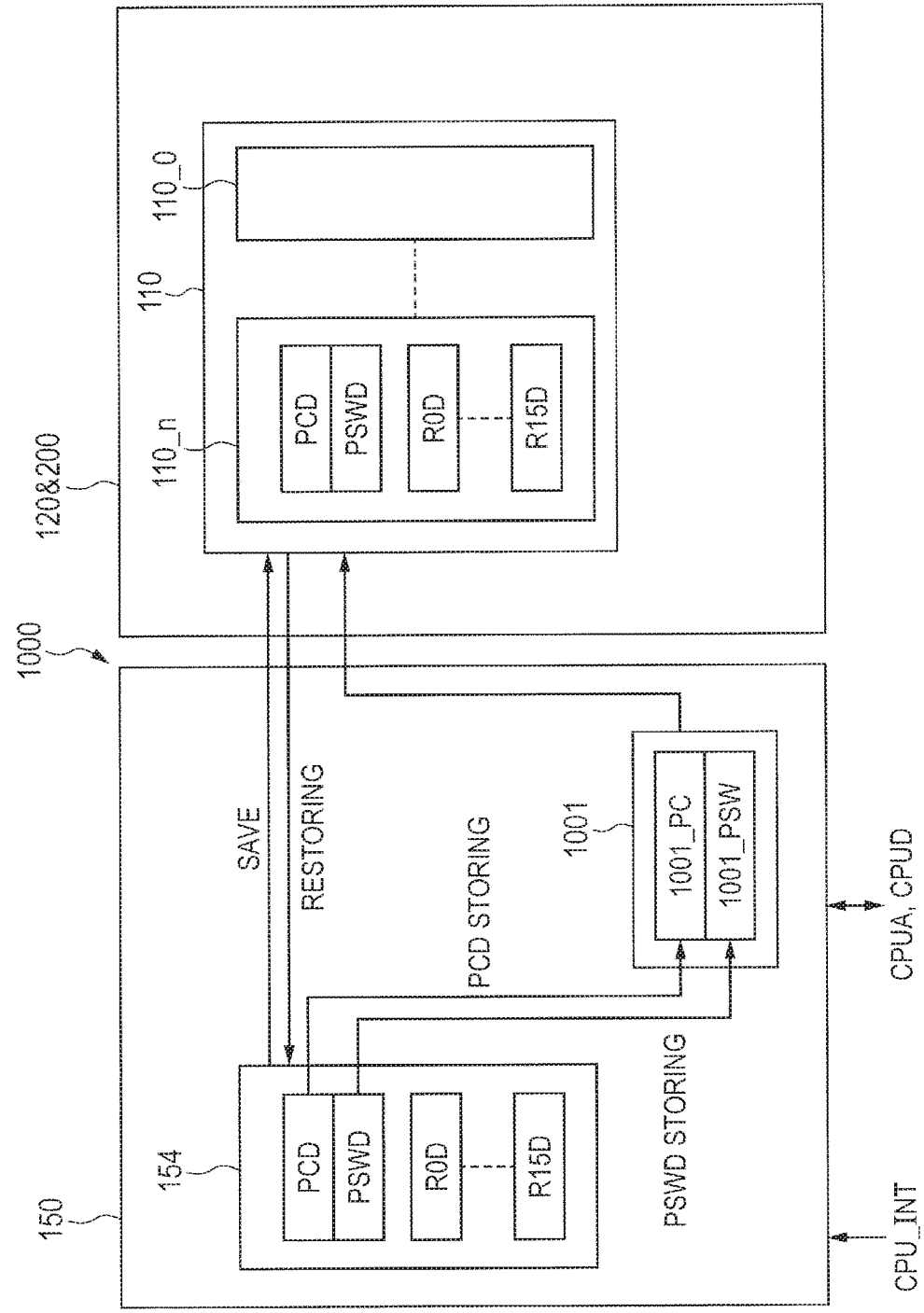
FIG. 41 is a circuit diagram illustrating schematically the configuration of the semiconductor device according to Embodiment 1.

FIG. 41 is a circuit diagram illustrating schematically the configuration of the semiconductor device 1000 according to Embodiment 1. As for the semiconductor device 1000 according to Embodiment 1, the processing at the time of occurrence of the CPU interrupt request signal CPU_INT is explained as a summary using FIG. 41. In FIG. 41, the memory circuit 1003, the interrupt controller 1004, and the bus BUS that are illustrated in FIG. 37 are omitted. Here, the following explanation is made assuming that the interrupt-related data save circuit 1001 is configured with a save register 1001_PC to which the value of the program counter PC is saved (hereinafter also called a PC save register) and a save register 1001_PSW to which the data of the status register PSW is saved (hereinafter also called a PSW save register). The explanation is made for the case where the PC save register 1001_PC and the PSW save register 1001_PSW are provided in the CPU 150. However, these registers may be provided in the task control circuit 200 or the save circuit 120.

The CPU 150 includes the processing register 154, and executes the processing of the data (such as PCD, PSWD, R0D-R15D) in the processing register 154 as a context. In the figure, the PCD indicates the data of the program counter PC, the PSWD indicates the data of the status register PSW, and the data R0D-R15D indicate the data of the general-purpose registers R0-R15. On the other hand, the task control unit 120&200 includes a save register 110. The save register 110 includes multiple save registers 110_0-110_n corresponding to the task.

When the task control unit 120&200 performs the task switch (context switch), the task control unit 120&200 saves the contexts (such as PCD, PSWD, R0D-R15D) currently held at the processing register 154 of the CPU 150 to the save register (110_0, for example) corresponding to the task (the rightward arrow). The task control unit 120&200 loads and restores the contexts (such as PCD, PSWD, R0D-R15D) stored in the save register (110_n, for example) corresponding to another task to switch, to the processing register 154 of the CPU 150 (the leftward arrow). The CPU 150 executes the processing (another task) based on the context restored to the processing register 154.

In the semiconductor device 1000 according to Embodiment 1, when the CPU interrupt request signal CPU_INT is received, the data PCD of the program counter PC and the data PSWD of the status register PSW, which are to be restored after executing the interrupt processing corresponding to this interrupt request signal, are stored in the PC save register 1001_PC and the PSW save register 1001_PSW (PCD storing and PSWD storing). The PC save register 1001_PC and the PSW save register 1001_PSW are coupled to the save register 110.

Also when the CPU interrupt request signal CPU_INT is received, the context in the processing register 154 of the CPU 150 is saved to the save register in the task control unit 120&200. However, in this case, instead of the data PCD of the program counter PC and the data PSWD of the status register PSW in the CPU 150, the data currently held in the PC save register 1001_PC and the PSW save register 1001_PSW are saved to the save register. Here, the save register to which the context is saved when the CPU interrupt request signal CPU_INT is received employs the save register (110_n, for example) among the save registers 110_0-110_n, corresponding to the task ID defined by the data corresponding to the interrupt factor.

When the CPU interrupt request signal CPU_INT is received, the CPU 150 accesses the stack area of the memory circuit 1003 (FIG. 37) specified by the stack pointer SP included in the processing register 154 via the buses CPUA and CPUD, and saves to the stack area the data PCD of the program counter PC and the data PSWD of the status register PSW at the time when the CPU interrupt request signal CPU_INT is received. Therefore, in the semiconductor device 1000, when the CPU interrupt request signal CPU_INT is received, the same contents of the data of the program counter PC and the data of status register PSW are saved to the PC save register 1001_PC and the PSW save register 1001_PSW, and the stack area.

<<Exemplification of the Interrupt Handler>>

The CPU 150 executes the interrupt handler corresponding to the interrupt factor, when the CPU interrupt request signal CPU_INT is received. FIG. 42 and FIG. 43 illustrate schematically the configuration of the interrupt handler according to Embodiment 1.

FIG. 42 illustrates the configuration of the interrupt handler when the task control unit 120&200 is not operated (that is, the case of non-use) in the semiconductor device 1000. Before executing the interrupt handler illustrated in the figure, the CPU 150 has saved the data of the program counter PC and the data of the status register PSW to the stack area and the interrupt-related data save circuit 1001 (the PC save register 1001_PC and the PSW save register 1001_PSW), as described above.

In the interrupt handler illustrated in FIG. 42, an instruction "PUSHM R0-R15" is described before the description part (//a main body of the interrupt handler processing) that describes the interrupt processing corresponding to the interrupt factor. Accordingly, before executing the interrupt processing corresponding to the interrupt factor, this instruction is executed by the CPU 150 and the data of the general-purpose registers R0-R15 are saved to the stack area.

Subsequently, the instruction in the description part is executed, and the interrupt processing corresponding to the interrupt factor is executed by the CPU 150. After the interrupt processing is executed, an instruction "POPM R0-R15" is executed. By the execution of this instruction, the data of the general-purpose registers R0-R15 saved to the stack area are restored to the general-purpose registers R0-R15 in the processing register 154. By executing the interrupt return instruction "RTE", the flow returns to the state before the interrupt handler has been executed, and returns to the program before the CPU interrupt request signal CPU_INT has been received. That is, by the execution of the return instruction "RTE", the data of the program counter PC and the data of the status register PSW that have been saved to the stack area are restored to the program counter PC and the status register PSW in the CPU 150. In FIG. 42, an interrupt return instruction "RTFI" that is enclosed by a dashed line is described in addition to the interrupt return instruction "RTE." This interrupt return instruction "RTFI" is explained in Embodiment 2; accordingly, the explanation thereof is omitted here.

Note that some of the existing CPUs are configured such that some general-purpose registers (R0, for example) among the general-purpose registers R0-R15 are employed as the stack pointer SP described above. In this case, the data of the general-purpose registers R1-R15 except the general-purpose register R0 employed as the stack pointer SP are saved to the stack area. Also when restoring, the data are loaded and restored to the general-purpose register R1-R15 except the general-purpose register R0. As a matter of course, the general-purpose register R0 is employed as the stack pointer SP, accordingly, it is not necessary to provide the stack pointer SP other than the general-purpose register.

In the semiconductor device 1000 according to Embodiment 1, the saving and restoring of the program counter PC and the status register PSW are also performed using the stack area. Therefore, even if the task control unit 120&200 is not used, after executing the interrupt processing corresponding to the CPU interrupt request signal CPU_INT, it is possible to restore to the state before the CPU interrupt request signal has been received.

In the existing CPU, the saving and restoring of the program counter PC and the status register PSW are performed using the stack area in many cases. Therefore, by not using the task control unit 120&200, it is possible to improve the compatibility of the semiconductor device 1000 with the existing CPU.

FIG. 42 illustrates the example of performing the saving and restoring of the general-purpose registers R0-R15 in the interrupt handler, however, it is not restricted to this. That is, an instruction (PUSHM and POPM) may be described in the interrupt handler so that the saving and restoring may be performed to a register that is desired to perform the saving and restoring, among the processing registers except the program counter PC and the status register PSW.

FIG. 43 illustrates the configuration of the interrupt handler when the task control unit 120&200 is operated (that is, the case of use). Also in this case, before the CPU executes the interrupt handler illustrated in FIG. 43, the data of the program counter PC and the data of the status register PSW are saved to the stack area and the interrupt-related data save circuit 1001 (the PC save register 1001_PC and the PSW save register 1001_PSW).

In the interrupt handler, the instruction is described in order of "vent_isr( )" and "isp=isp+8;" in the start part before the description part (//a main body of the interrupt handler processing) that describes the interrupt processing corresponding to the interrupt factor. Therefore, the CPU 150 executes the instruction in order of "vent_isr( )" and "isp=isp+8", before executing the interrupt processing corresponding to the interrupt factor. Here, the instruction "vent_isr( )" corresponds to the first system call described above.

By executing the instruction "vent_isr( )" (the first system call), the CPU 150 notifies to the task control unit 120&200 that the CPU interrupt request signal CPU_INT is received and that the interrupt processing is executed. In response to this notice, the task control unit 120&200 saves the context stored in the processing register 154 to the save register 110_n. However, different from the case where the task control unit 120&200 controls the task of the CPU 150, instead of the data PCD of the program counter PC and the data PSWD of the status register PSW in the processing register 154, the data stored in the PC save register 1001_PC and the PSW save register 1001_PSW are saved to the save register 110_n as the data of the program counter PC and the status register PSW.

Next, the CPU 150 executes the instruction "isp=isp+8." Here, "isp" expresses the value of the stack pointer SP. Therefore, the value of the stack pointer SP is increased by 8 by executing this instruction. Before executing this interrupt handler, the data of the program counter PC and the data of the status register PSW have been saved to the stack area, and the value of the stack pointer SP has decreased by 8. The data of the program counter PC and the data of the status register PSW when the CPU interrupt request signal CPU_INT has been received are already saved to the save register 110_n. Therefore, the data of the program counter PC and the data of the status register PSW that are saved to the stack area is not used for restoring. Therefore, in order to release the stack area employed for evacuating the data of the program counter PC and the data of the status register PSW, the value of the stack pointer SP is increased by 8.

The function that it is not necessary to execute an instruction to change the value of the stack pointer SP explicitly may be granted to the first system call or the second system call. That is, the function to release the stack area may be granted to the first system call or the second system call. As a matter of course, the value of the stack area to be released changes according to the size of the program counter PC and the status register PSW and it is not restricted to 8.

Next, as is the case with the interrupt handler illustrated in FIG. 42, the interrupt processing corresponding to the interrupt factor is executed by the CPU 150.

In the interrupt handler, an instruction "viext_ntc ( )" is described in the end part after the description part that describes the interrupt processing corresponding to the interrupt factor. The instruction "viext_ntc ( )" corresponds to the second system call described above. The CPU 150 executes the instruction "viext_ntc ( )" (the second system call), and the end of the interrupt processing corresponding to the CPU interrupt request signal CPU_INT is notified to the task control unit 120&200. In response to this notice, the task control unit 120&200 restores the data saved to the save register 110_n to the processing register 154 of the CPU 150. At this time, the data written back to the program counter PC and the status register PSW of the CPU 150 are the data that have been stored in the PC save register 1001_PC and the PSW save register 1001_PSW, and the data of the program counter PC and the data of the status register PSW when the CPU interrupt request signal CPU_INT has been received.

Accordingly, the flow returns to the state when the CPU interrupt request signal CPU_INT has been received, and the CPU 150 becomes possible to resume the processing before the reception. Although the CPU 150 resumes the processing before the reception, the task that has been executed before the reception may not be executed immediately after completing the execution of the interrupt handler. This is because, after the system call instruction "viext_ntc ( )" is executed, the task control unit 120&200 determines a task to be dispatched after the system call instruction "viext_ntc ( )" is executed, depending on the priority and the state (the WAIT state, the READY state, etc.) of each task. Therefore, the task that has been executed before the reception may be resumed next to a task with a high priority after the system call instruction "viext_ntc ( )" is executed. This can be understood also from the explanation made in <<Processing of the CPU interrupt request signal CPU_INT by the task control circuit>>, for example. That is, in response to the second system call signal SC_Iex, the task switch circuit 210A sets the STOP state to the task state register 258 of the state storage unit 220_n assigned to the CPU interrupt request signal CPU_INT. Therefore, after the CPU 150 executes the system call instruction "viext_ntc ( )", the task control circuit 200 executes the management of the task, as explained in Basic Example. This is the reason.

In the interrupt handler, even if an instruction to save and to restore the data of the register except the program counter PC and the status register PSW is not described, these data are restored. Accordingly, it becomes possible to reduce the instruction to be executed in the interrupt handler, leading to shortening of the execution time.

In the semiconductor device 1000 according to Embodiment 1, the processing to be executed when the CPU interrupt request signal CPU_INT is received is common, irrespective of the use of the task control unit 120&200. That is, the processing to save the data of the program counter PC and the data of the status register PSW to the stack area, and the processing to save them to the interrupt-related data save circuit 1001 are performed. Therefore, when the task control unit 120&200 is not used, the interrupt handler as illustrated in FIG. 42 may be created so as to employ the stack area, as is the case with the existing CPU. When the task control unit 120&200 is used on the other hand, by creating the interrupt handler as illustrated in FIG. 43, it becomes possible to use the function (the saving and restoring of the context for interrupt and the high-speed context) of the task control unit 120&200. The data of the program counter PC and the data of the status register PSW at the time when the CPU interrupt request signal CPU_INT is received are saved to the interrupt-related data save circuit 1001. Therefore, without accessing the stack area, it becomes possible to acquire the data of the program counter PC and the data of the status register PSW that have been saved, leading to the speeding up.

Embodiment 2

Figure 44:
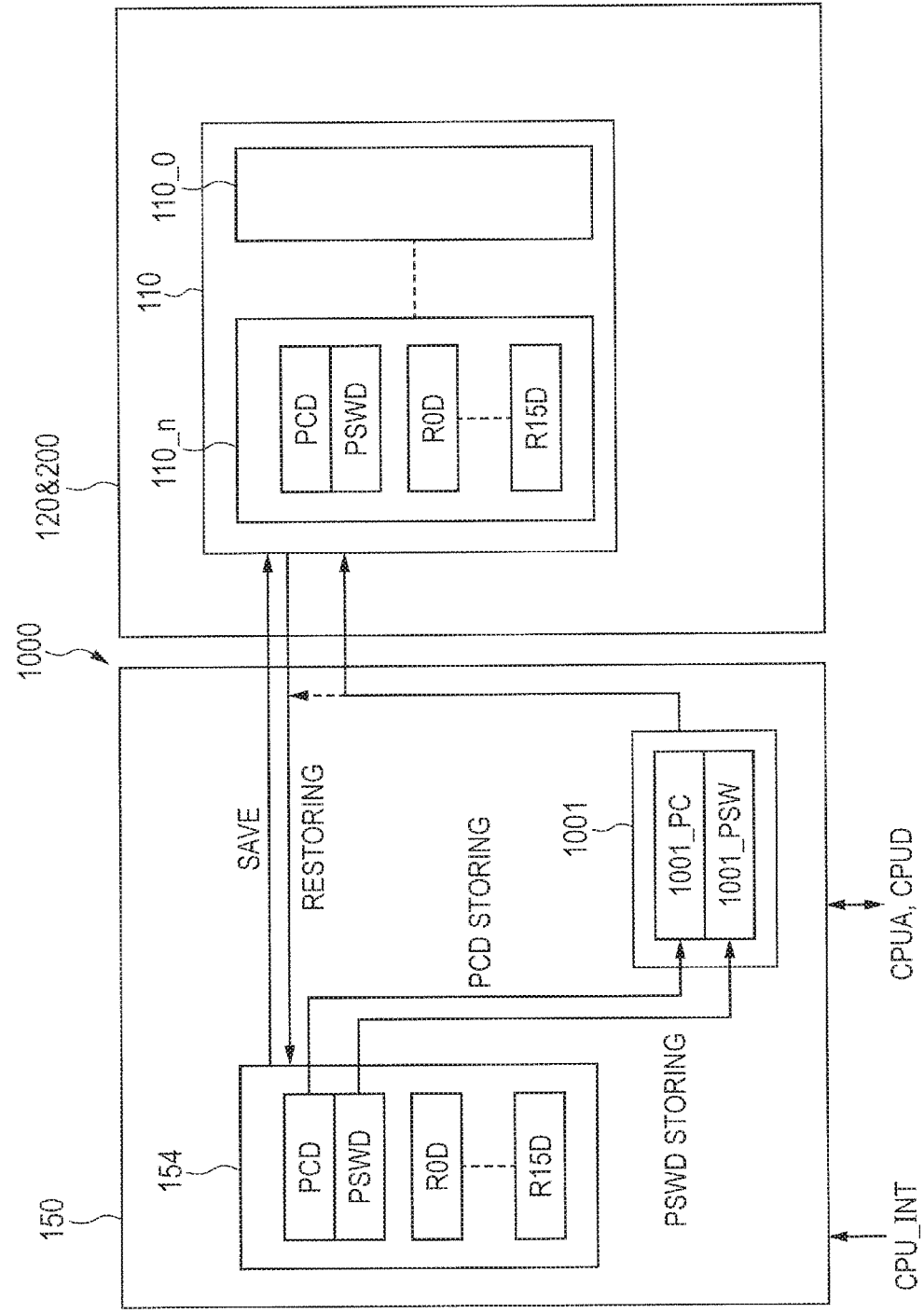
FIG. 44 is a circuit diagram illustrating schematically the configuration of a semiconductor device according to Embodiment 2.

FIG. 44 is a circuit diagram illustrating schematically the configuration of a semiconductor device 1000 according to Embodiment 2. FIG. 44 is similar to FIG. 41; therefore, the difference thereof is explained mainly.

As is the case with the CPU 150 illustrated in FIG. 41, the CPU 150 illustrated in FIG. 44 executes processing of the data PCD of the program counter PC, the data PSWD of the status register PSW, and the data R0D-R15D stored in the general-purpose registers R0-R15, in the processing register 154, as contexts. As is the case with the task control unit illustrated in FIG. 41, when performing the task switch, the task control unit 120&200 saves the data PCD, PSWD, R0D-R15D that are stored in the processing register 154 to the corresponding save register (110_0), and restores the data PCD, PSWD, R0D-R15D that are stored in the save register (110_n) corresponding to another task to switch, to the processing register 154. Accordingly, another task becomes ready to be executed in the CPU 150. Also in Embodiment 2, the CPU 150 includes the interrupt-related data save circuit 1001. As is the case with FIG. 41, the interrupt-related data save circuit 1001 is comprised of the PC save register 1001_PC and the PSW save register 1001_PSW.

The difference between the CPU 150 illustrated in FIG. 41 and the CPU 150 illustrated in FIG. 44 is whether to save the data of the program counter PC and the data of the status register PSW to the stack area, at the time when the CPU interrupt request signal CPU_INT is received. When the task control unit 120&200 is not used, the difference is whether the CPU 150 restores the data of the program counter PC and the data of the status register PSW from the stack area, when the interrupt processing corresponding to the CPU interrupt request signal CPU_INT is completed.

In the CPU 150 according to Embodiment 2, the execution control circuit 152 is configured such that, when the CPU interrupt request signal CPU_INT is received, the data of the program counter PC and the data of the status register PSW at that time are stored only in the interrupt-related data save circuit 1001 (the PC save register 1001_PC and the PSW save register 1001_PSW) (the PCD storing and the PSWD storing). When the task control unit 120&200 is not used, the execution control circuit 152 is configured such that, as indicated by the dashed line arrow in the figure, when the interrupt processing is completed, the data stored in the interrupt-related data save circuit 1001 are restored to the program counter PC and the status register PSW in the processing register 154.

When the CPU interrupt request signal CPU_INT is received, the data PCD of the program counter PC and the data PSWD of the status register PSW at that time are stored in the PC save register 1001_PC and the PSW save register 1001_PSW, respectively. Unlike FIG. 41, at this time, the data PCD and the data PSWD at this time are not saved to the stack area. The subsequent processing differs depending on whether the task control unit 120&200 is used.

<The Case Where the Task Control Unit 120&200 is Used>

When the task control unit 120&200 is used, the interrupt handler is created describing the first system call instruction and the second system call instruction that are described above. FIG. 45 illustrates schematically the configuration of the interrupt handler according to Embodiment 2. FIG. 45 is similar to FIG. 43, except that the instruction "isp=isp+8" to operate the stack pointer SP is not described in FIG. 45. When the instruction "vent_isr ( )" described in the interrupt handler is executed by the CPU 150, as explained in FIG. 41, the processing data stored in the processing register 154 are saved to the corresponding save register (110_n, for example). However, as for the program counter PC and the status register PSW, the data stored in the PC save register 1001_PC and the PSW save register 1001_PSW are saved to the corresponding save register (110_n).

An instruction "viext_ntc ( )" is executed by the CPU 150 after the interrupt processing corresponding to the interrupt factor is executed by the CPU 150. Accordingly, as explained in FIG. 41, the data saved to the corresponding save register (110_n) is restored to the processing register 154 of the CPU 150. The data that is restored to the program counter PC and the status register PSW at this time are the data that have been stored in the PC save register 1001_PC and the PSW save register 1001_PSW, and the data at the time when the CPU interrupt request signal CPU_INT has been received. Therefore, the CPU 150 can return to the state at the time when the CPU interrupt request signal has been received.

Different from the semiconductor device 1000 according to Embodiment 1, when the CPU interrupt request signal CPU_INT is received, the data of the program counter PC and the data of the status register PSW are not saved to the stack area. Therefore, even if the instruction "isp=isp+8" to operate the stack area is not described in the interrupt handler, it is possible to use the stack area effectively. It is also possible to reduce the instruction to be executed, leading to shortening of the time required for the execution of the interrupt handler.

<The Case where the Task Control Unit 120&200 is not Used>

In this case, when the CPU interrupt request signal CPU_INT is received, the CPU 150 executes an interrupt handler similar to the interrupt handler explained in FIG. 42. The difference is that an interrupt return instruction "RTFI" is employed instead of the interrupt return instruction "RTE." As explained in Embodiment 1, the interrupt return instruction "RTE" is an instruction that restores the value of the program counter and the data of the status register that have been saved to the stack area, to the program counter PC and the status register PSW. On the other hand, the interrupt return instruction "RTFI" is an instruction to restore the value of the program counter and the data of the status register that have been stored (saved) in the dedicated register to the program counter PC and the status register PSW.

When the execution control circuit 152 of the CPU 150 executes the interrupt return instruction "RTFI" in the interrupt handler, the execution control circuit 152 restores the data stored in the PC save register 1001_PC and the PSW save register 1001_PSW to the program counter PC and the status register PSW of the CPU 150. Accordingly, the CPU 150 can return to the state when the CPU interrupt request signal CPU_INT has been received.

In Embodiment 2, when using the task control unit 120&200 and when not using, the processing to be executed when the CPU interrupt request signal CPU_INT is received becomes the same. Therefore, it becomes possible to simplify the configuration of the semiconductor device 1000.

Some of the existing CPUs includes a dedicated register (a save-dedicated register) to which the data of the program counter PC and the data of the status register PSW are saved when an interrupt request signal is received. When such an existing CPU is employed as the CPU 150 of the semiconductor device 1000, the above-described save-dedicated register can be employed as the PC save register 1001_PC and the PSW save register 1001_PSW described above. In this case, it becomes unnecessary to newly provide the PC save register 1001_PC and the PSW save register 1001_PSW, and the stack operation also becomes unnecessary. Therefore, it becomes possible to aim at improvement in the compatibility with the existing CPU, achieving the simplification of the semiconductor device 1000.

Embodiment 3

Figure 46:
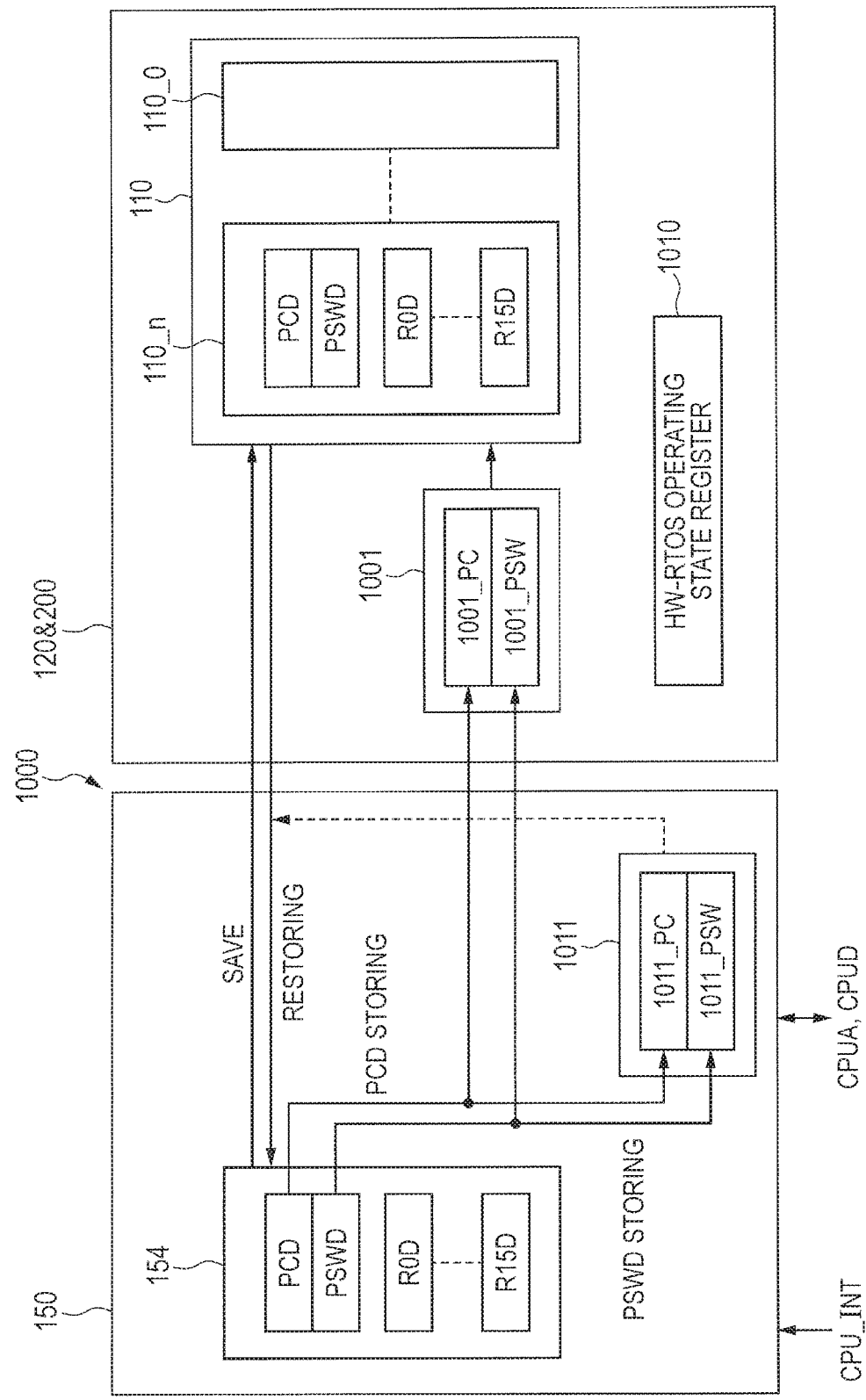
FIG. 46 is a circuit diagram illustrating schematically the configuration of a semiconductor device according to Embodiment 3.

FIG. 46 is a circuit diagram illustrating schematically the configuration of a semiconductor device 1000 according to Embodiment 3. FIG. 46 is similar to FIG. 41, therefore, the difference thereof is mainly explained.

In the semiconductor device 1000 illustrated in FIG. 46, the task control unit 120&200 described above includes an interrupt-related data save circuit 1001 (a PC save register 1001_PC and a PSW save register 1001_PSW). The task control unit 120&200 includes a task control unit-operating state register (hereinafter also called simply an operating state register) 1010 to store the state data indicative of whether this task control unit 120&200 is in operation. On the other hand, the CPU 150 includes a CPU save circuit 1011.

The task control unit 120&200 is set to the operating state or the non-operating state, by the instruction from the CPU 150, for example. When the task control unit 120&200 is set to the operating state, the task control unit 120&200 becomes in the state of use described above. On the other hand, when the task control unit 120&200 is set to the non-operating state, the task control unit 120&200 becomes in the state of non-use described above. The task control unit 120&200 stores the operating state or the non-operating state in the operating state register 1010. Accordingly, by referring to the operating state register 1010, it is possible to determine whether the task control unit 120&200 is in the operating state or in the non-operating state. Here, the operating state designates that the management of a task is performed by the task control circuit 200, and the non-operating state designates that the management of a task is not performed by the task control circuit 200.

The CPU save circuit 1011 is comprised of a CPU save register 1011_PC to which the data of the program counter PC in the processing register 154 is saved, and a CPU save register 1011_PSW to which the data of the status register PSW is saved. The CPU save register 1011_PC and the CPU save register 1011_PSW are coupled to the program counter PC and the status register PSW, respectively. Hereinafter, the CPU save register 1011_PC and the CPU save register 1011_PSW may also be called an interrupt-related save register.

The CPU 150 according to Embodiment 3 includes two kinds of methods as the interrupt processing to the CPU interrupt request signal CPU_INT. The first kind uses the stack area for the saving and restoring, and starts the interrupt processing at a first speed (hereinafter also called a stack-using interrupt) after receiving the CPU interrupt request signal CPU_INT. The second kind is a high-speed interrupt to start the interrupt processing at a higher speed than the first speed (hereinafter also called a dedicated register-using interrupt). In response to the CPU interrupt request signal, a user determines, by means of the setup of the interrupt controller, whether to use the stack-using interrupt or to use the dedicated register-using interrupt. The following explains the processing in each of the stack-using interrupt and the dedicated register-using interrupt.

<The Stack-Using Interrupt>

When the CPU interrupt request signal CPU_INT is received, the data PCD of the program counter PC and the data PSWD of the status register at that time are saved to the stack area specified by the stack pointer SP. Referring to the operating state register 1010, the execution control circuit 152 in the CPU 150 determines whether the task control unit 120&200 is in the operating state or in the non-operating state, and determines whether to store the data PCD and the data PSWD to the interrupt-related data save circuit 1001.

When it is determined that the task control unit 120&200 is in the operating state, the data PCD of the program counter PC and the data PSWD of the status register PSW at the time when the CPU interrupt request signal is received are stored and saved to the interrupt-related data save circuit 1001. In this case, the same data as the data saved to the stack area are saved to the interrupt-related data save circuit 1001. On the other hand, when it is determined that the task control unit 120&200 is in the non-operating state, the execution control circuit 152 does not execute the operation to store the data PCD and the data PSWD to the interrupt-related data save circuit 1001. Accordingly, the data PCD of the program counter PC and the data PSWD of the status register PSW at the time when the CPU interrupt request signal CPU_INT is received are saved only to the stack area.

The selection of whether to set the task control unit 120&200 to the operating state is performed by the user. Therefore, the user provides the interrupt handler corresponding to the state selected. That is, when the task control unit 120&200 is set as in the non-operating state, the interrupt handler in which the return instruction "RTE" is described as illustrated in FIG. 42 is provided. On the other hand, when the task control unit 120&200 is set as in the operating state, the interrupt handler in which the first system call instruction and the second system call instruction are described as illustrated in FIG. 43 is provided.

Accordingly, as explained in FIG. 41 for example, after the interrupt processing corresponding to the CPU interrupt request signal CPU_INT is completed, it becomes possible to return to the state when the interrupt request signal has been received.

<The High-Speed Interrupt: the Dedicated Register-Using Interrupt>

When the CPU interrupt request signal CPU_INT is received, the data PCD of the program counter PC and the data PSWD of the status register PSW at that time are saved to the CPU save register 1011_PC and the CPU save register 1011_PSW, respectively. Referring to the operating state register 1010, the execution control circuit 152 in the CPU 150 determines whether the task control unit 120&200 is in the operating state or in the non-operating state, and determines whether to store the data PCD and the data PSWD to the interrupt-related data save circuit 1001.

When it is determined that the task control unit 120&200 is in the operating state, the data PCD of the program counter PC and the data PSWD of the status register PSW at the time when the CPU interrupt request signal is received are stored and saved to the interrupt-related data save circuit 1001. In this case, the same data as the data saved to the PC save registers 1011_PC and 1011_PSW are saved to the interrupt-related data save circuit 1001. On the other hand, when it is determined that the task control unit 120&200 is in the non-operating state, the execution control circuit 152 does not execute the operation to store the data PCD and the data PSWD to the interrupt-related data save circuit 1001. Accordingly, the data PCD of the program counter PC and the data PSWD of the status register PSW at the time when the CPU interrupt request signal CPU_INT is received are saved only to the PC save registers 1011_PC and 1011_PSW.

Also in this case, a user provides the interrupt handler corresponding to the state of the task control unit 120&200 selected by the user himself or herself. That is, when the task control unit 120&200 is set as in the non-operating state, the interrupt handler as illustrated in FIG. 42 is provided. In this case, the PC save registers 1011_PC and 1011_PSW are used for the save and the restoring. Therefore, "RTFI" is described as the return instruction. Accordingly, the execution control circuit 152 writes back the data saved to the PC save registers 1011_PC and 1011_PSW to the program counter PC and the status register PSW. On the other hand, when the task control unit 120&200 is set as in the operating state, the interrupt handler in which the first system call instruction and the second system call instruction are described as illustrated in FIG. 45 is provided. In this case, the data of the program counter PC and the data of the status register PSW are not saved to the stack area. Therefore, unlike the interrupt handler illustrated in FIG. 43, the interrupt handler in which the stack manipulation instruction "isp=isp+8" is not described is provided.

Accordingly, as explained in FIG. 44 for example, after the interrupt processing corresponding to the CPU interrupt request signal CPU_INT is completed, it becomes possible to return to the state when the interrupt request signal has been received.

In Embodiment 3, when the task control unit 120&200 is in the non-operating state, the write of the data to the interrupt-related data save circuit 1001 is not performed. Accordingly, it becomes possible to aim at the reduction of the power consumption.

In the high-speed interrupt, the data of the program counter PC and the data of the status register PSW are saved not using the stack area but using the register. Therefore, the start of the interrupt processing corresponding to the interrupt factor can be advanced, and it is possible for a user to select arbitrary one from two kinds of interrupts, depending on the speed required.

<Modified Example>

In the modified example, the operating state of the task control unit 120&200 recognized by the operating state register 1010 is taken into consideration, and the kind of interrupt (the stack-using interrupt and the dedicated register-using interrupt) is not taken into consideration.

In a first example of the semiconductor device 1000 according to the modified example, the CPU save circuit 1011 illustrated in FIG. 46 is deleted. When the state of the task control unit 120&200 recognized by the operating state register 1010 is the operating state, the data PCD of the program counter PC and the data PSWD of the status register PSW at the time when the CPU interrupt request signal CPU_INT is received are saved to the stack area specified by stack pointer SP and the interrupt-related data save circuit 1001. On the other hand, when the task control unit 120&200 is in the non-operating state, the data PCD of the program counter PC and the data PSWD of the status register PSW at the time when the CPU interrupt request signal CPU_INT is received are saved only to the stack area specified by the stack pointer SP, and the interrupt-related data save circuit 1001 is not updated with the data PCD and the data PSW. Accordingly, it becomes possible to aim at the reduction of the power consumption.

In a second example of the semiconductor device 1000 according to the modified example, the semiconductor device 1000 includes the CPU save circuit 1011, as illustrated in FIG. 46. In the second example, the data PCD of the program counter PC and the data PSWD of the status register PSW at the time when the CPU interrupt request signal CPU_INT is received are not saved to the stack area specified by the stack pointer SP. When the state of the task control unit 120&200 recognized by the operating state register 1010 is the operating state, the data PCD of the program counter PC and the data PSWD of the status register PSW at the time when the CPU interrupt request signal CPU_INT is received are saved also to the CPU save circuit 1011 and the interrupt-related data save circuit 1001. On the other hand, when the task control unit 120&200 is in the non-operating state, the data PCD of the program counter PC and the data PSWD of the status register PSW at the time when the CPU interrupt request signal CPU_INT is received are saved only to the CPU save circuit 1011, and the interrupt-related data save circuit 1001 is not updated with the data PCD and the data PSW. Accordingly, it becomes possible to aim at the reduction of the power consumption.

Embodiment 3 explains the example in which the interrupt-related data save circuit 1001 is provided in the task control unit 120&200. However, it may be provided in the CPU 150. Similarly, the PC save circuit 1011 may be provided in the task control unit 120&200. The CPU save register 1011_PC and the CPU save register 1011_PSW may be the save-dedicated registers described in Embodiment 2.

Embodiment 1 to Embodiment 3 explain the example of the CPU interrupt request signal. However, it is not restricted to the time when the interrupt request signal is received. For example, when performing an exceptional treatment by the CPU, it is also preferable to update the interrupt-related data save circuit 1001 similarly at the time when the exception occurs. In this case, by describing a system call instruction similar to the one described in the interrupt handler to an exception handler to be executed at the time when the exception occurs, it becomes possible to treat the exception with the semiconductor device provided with the task control circuit. In this case, the interrupt-related data save circuit can be considered as an exception-related data save circuit.

Embodiment 1 to Embodiment 3 explain the example of the tight coupling in which the task control circuit 200 can operate the program counter PC of the CPU 150. However, the coupling between the task control circuit 200 and the CPU 150 may be the loose coupling.

Embodiment 1 to Embodiment 3 explain the example in which, when the CPU interrupt request signal CPU_INT is received, both of the data PCD of the program counter PC and the data PSWD of the status register PSW data are saved and restored. However, it is also preferable to save and restore only the data of the program counter PC.

As described above, the invention accomplished by the present inventors has been concretely explained based on the embodiments. However, it cannot be overemphasized that the present invention is not restricted to the embodiments as described above, and it can be changed variously in the range that does not deviate from the gist.

What is claimed is:

1. A semiconductor device comprising:
   a processor;
   a memory including a stack area;
   a save circuit that stores processing data of the processor; and
   a task control circuit that is an outside and independent circuit of the processor and controls a state of a task performed by the processor,
   wherein the processor comprises:
   a program counter to be updated when performing the task;
   a status register that stores status data of the processor;
   an interrupt-related save register that comprises 1) a first save register to which data of the program counter is to be stored and 2) a second save register to which the status data of the processor in the status register is to be stored; and
   an execution control circuit configured to determine whether to store the data of the program counter and the status data of the processor to the task control circuit based on a current state of the task control circuit,
   wherein the task control circuit comprises:
   an interrupt-related data save circuit separate from the interrupt-related save register of the processor;
   an operating state register that stores state data indicative of whether the task control circuit is set in an operating state or a non-operating state;
   a task switch circuit to perform a task switch when a system call from the processor is detected,
   wherein:
   in response to receiving an interrupt request signal from an interrupt controller, while the operating state register indicates that the task control circuit is in a non-operating state, the processor saves the data of the program counter and the status data of the processor in the status register into one of the stack area and the interrupt-related save register,
   in response to receiving an interrupt request signal from the interrupt controller, while the operating state register indicates that the task control circuit is in an operating state, 1) the processor saves the data of the program counter and the status data of the processor stored in the status register into one of the stack area and the interrupt-related save register, and 2) the processor further saves the data of the program counter and the status data of the processor stored in the status register into the interrupt-related data save circuit, and
   wherein the task control circuit saves the data of the program counter and status data of the processor saved in the interrupt-related data save circuit to the save circuit upon reception of the system call from the processor such that after completion of an interrupt processing corresponding to the interrupt request, the processor performs a restoration by loading the program counter data and the status data of the processor previously saved in the save circuit into the program counter and the status register of the processor,
   wherein the task switch circuit performs the task switch when the interrupt request signal is detected, by supplying processing data stored in the save circuit to the processor.

2. The semiconductor device according to claim 1, wherein the task control circuit supplies processing data stored in the save circuit to the processor when a task switch is executed.

3. The semiconductor device according to claim 2,
wherein the processor issues a first system call to the task control circuit, responding to reception of the interrupt request signal, and
wherein the task control circuit stores data stored in the interrupt-related data save circuit in the save circuit, responding to the first system call.

4. The semiconductor device according to claim 3, wherein the save circuit comprises:
a plurality of save registers each to store storing processing data of a task,
wherein, when issuing the first system call, the processor supplies a task ID as an argument to specify a task to be performed responding to the interrupt request signal, to the task control circuit, and
wherein the task control circuit stores the data of the program counter and the status data of the processor stored in the interrupt-related data save circuit, to a save register corresponding to the task ID supplied as an argument among the save registers included in the save circuit.

5. The semiconductor device according to claim 4,
wherein the processor issues a second system call to the task control circuit, when the processing corresponding to the interrupt request signal is completed, and
wherein the task control circuit supplies the processing data saved to the save circuit to the processor, responding to the second system call.

6. The semiconductor device according to claim 5,
wherein the task control circuit comprises:
a plurality of state registers each to store task state data including the task ID; a task selection circuit to select a task based on the state data supplied from the state register; and the task switch circuit to perform a task switch when a system call is detected, and wherein the state registers include a state register storing the task state data including the task ID supplied as the argument.

7. The semiconductor device according to claim 1,
wherein the semiconductor device comprises: an interrupt controller to which a plurality of interrupt request signals are supplied, and
wherein the processor is supplied with an interrupt request signal passing through the interrupt controller, and the task control circuit is supplied with an interrupt request signal without passing through the interrupt controller.

8. The semiconductor device according to claim 1, wherein the interrupt-related save register is a save-dedicated register included in the processor.

9. The semiconductor device according to claim 1,
wherein the processor performs a stack-using interrupt and a high-speed interrupt as an interrupt processing, and
wherein, in the stack-using interrupt, when an interrupt request is received, the data of the program counter and the status data of the processor are saved to the stack area, and in the high-speed interrupt, the data of the program counter and the status data are saved to the interrupt-related save register.

\* \* \* \* \*